US012692789B1

(12) United States Patent
Sollami

(10) Patent No.: US 12,692,789 B1
(45) Date of Patent: Jul. 28, 2026

(54) BIT HOLDER INSERTION AND EXTRACTION SYSTEM

(71) Applicant: The Sollami Company, Herrin, IL (US)

(72) Inventor: Phillip Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 790 days.

(21) Appl. No.: 17/505,995

(22) Filed: Oct. 20, 2021

(51) Int. Cl.
*E21C 35/19* (2006.01)
*B28D 1/18* (2006.01)
*E21C 35/18* (2006.01)

(52) U.S. Cl.
CPC .......... *E21C 35/191* (2020.05); *E21C 35/188* (2020.05); *B28D 1/188* (2013.01)

(58) Field of Classification Search
CPC .... E21C 35/191; E21C 35/188; E01C 23/088; B28D 1/188
See application file for complete search history.

(56) References Cited

U.S. PATENT DOCUMENTS 220,933 A 10/1879 McGill
2,382,947 A 8/1945 Brozek
2,783,799 A 3/1957 Hart
2,810,567 A 10/1957 Kirkham
3,307,482 A * 3/1967 Lauck ...................... F04B 9/14 60/477
3,342,531 A 9/1967 Krekeler
3,342,532 A 9/1967 Krekeler
3,397,012 A 8/1968 Krekeler
3,476,438 A 11/1969 Bower, Jr.
3,519,309 A 7/1970 Engle
3,833,264 A 9/1974 Elders
3,833,265 A 9/1974 Elders
3,865,437 A 2/1975 Crosby
(Continued)

FOREIGN PATENT DOCUMENTS

DE 102004049710 4/2006
DE 102011079115 1/2013
(Continued)

*Primary Examiner* — Janine M Kreck
(74) *Attorney, Agent, or Firm* — Rockman Videbeck & O'Connor

(57) ABSTRACT

An insertion and extraction system adapted to insert and extract a bit holder from a bore of a base block that includes a hydraulic cylinder, a bolt, a washer, and an extraction cup. The system can further include a nut adapted to engage the bolt. For insertion, the hydraulic cylinder is mounted to the bit holder, the washer is mounted adjacent the base block, the bolt is inserted through the hydraulic cylinder, through the bit holder, through the base block, and through the washer. The nut is threaded onto the bolt and a hose from a hydraulic pump is connected to the hydraulic cylinder. When the pump is activated, the bit holder is inserted into the base block. For extraction, the bit holder is mounted into the extraction cup, the hydraulic cylinder is mounted to the extraction cup, the bolt is inserted through the hydraulic cylinder, through the bit holder, and through the base block, the nut is threaded onto the bolt, and the hose from the hydraulic pump is connected to the hydraulic cylinder. When the pump is activated, the bit holder is extracted from the base block.

9 Claims, 55 Drawing Sheets

(56) References Cited

U.S. PATENT DOCUMENTS

| | | | |
|---|---|---|---|
| 3,997,011 | A | 12/1976 | Staroba |
| 4,084,856 | A | 4/1978 | Emmerich |
| 4,247,150 | A | 1/1981 | Wrulich et al. |
| RE30,807 | E | 12/1981 | Elders |
| 4,310,939 | A | 1/1982 | Tijima |
| 4,453,775 | A | 6/1984 | Clemmow |
| 4,478,298 | A | 10/1984 | Hake |
| 4,489,986 | A | 12/1984 | Dziak |
| 4,520,997 | A | 6/1985 | Lorton |
| 4,525,178 | A | 6/1985 | Hall |
| 4,561,698 | A | 12/1985 | Beebe |
| 4,570,726 | A | 2/1986 | Hall |
| 4,604,106 | A | 8/1986 | Hall |
| 4,632,463 | A | 12/1986 | Sterwerf, Jr. |
| 4,694,918 | A | 9/1987 | Hall |
| 4,702,525 | A | 10/1987 | Sollami |
| 4,763,956 | A | 8/1988 | Emmerich |
| 4,811,801 | A | 3/1989 | Salesky |
| 4,818,027 | A | 4/1989 | Simon |
| 4,821,819 | A | 4/1989 | Whysong |
| 4,844,550 | A | 7/1989 | Beebe |
| 4,915,455 | A | 4/1990 | O'Niell |
| 4,944,559 | A | 7/1990 | Sionett |
| 4,981,328 | A | 1/1991 | Stiffler et al. |
| 5,067,775 | A | 11/1991 | D'Angelo |
| 5,088,797 | A | 2/1992 | O'Neill |
| 5,098,167 | A | 3/1992 | Latham |
| 5,159,233 | A | 10/1992 | Sponseller |
| 5,161,627 | A | 11/1992 | Burkett |
| 5,273,343 | A | 12/1993 | Ojanen |
| 5,281,260 | A | 1/1994 | Kumar et al. |
| 5,287,937 | A | 2/1994 | Sollami |
| 5,302,005 | A | 4/1994 | O'Neill |
| 5,303,984 | A | 4/1994 | Ojanen |
| 5,352,079 | A | 10/1994 | Croskey |
| 5,370,448 | A | 12/1994 | Sterwerf, Jr. |
| 5,374,111 | A | 12/1994 | Den Besten |
| 5,415,462 | A | 5/1995 | Massa |
| 5,417,475 | A | 5/1995 | Graham et al. |
| 5,458,210 | A | 10/1995 | Sollami |
| 5,484,191 | A | 1/1996 | Sollami |
| 5,492,188 | A | 2/1996 | Smith et al. |
| 5,541,006 | A | 7/1996 | Conley |
| 5,551,760 | A | 9/1996 | Sollami |
| 5,607,206 | A | 3/1997 | Siddle |
| 5,628,549 | A | 5/1997 | Ritchey |
| 5,647,641 | A | 7/1997 | Sulosky et al. |
| 5,720,528 | A | 2/1998 | Ritchey |
| 5,725,283 | A | 3/1998 | O'Neill |
| 5,823,632 | A | 10/1998 | Burkett |
| 5,924,501 | A | 7/1999 | Tibbitts |
| 5,931,542 | A | 8/1999 | Britzke |
| 5,934,854 | A | 8/1999 | Krautkremer et al. |
| 5,992,405 | A | 11/1999 | Sollami |
| D420,013 | S | 2/2000 | Warren |
| 6,019,434 | A | 2/2000 | Emmerich |
| 6,102,486 | A | 8/2000 | Briese |
| 6,176,552 | B1 | 1/2001 | Topka, Jr. |
| 6,196,340 | B1 | 3/2001 | Jensen et al. |
| 6,199,451 | B1 | 3/2001 | Sollami |
| 6,220,376 | B1 | 4/2001 | Lundell |
| 6,250,535 | B1 | 6/2001 | Sollami |
| 6,331,035 | B1 | 12/2001 | Montgomery, Jr. |
| 6,341,823 | B1 | 1/2002 | Sollami |
| 6,357,832 | B1 | 3/2002 | Sollami |
| 6,371,567 | B1 | 4/2002 | Sollami |
| 6,382,733 | B1 | 5/2002 | Parrott |
| 6,428,110 | B1 | 8/2002 | Ritchey et al. |
| 6,508,516 | B1 | 1/2003 | Kammerer |
| D471,211 | S | 3/2003 | Sollami |
| 6,585,326 | B2 | 7/2003 | Sollami |
| 6,685,273 | B1 | 2/2004 | Sollami |
| 6,692,083 | B2 | 2/2004 | Latham |
| D488,170 | S | 4/2004 | Sollami |
| 6,733,087 | B2 | 5/2004 | Hall |
| 6,739,327 | B2 | 5/2004 | Sollami |
| 6,786,557 | B2 | 9/2004 | Montgomery |
| 6,824,225 | B2 | 11/2004 | Stiffler |
| 6,846,045 | B2 | 1/2005 | Sollami |
| 6,854,810 | B2 | 2/2005 | Montgomery |
| 6,866,343 | B2 | 3/2005 | Holl et al. |
| 6,968,912 | B2 | 11/2005 | Sollami |
| 6,994,404 | B1 | 2/2006 | Sollami |
| 7,097,258 | B2 | 8/2006 | Sollami |
| 7,118,181 | B2 | 10/2006 | Frear |
| 7,150,505 | B2 | 12/2006 | Sollami |
| 7,195,321 | B1 | 3/2007 | Sollami |
| 7,210,744 | B2 | 5/2007 | Montgomery |
| 7,229,136 | B2 | 6/2007 | Sollami |
| 7,234,782 | B2 | 6/2007 | Stehney |
| D554,162 | S | 10/2007 | Hall |
| 7,320,505 | B1 | 1/2008 | Hall |
| 7,338,135 | B1 | 3/2008 | Hall |
| 7,347,292 | B1 | 3/2008 | Hall |
| D566,137 | S | 4/2008 | Hall |
| 7,353,893 | B1 | 4/2008 | Hall |
| 7,384,105 | B2 | 6/2008 | Hall |
| 7,396,086 | B1 | 7/2008 | Hall |
| 7,401,862 | B2 | 7/2008 | Holl et al. |
| 7,401,863 | B1 | 7/2008 | Hall |
| 7,410,221 | B2 | 8/2008 | Hall |
| 7,413,256 | B2 | 8/2008 | Hall |
| 7,413,258 | B2 | 8/2008 | Hall |
| 7,419,224 | B2 | 9/2008 | Hall |
| 7,445,294 | B2 | 11/2008 | Hall |
| D581,952 | S | 12/2008 | Hall |
| 7,464,993 | B2 | 12/2008 | Hall |
| 7,469,756 | B2 | 12/2008 | Hall |
| 7,469,971 | B2 | 12/2008 | Hall |
| 7,469,972 | B2 | 12/2008 | Hall |
| 7,475,948 | B2 | 1/2009 | Hall |
| 7,523,794 | B2 | 4/2009 | Hall |
| 7,568,770 | B2 | 8/2009 | Hall |
| 7,569,249 | B2 | 8/2009 | Hall |
| 7,571,782 | B2 | 8/2009 | Hall |
| 7,575,425 | B2 | 8/2009 | Hall |
| 7,588,102 | B2 | 9/2009 | Hall |
| 7,594,703 | B2 | 9/2009 | Hall |
| 7,600,544 | B1 | 10/2009 | Sollami |
| 7,600,823 | B2 | 10/2009 | Hall |
| 7,628,233 | B1 | 12/2009 | Hall |
| 7,635,168 | B2 | 12/2009 | Hall |
| 7,637,574 | B2 | 12/2009 | Hall |
| 7,648,210 | B2 | 1/2010 | Hall |
| 7,665,552 | B2 | 2/2010 | Hall |
| 7,669,938 | B2 | 3/2010 | Hall |
| 7,681,338 | B2 | 3/2010 | Hall |
| 7,712,693 | B2 | 5/2010 | Hall |
| 7,717,365 | B2 | 5/2010 | Hall |
| 7,722,127 | B2 | 5/2010 | Hall |
| 7,789,468 | B2 | 9/2010 | Sollami |
| 7,832,808 | B2 | 11/2010 | Hall |
| 7,883,155 | B2 | 2/2011 | Sollami |
| 7,950,745 | B2 | 5/2011 | Sollami |
| 7,963,617 | B2 | 6/2011 | Hall |
| 7,992,944 | B2 | 8/2011 | Hall |
| 7,992,945 | B2 | 8/2011 | Hall |
| 7,997,660 | B2 | 8/2011 | Monyak et al. |
| 7,997,661 | B2 | 8/2011 | Hall |
| 8,007,049 | B2 | 8/2011 | Fader |
| 8,007,051 | B2 | 8/2011 | Hall |
| 8,029,068 | B2 | 10/2011 | Hall |
| 8,033,615 | B2 | 10/2011 | Hall |
| 8,033,616 | B2 | 10/2011 | Hall |
| 8,038,223 | B2 | 10/2011 | Hall |
| 8,061,784 | B2 | 11/2011 | Hall |
| 8,109,349 | B2 | 2/2012 | Hall |
| 8,118,371 | B2 | 2/2012 | Hall |
| 8,136,887 | B2 | 3/2012 | Hall |
| 8,201,892 | B2 | 6/2012 | Hall |
| 8,215,420 | B2 | 7/2012 | Hall |
| 8,292,372 | B2 | 10/2012 | Hall |
| 8,414,085 | B2 | 4/2013 | Hall |
| 8,449,039 | B2 | 5/2013 | Hall |

(56) References Cited

U.S. PATENT DOCUMENTS

| | | | | |
|---|---|---|---|---|
| 8,485,609 | B2 | 7/2013 | Hall | |
| 8,500,209 | B2 | 8/2013 | Hall | |
| 8,540,320 | B2 | 9/2013 | Sollami | |
| RE44,690 | E | 1/2014 | Sollami | |
| 8,622,482 | B2 | 1/2014 | Sollami | |
| 8,622,483 | B2 | 1/2014 | Sollami | |
| 8,646,848 | B2 | 2/2014 | Hall | |
| 8,728,382 | B2 | 5/2014 | Hall | |
| 8,740,314 | B2 | 6/2014 | O'Neill | |
| 9,004,610 | B2 | 4/2015 | Erdmann et al. | |
| 9,028,008 | B1 | 5/2015 | Bookhamer | |
| 9,039,099 | B2 | 5/2015 | Sollami | |
| 9,316,061 | B2 | 4/2016 | Hall | |
| 9,512,719 | B2 * | 12/2016 | Jonsrud | E21C 35/193 |
| 9,518,464 | B2 | 12/2016 | Sollami | |
| 9,879,531 | B2 | 1/2018 | Sollami | |
| 9,909,416 | B1 | 3/2018 | Sollami | |
| 9,976,418 | B2 | 5/2018 | Sollami | |
| 9,988,903 | B2 | 6/2018 | Sollami | |
| 9,995,137 | B2 * | 6/2018 | O'Neill | E21C 35/197 |
| 10,072,501 | B2 | 9/2018 | Sollami | |
| 10,105,870 | B1 | 10/2018 | Sollami | |
| 10,107,097 | B1 | 10/2018 | Sollami | |
| 10,107,098 | B2 | 10/2018 | Sollami | |
| 10,180,065 | B1 | 1/2019 | Sollami | |
| 10,260,342 | B1 | 4/2019 | Sollami | |
| 10,323,515 | B1 | 6/2019 | Sollami | |
| 10,337,324 | B2 | 7/2019 | Sollami | |
| 10,370,966 | B1 | 8/2019 | Sollami | |
| 10,385,689 | B1 | 8/2019 | Sollami | |
| 10,415,386 | B1 | 9/2019 | Sollami | |
| 10,502,056 | B2 | 12/2019 | Sollami | |
| 10,947,844 | B1 | 3/2021 | Sollami | |
| 10,954,785 | B2 | 3/2021 | Sollami | |
| 11,208,887 | B2 * | 12/2021 | Johnson | B28D 1/188 |
| 2002/0063467 | A1 | 5/2002 | Taitt | |
| 2002/0074850 | A1 | 6/2002 | Montgomery, Jr. | |
| 2002/0074851 | A1 | 6/2002 | Montgomery, Jr. | |
| 2002/0109395 | A1 | 8/2002 | Sollami | |
| 2002/0167216 | A1 | 11/2002 | Sollami | |
| 2002/0192025 | A1 | 12/2002 | Johnson | |
| 2003/0015907 | A1 | 1/2003 | Sollami | |
| 2003/0047985 | A1 | 3/2003 | Stiffler | |
| 2003/0052530 | A1 | 3/2003 | Sollami | |
| 2003/0122414 | A1 | 7/2003 | Sollami | |
| 2003/0209366 | A1 | 11/2003 | McAlvain | |
| 2004/0004389 | A1 | 1/2004 | Latham | |
| 2004/0026132 | A1 | 2/2004 | Hall et al. | |
| 2004/0174065 | A1 | 9/2004 | Sollami | |
| 2005/0212345 | A1 | 9/2005 | Sleep et al. | |
| 2006/0071538 | A1 | 4/2006 | Sollami | |
| 2006/0186724 | A1 | 8/2006 | Stehney | |
| 2006/0261663 | A1 | 11/2006 | Sollami | |
| 2007/0013224 | A1 | 1/2007 | Stehney | |
| 2007/0040442 | A1 | 2/2007 | Weaver | |
| 2007/0052279 | A1 | 3/2007 | Sollami | |
| 2008/0035386 | A1 | 2/2008 | Hall et al. | |
| 2008/0036276 | A1 | 2/2008 | Hall et al. | |
| 2008/0036283 | A1 | 2/2008 | Hall et al. | |
| 2008/0100124 | A1 | 5/2008 | Hall et al. | |
| 2008/0145686 | A1 | 6/2008 | Mirchandani | |
| 2008/0164747 | A1 | 7/2008 | Weaver et al. | |
| 2008/0284234 | A1 | 11/2008 | Hall et al. | |
| 2009/0146491 | A1 | 6/2009 | Fader et al. | |
| 2009/0160238 | A1 | 6/2009 | Hall et al. | |
| 2009/0184564 | A1 | 7/2009 | Brady | |
| 2009/0256413 | A1 | 10/2009 | Majagi | |
| 2009/0261646 | A1 | 10/2009 | Ritchie et al. | |
| 2010/0045094 | A1 | 2/2010 | Sollami | |
| 2010/0244545 | A1 | 9/2010 | Hall | |
| 2010/0253130 | A1 | 10/2010 | Sollami | |
| 2010/0320003 | A1 | 12/2010 | Sollami | |
| 2010/0320829 | A1 | 12/2010 | Sollami | |
| 2011/0006588 | A1 | 1/2011 | Monyak et al. | |
| 2011/0089747 | A1 | 4/2011 | Helsel | |
| 2011/0175430 | A1 | 7/2011 | Heiderich et al. | |
| 2011/0204703 | A1 | 8/2011 | Sollami | |
| 2011/0254350 | A1 | 10/2011 | Hall | |
| 2011/0314614 | A1 | 12/2011 | Barnhart et al. | |
| 2012/0001475 | A1 | 1/2012 | Dubay et al. | |
| 2012/0027514 | A1 | 2/2012 | Hall | |
| 2012/0056465 | A1 | 3/2012 | Gerer et al. | |
| 2012/0068527 | A1 | 3/2012 | Erdmann | |
| 2012/0104830 | A1 | 5/2012 | Monyak et al. | |
| 2012/0181845 | A1 | 7/2012 | Sollami | |
| 2012/0242136 | A1 | 9/2012 | Ojanen | |
| 2012/0248663 | A1 | 10/2012 | Hall | |
| 2012/0261977 | A1 | 10/2012 | Hall | |
| 2012/0280559 | A1 | 11/2012 | Watson | |
| 2012/0286559 | A1 | 11/2012 | Sollami | |
| 2012/0319454 | A1 | 12/2012 | Swope | |
| 2013/0169023 | A1 | 7/2013 | Monyak | |
| 2013/0181501 | A1 | 7/2013 | Hall et al. | |
| 2013/0199693 | A1 | 8/2013 | Tank et al. | |
| 2013/0307316 | A1 | 11/2013 | Roetsch et al. | |
| 2014/0035346 | A1 | 2/2014 | Fundakowski et al. | |
| 2014/0110991 | A1 | 4/2014 | Sollami | |
| 2014/0232172 | A1 | 8/2014 | Roth et al. | |
| 2014/0262541 | A1 | 9/2014 | Parsana et al. | |
| 2014/0326516 | A1 | 11/2014 | Haugvaldstad | |
| 2015/0028656 | A1 | 1/2015 | Sollami | |
| 2015/0035343 | A1 | 2/2015 | Ojanen | |
| 2015/0137579 | A1 | 5/2015 | Lachmann et al. | |
| 2015/0198040 | A1 | 7/2015 | Voitic et al. | |
| 2015/0240634 | A1 | 8/2015 | Sollami | |
| 2015/0285074 | A1 | 10/2015 | Sollami | |
| 2015/0292325 | A1 | 10/2015 | Sollami | |
| 2015/0300166 | A1 | 10/2015 | Ries et al. | |
| 2015/0308488 | A1 | 10/2015 | Kahl | |
| 2015/0315910 | A1 | 11/2015 | Sollami | |
| 2015/0354285 | A1 | 12/2015 | Hall | |
| 2016/0102550 | A1 | 4/2016 | Paros et al. | |
| 2016/0194956 | A1 | 7/2016 | Sollami | |
| 2016/0229084 | A1 | 8/2016 | Lehnert | |
| 2016/0237818 | A1 | 8/2016 | Weber et al. | |
| 2017/0001292 | A1 | 1/2017 | Harrison | |
| 2017/0089198 | A1 | 3/2017 | Sollami | |
| 2017/0101867 | A1 | 4/2017 | Hall et al. | |
| 2017/0342831 | A1 | 11/2017 | Weber et al. | |
| 2020/0003055 | A1 * | 1/2020 | Sollami | B28D 1/188 |
| 2020/0157890 | A1 | 5/2020 | Cuillier De Maindreville et al. | |

FOREIGN PATENT DOCUMENTS

| | | | |
|---|---|---|---|
| DE | 202012100353 | | 6/2013 |
| DE | 102015121953 | | 7/2016 |
| DE | 102016118658 | | 3/2017 |
| EP | 3214261 | | 9/2017 |
| GB | 1114156 | | 5/1968 |
| GB | 1218308 | | 1/1971 |
| GB | 2010356 | | 6/1979 |
| GB | 2483157 | | 2/2012 |
| GB | 2534370 | | 7/2016 |
| WO | 2008105915 | A2 | 9/2008 |
| WO | 2008105915 | A3 | 9/2008 |
| WO | 2009006612 | | 1/2009 |

* cited by examiner

DETAIL D

SECTION C-C

SECTION F-F

SECTION G-G

SECTION H-H

SECTION H

SECTION J-J

SECTION K-K

SECTION N-N

SECTION O-O

SECTION X-X

SECTION P-P

SECTION Q-Q

SECTION S-S

SECTION T-T

SECTION U-U

SECTION V-V

SECTION W-W

BIT HOLDER INSERTION AND EXTRACTION SYSTEM

TECHNICAL FIELD

This disclosure relates to bit assemblies for road milling, mining, and trenching equipment, and more particularly, to a system for insertion and extraction of a bit holder into and from a bit holder block.

BACKGROUND

Road milling, mining, and trenching equipment utilizes bits traditionally set in a bit assembly having a bit holder and a bit holder block. In one embodiment, the bit is retained by the bit holder and the bit holder is retained in the bit holder block. In another embodiment a unitary bit/holder is retained in the bit holder block. A plurality of the bit assemblies are mounted on the outside of a rotatable drum in staggered positions, typically in a V-shaped or spiral configuration, in an effort to create the smoothest road milling. The combinations of bit assemblies have been utilized to remove material from the terra firma, such as degrading the surface of the earth, minerals, cement, concrete, macadam or asphalt pavement. Individual bits, bit holders, and bit holder blocks, hereinafter referred to as base blocks, may wear down or break over time due to the harsh road degrading environment. Previously, bit holders would be assembled into base blocks using a drive pin and an insertion hammer which requires a person to hammer 15 to 20 hammer impacts to insert the bit holder into the base block bore. A need has developed to provide an improved system for both insertion of the bit holder into the base block and extraction of the bit holder from the base block, the improved system providing quicker insertion and extraction procedures, less down time during equipment changes, and less human strength required to operate the system.

SUMMARY

This disclosure relates generally to an insertion and extraction system for inserting and extracting a bit holder into and from a bore of a base block. One implementation of the teachings herein an insertion system for inserting a slotted shank bit holder into a base block, including: a hydraulic cylinder including a hydraulic cylinder piston rod extending from a forward end of the hydraulic cylinder to a distal end of the hydraulic cylinder, the hydraulic cylinder adapted to be mounted on a forward end of the bit holder; an end cover including a bore, the end cover adapted to be mounted on a rear face of the base block; and a bolt axially extending through the hydraulic cylinder piston rod, a bore of the bit holder, a bore of the base block, and the bore of the end cover, the bolt including external threading adjacent a distal end of the bolt.

Another implementation of the teachings herein is an extraction system for extracting a bit holder from a base block, including: an extraction cup including a bore axially extending from a forward end of the extraction cup to a distal end of the extraction cup, the extraction cup adapted to be mounted about a body of the bit holder; a hydraulic cylinder including a hydraulic cylinder piston rod extending from a forward end of the hydraulic cylinder to a distal end of the hydraulic cylinder, the hydraulic cylinder adapted to be mounted on the forward end of the extraction cup; a bolt axially extending through the hydraulic cylinder piston rod, the bore of the extraction cup, a bore of the bit holder, and a bore of the base block, the bolt including external threading adjacent a distal end of the bolt; and a nut including internal threading mounted adjacent a rear face of the base block, the nut adapted to engage the external threading of the bolt.

Yet another implementation of the teachings herein is a method of inserting a bit holder into a bore of a base block, including: mounting a distal end of the bit holder partially into a forward end of the bore of the base block; mounting a distal end of a hydraulic cylinder to a forward end of the bit holder; mounting an end cover to a rear face of the base block; inserting a distal end of a bolt axially through a forward end of a bore of the hydraulic cylinder, through a bore of the bit holder, through the bore of the base block, and through a bore of the end cover; and mounting a nut onto the distal end of the bolt.

Yet another implementation of the teachings herein is a method of extracting a bit holder from a bore of a base block, including: mounting a body of the bit holder into distal end of a bore of an extraction cup; mounting a distal end of a hydraulic cylinder to a forward end of the extraction cup; inserting a distal end of a bolt axially through a forward end of a bore of the hydraulic cylinder, through a bore of the bit holder, and through the bore of the base block; and mounting a nut onto the distal end of the bolt.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

FIG. 117 is a perspective view of the first embodiment of the insertion and extraction system assembled onto the third embodiment of the bit assembly, without a bit, prior to extracting the bit holder from the base block bore, in accordance with implementations of this disclosure;

FIG. 118 is a perspective view of the first embodiment of the insertion and extraction system, showing the compact hydraulic cylinder connected to a manually operated hydraulic pump, assembled onto the third embodiment of the bit assembly, without a bit, prior to extracting the bit holder from the base block bore, in accordance with implementations of this disclosure;

FIG. 119 is a perspective view of the first embodiment of the insertion and extraction system, showing the compact hydraulic cylinder connected to a pneumatically operated hydraulic pump, assembled onto the third embodiment of the bit assembly, without a bit, prior to extracting the bit holder from the base block bore, in accordance with implementations of this disclosure;

Figure 120:
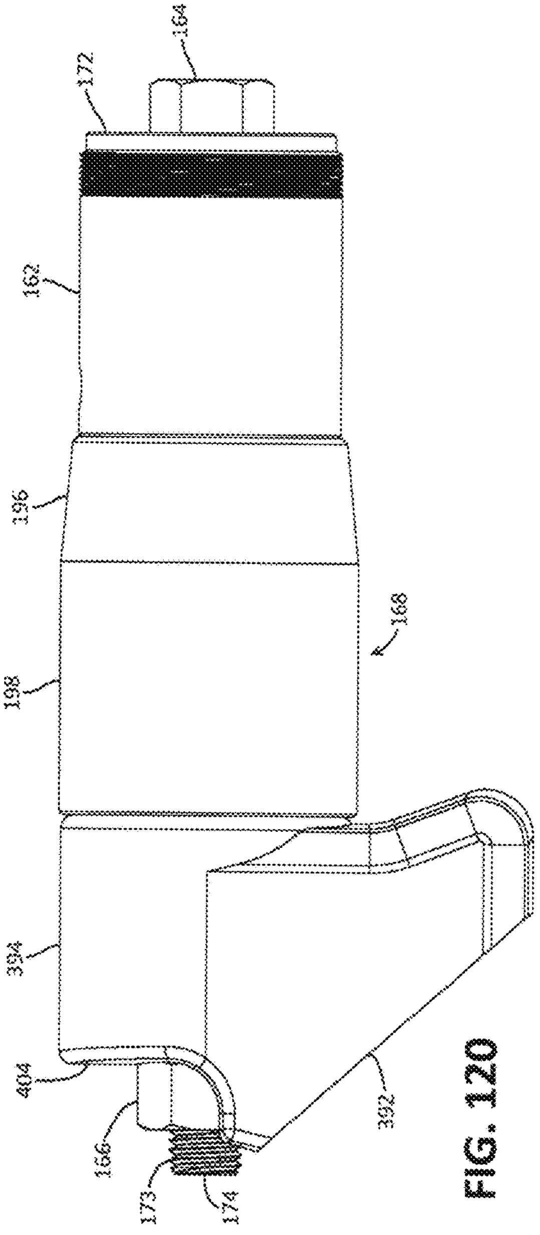
Figure 121:
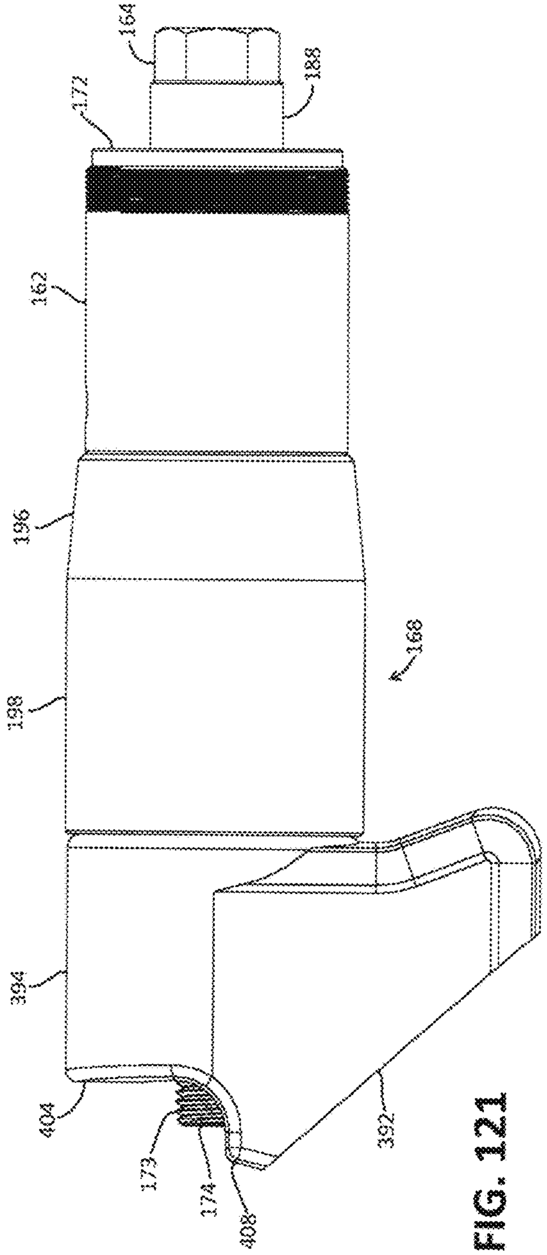
Figure 123:
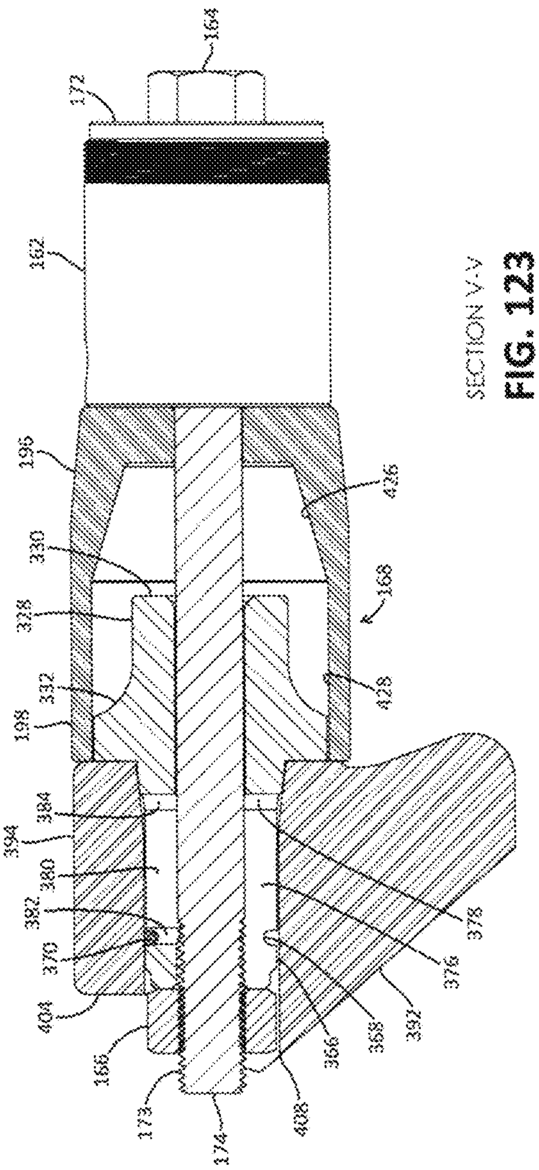
Figure 125:
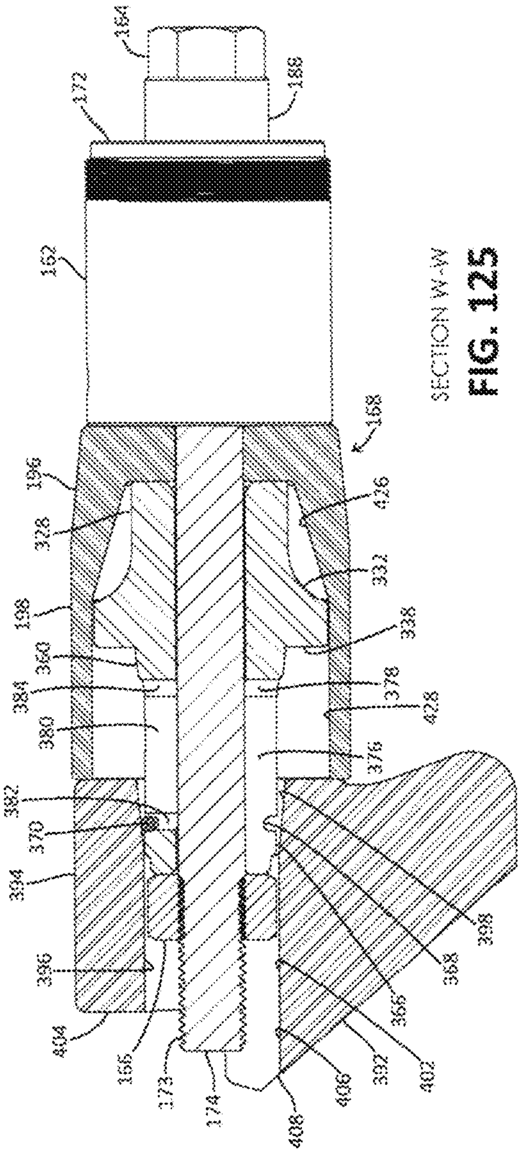
Figure 122:
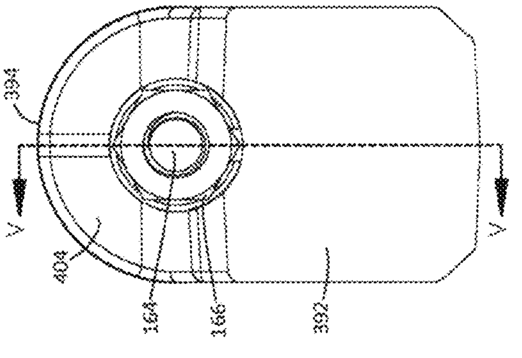
Figure 124:
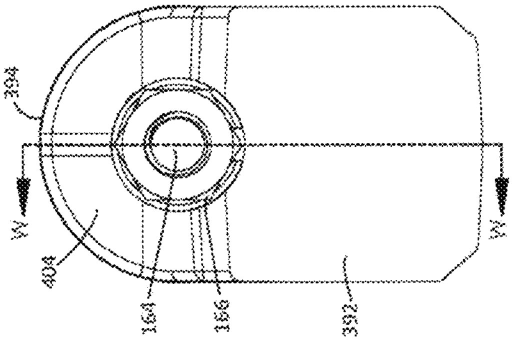
Figure 126:
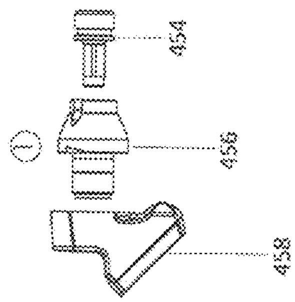
PRIOR ART FIG. 126
Figure 127:
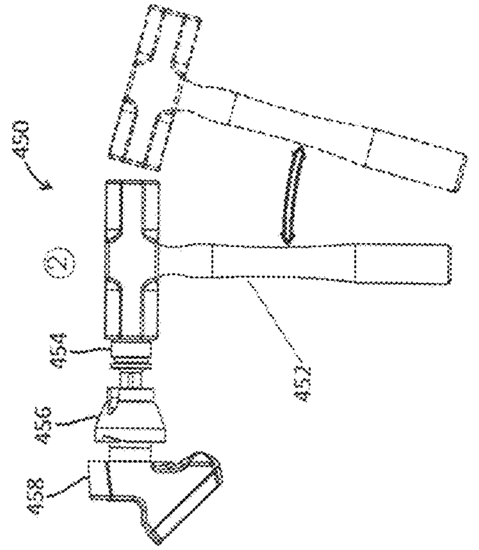
PRIOR ART FIG. 127
Figure 128:
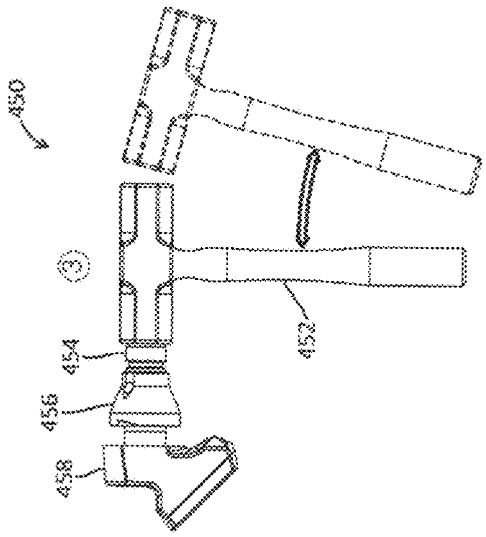
PRIOR ART FIG. 128
Figure 129:
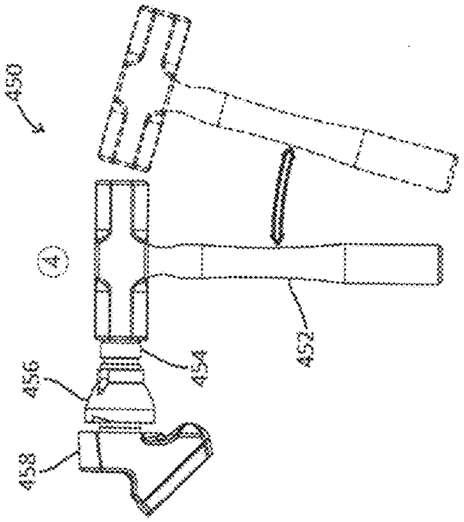
PRIOR ART FIG. 129
Figure 130:
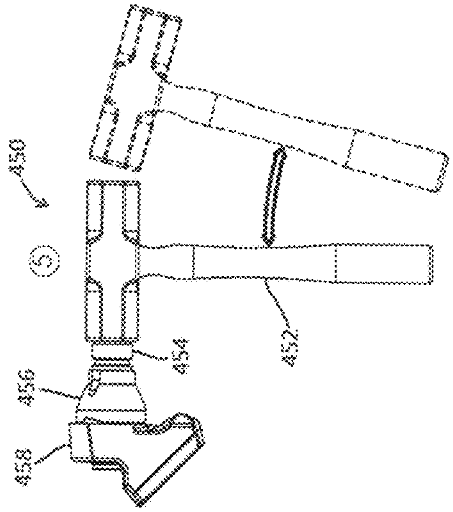
PRIOR ART FIG. 130
Figure 132:
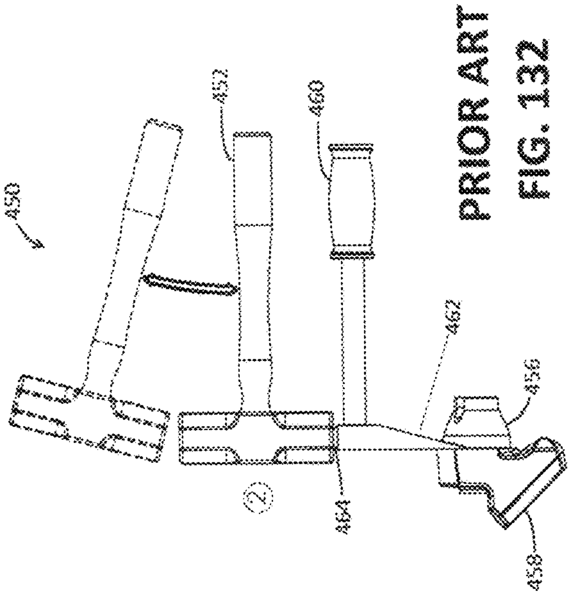
PRIOR ART FIG. 132
Figure 134:
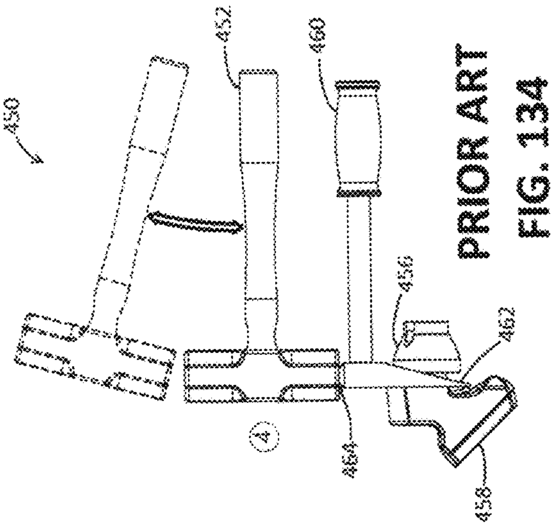
PRIOR ART FIG. 134
Figure 131:
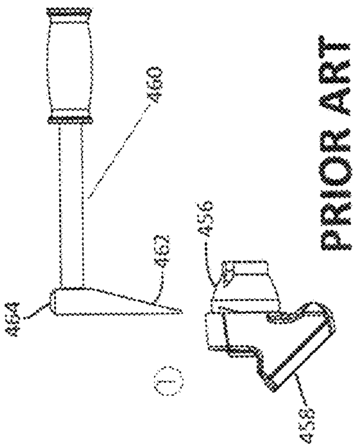
PRIOR ART FIG. 131
Figure 133:
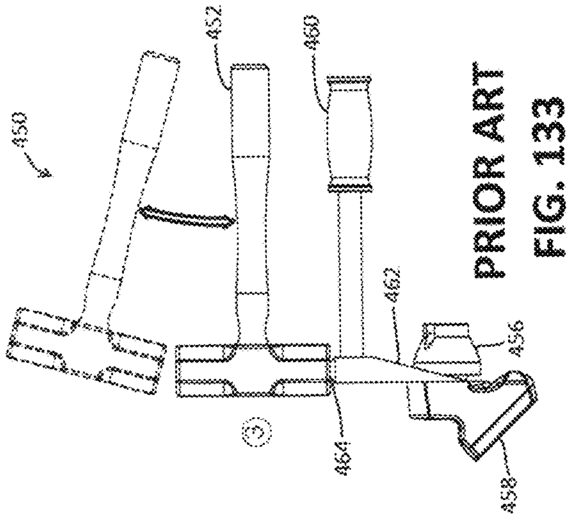
PRIOR ART FIG. 133

FIG. 120 is a side elevation view of the first embodiment of the insertion and extraction system, showing the bolt, the compact hydraulic cylinder, the extraction cup, and the nut, assembled with the third embodiment of the bit assembly, without a bit, showing the third embodiment of the bit holder, the third embodiment of the base block, and the end cover, prior to extracting the bit holder from the base block bore, in accordance with implementations of this disclosure;

FIG. 121 is a side elevation view of the first embodiment of the insertion and extraction system, showing the bolt, the compact hydraulic cylinder, the extraction cup, and the nut, assembled with the third embodiment of the bit assembly, without a bit, showing the third embodiment of the bit holder, the third embodiment of the base block, and the end cover, after partially extracting the bit holder from the base block bore, in accordance with implementations of this disclosure;

FIG. 122 is a rear elevation view of the first embodiment of the insertion and extraction system, showing the bolt, the compact hydraulic cylinder, the extraction cup, and the nut, assembled with the third embodiment of the bit assembly, without a bit, showing the bit holder, the base block, and the end cover, prior to extracting the bit holder from the base block bore, in accordance with implementations of this disclosure;

FIG. 123 is a cross-sectional view of the first embodiment of the insertion and extraction system, taken along line V-V of FIG. 122, showing the bolt, the compact hydraulic cylinder, the extraction cup, and the nut, assembled with the third embodiment of the bit assembly, without a bit, showing the bit holder, the base block, and the end cover, prior to extracting the bit holder from the base block bore, in accordance with implementations of this disclosure;

FIG. 124 is a rear elevation view of the first embodiment of the insertion and extraction system, showing the bolt, the compact hydraulic cylinder, the extraction cup, and the nut, assembled with the third embodiment of the bit assembly, without a bit, showing the bit holder, the base block, and the end cover, after partially extracting the bit holder from the base block bore, in accordance with implementations of this disclosure;

FIG. 125 is a cross-sectional view of the first embodiment of the insertion and extraction system, taken along line W-W of FIG. 124, showing the bolt, the compact hydraulic cylinder, the extraction cup, and the nut, assembled with the third embodiment of the bit assembly, without a bit, showing the bit holder, the base block, and the end cover, after partially extracting the bit holder from the base block bore, in accordance with implementations of this disclosure;

FIG. 126 is a side elevation view of a prior art insertion and extraction system, showing a bit holder, a base block, and a drive pin;

FIG. 127 is a side elevation view of the prior art insertion and extraction system, showing the bit holder, the base block, the drive pin, and an insertion hammer, prior to a user hammering the bit holder into the base block;

FIG. 128 is a side elevation view of the prior art insertion and extraction system, showing the bit holder, the base block, the drive pin, and the insertion hammer, as the user is hammering the bit holder into the base block;

FIG. 129 is a side elevation view of the prior art insertion and extraction system, showing the bit holder, the base block, the drive pin, and the insertion hammer, as the user is hammering the bit holder into the base block;

FIG. 130 is a side elevation view of the prior art insertion and extraction system, showing the bit holder, the base block, the drive pin, and the insertion hammer, once the bit holder is fully mounted into the base block;

FIG. 131 is a side elevation view of the prior art insertion and extraction system, showing the bit holder, the base block, and a holder removal tool, prior to a the user's removal of the bit holder from the base block;

FIG. 132 is a side elevation view of the prior art insertion and extraction system, showing the bit holder, the base block, the holder removal tool, and the insertion hammer, as the user is hammering the holder removal tool to extract the bit holder from the base block;

FIG. 133 is a side elevation view of the prior art insertion and extraction system, showing the bit holder, the base block, the holder removal tool, and the insertion hammer, as the user is hammering the holder removal tool to extract the bit holder from the base block; and FIG. 134 is a side elevation view of the prior art insertion and extraction system, showing the bit holder, the base block, the holder removal tool, and the insertion hammer, once the bit holder is extracted from the base block.

DETAILED DESCRIPTION

Road milling, mining, and trenching equipment utilizes bits traditionally set in a bit assembly having a bit holder and a bit holder block. In one embodiment, the bit is retained by the bit holder and the bit holder is retained in the bit holder block. In another embodiment a unitary bit/holder is retained in the bit holder block. A plurality of the bit assemblies are mounted on the outside of a rotatable drum in staggered positions, typically in a V-shaped or spiral configuration, in an effort to create the smoothest road milling. The combinations of bit assemblies have been utilized to remove material from the terra firma, such as degrading the surface of the earth, minerals, cement, concrete, macadam or asphalt pavement. Individual bits, bit holders, and bit holder blocks, hereinafter referred to as base blocks, may wear down or break over time due to the harsh road degrading environment. Previously, slotted shank bit holders would be assembled into base blocks using a drive pin and an insertion hammer which requires a person to hammer 15 to 20 hammer impacts to fully insert the bit holder into the base block bore. A need has developed to provide an improved system for both insertion of the bit holder into the base block and extraction of the bit holder from the base block, the improved system providing quicker insertion and extraction procedures, less down time during equipment changes, and less human strength required to operate the system.

A prior art insertion and extraction system 450 is shown in FIGS. 126-134, a method of inserting a bit holder 456 into a base block 458 utilizing the prior art insertion and extraction system 450 is shown in FIGS. 126-130, and a method of extracting the bit holder 456 from the base block 458 utilizing the prior art insertion and extraction system 450 is shown in FIGS. 131-134. The insertion and extraction system 450 of the prior art comprises an insertion hammer 452 and a drive pin 454 for the insertion process. To insert the bit holder 456 into the base block 458, a distal end of the bit holder 456 is placed into a bore of the base block 458. A distal end of the drive pin 454 is placed into a bore at a forward end of the bit holder 456. A user must then manually hammer a forward end of the drive pin 454 with the insertion hammer 452 to drive the bit holder 456 into the base block 458 until a bottom of the bit holder 456 body is seated on a front face of the base block 458. This insertion method, using the prior art insertion and extraction system 450, typically requires 15 to 20 hammer impacts to insert the bit holder 456 into the base block 458 bore.

The insertion and extraction system 450 of the prior art further comprises a holder removal tool 460 for the extraction process. To extract the bit holder 456 from the base block 458, a tapered portion 462 at a forward end of the holder removal tool 460 is wedged between the bottom of the bit holder 456 body and the front face of the base block 458, as shown in FIG. 132. A user must then manually hammer a hammer face 464 at the forward end of the holder removal tool 460 with the insertion hammer 452 to remove the bit holder 456 from the base block 458. This extraction method, using the prior art insertion and extraction system 450, typically requires at least 15 hammer impacts to remove the bit holder 456 from the base block 458 borc.

The insertion and extraction system 450 of the prior art requires workers to exert repeated blows with the insertion hammer 452, causing considerable downtime of the road milling machine. A need has developed for an insertion and extraction system that requires less manual force and takes less time to replace broken bit holders.

Figure 42:
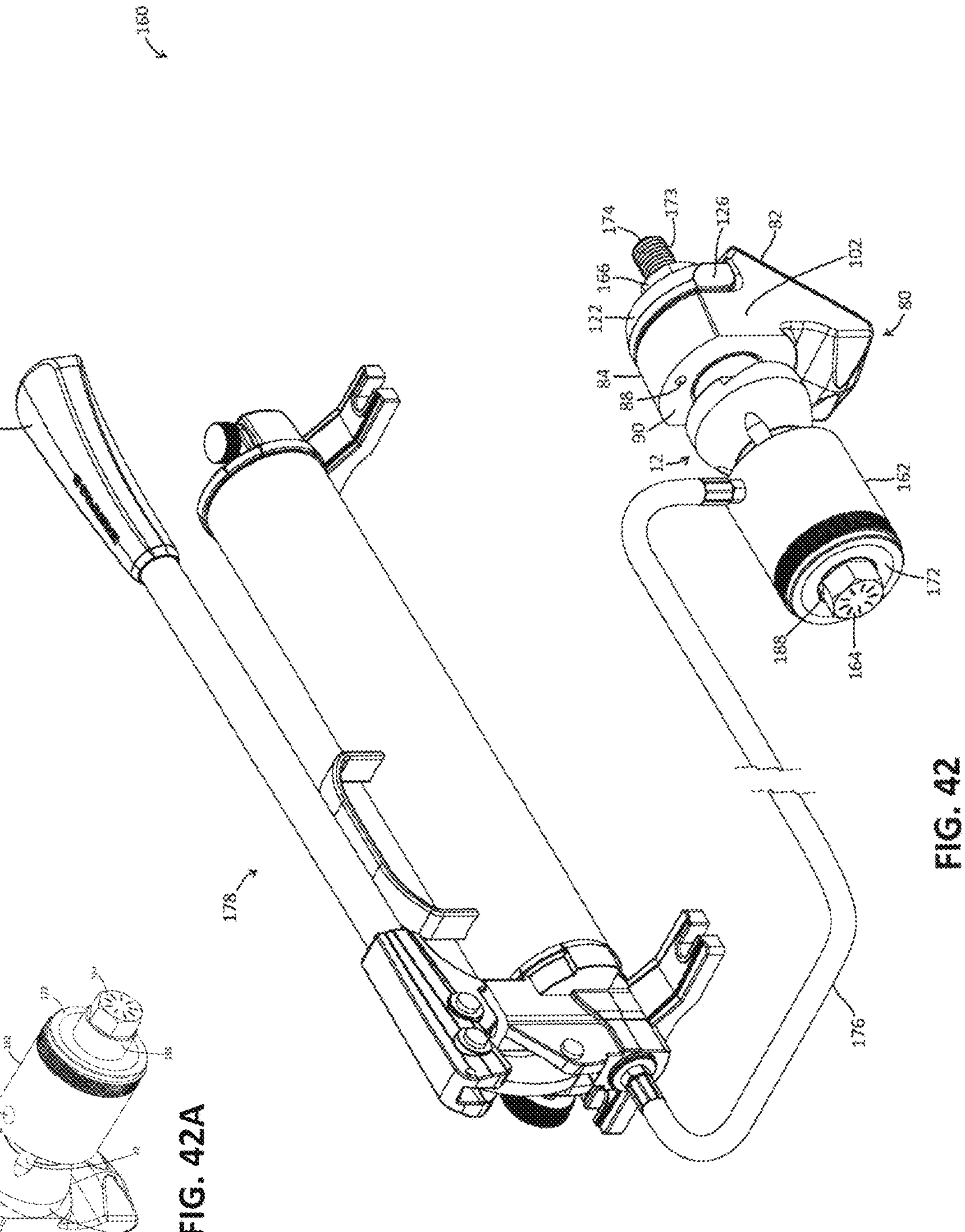
FIG. 42 is a perspective view of the first embodiment of the insertion and extraction system, showing the compact hydraulic cylinder connected to a manually operated hydraulic pump, assembled onto the first embodiment of the bit assembly, without a bit, prior to fully mounting the bit holder in the base block bore, in accordance with implementations of this disclosure.
Figure 42A:
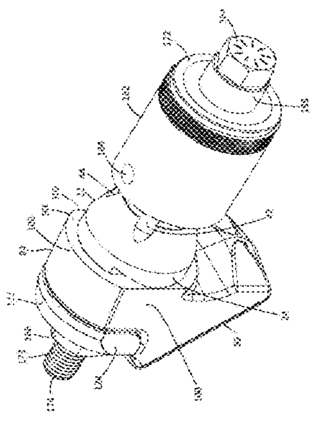
FIG. 42A is a perspective view of the first embodiment of the bit assembly, without a bit, showing a hydraulic cylinder piston extending from a forward end of the hydraulic cylinder to a distal end of the hydraulic cylinder, in accordance with implementations of this disclosure.
Figure 43A:
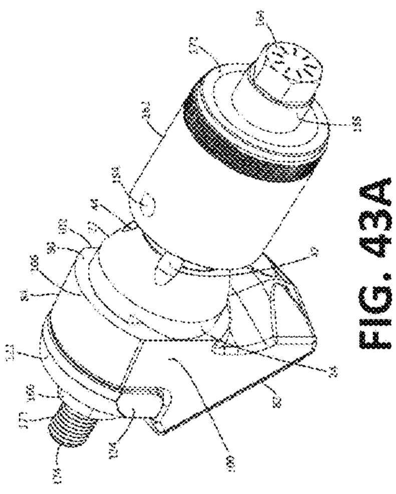
FIG. 43A is a perspective view of the first embodiment of the bit assembly, showing the hydraulic cylinder piston extending from the forward end of the hydraulic cylinder to the distal end of the hydraulic cylinder, in accordance with implementations of this disclosure.
Figure 43:
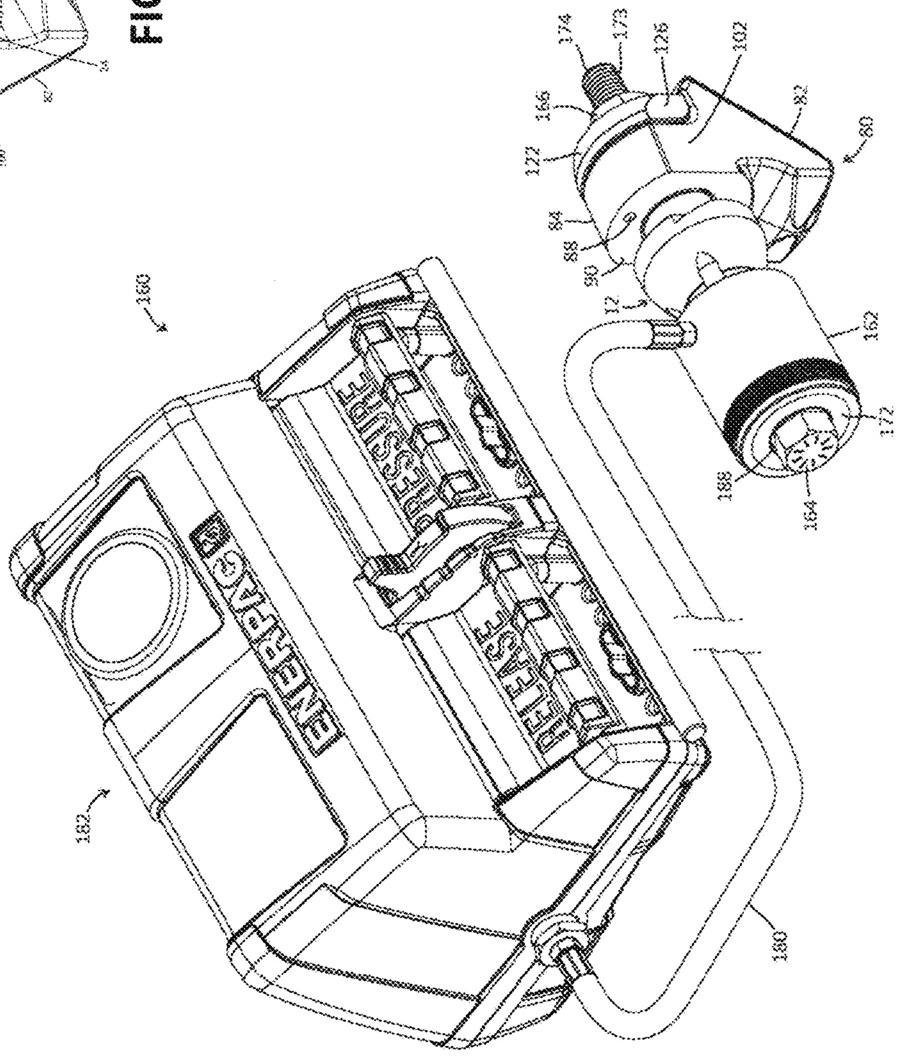
FIG. 43 is a perspective view of the first embodiment of the insertion and extraction system, showing the compact hydraulic cylinder connected to an pneumatically operated hydraulic pump, assembled onto the first embodiment of the bit assembly, without a bit, prior to fully mounting the bit holder in the base block bore, in accordance with implementations of this disclosure.
Figure 44:
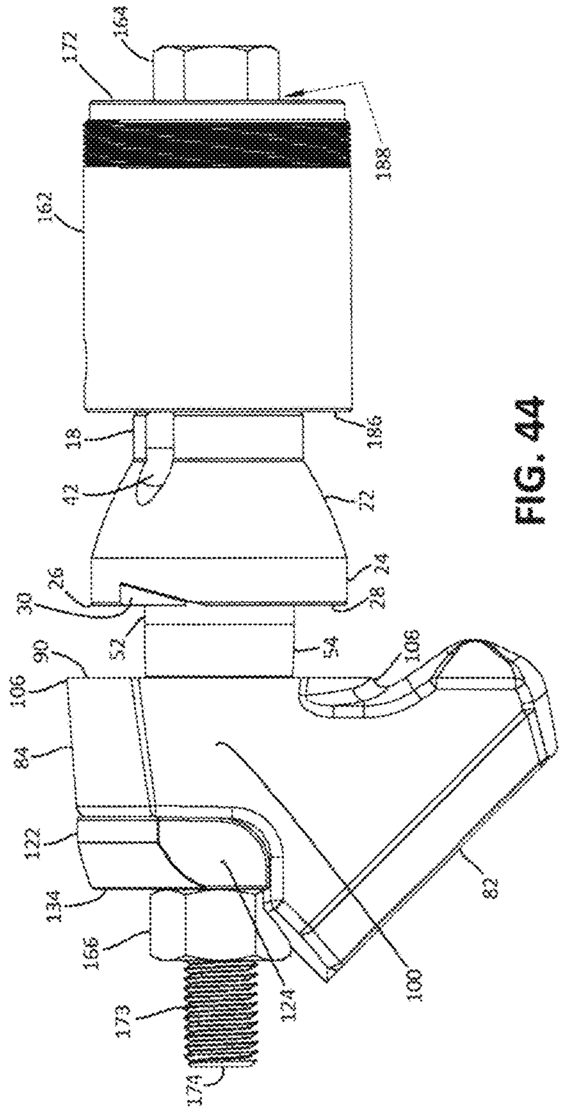
FIG. 44 is a side elevation view of the first embodiment of the insertion and extraction system, showing the bolt, the compact hydraulic cylinder, and the nut, assembled with the first embodiment of the bit assembly, without a bit, showing the bit holder, the base block, and the end cover, prior to fully mounting the bit holder in the base block bore, in accordance with implementations of this disclosure.
Figure 45:
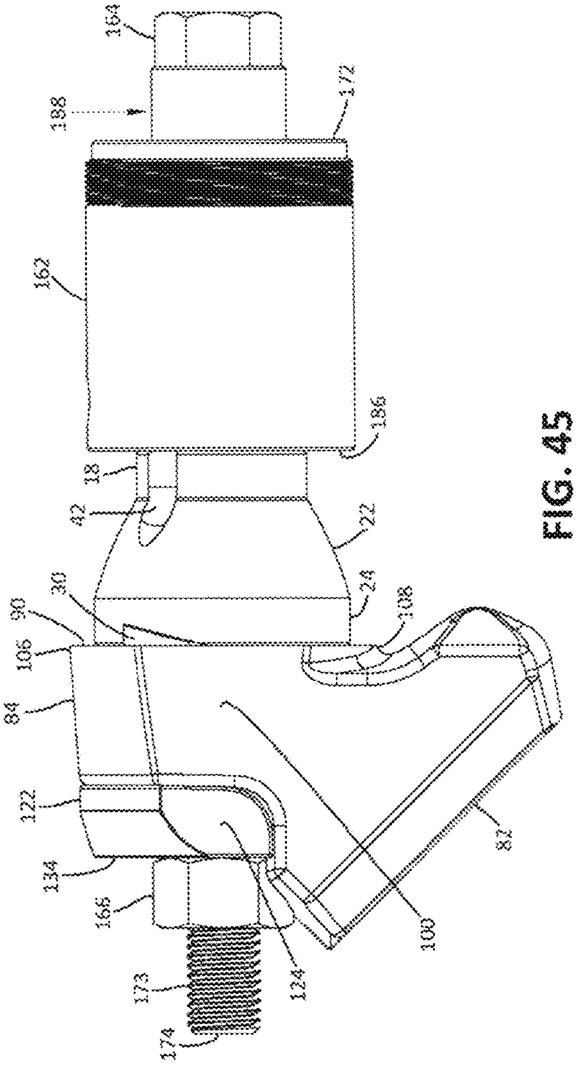
FIG. 45 is a side elevation view of the first embodiment of the insertion and extraction system, showing the bolt, the compact hydraulic cylinder, and the nut, assembled with the first embodiment of the bit assembly, without a bit, showing the bit holder, the base block, and the end cover, after fully mounting the bit holder in the base block bore, in accordance with implementations of this disclosure.
Figure 47:
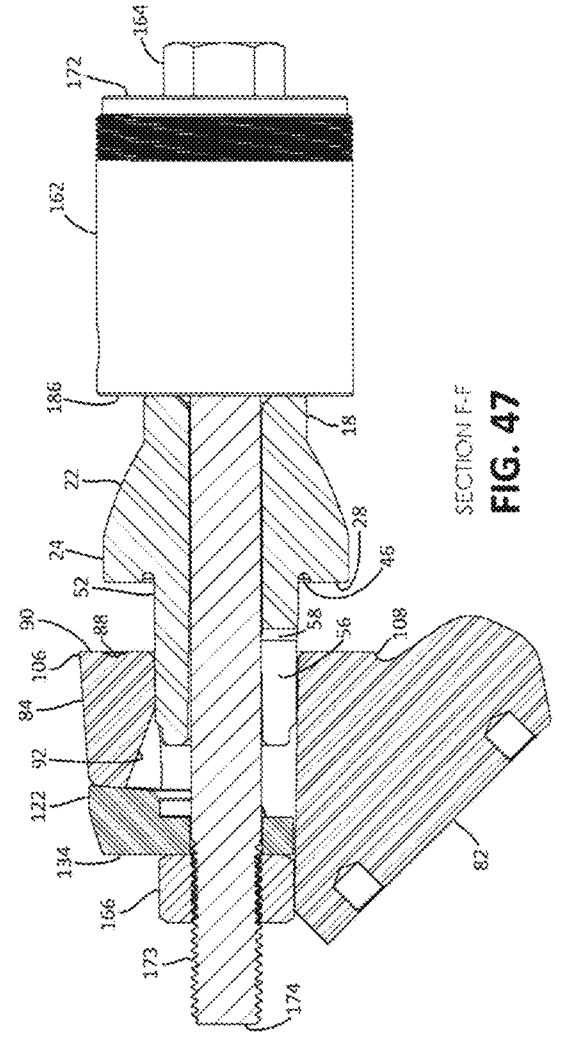
FIG. 47 is a cross-sectional view of the first embodiment of the insertion and extraction system, taken along line F-F of FIG. 46, showing the bolt, the compact hydraulic cylinder, and the nut, assembled with the first embodiment of the bit assembly, without a bit, showing the bit holder, the base block, and the end cover, prior to fully mounting the bit holder in the base block bore, in accordance with implementations of this disclosure.
Figure 49:
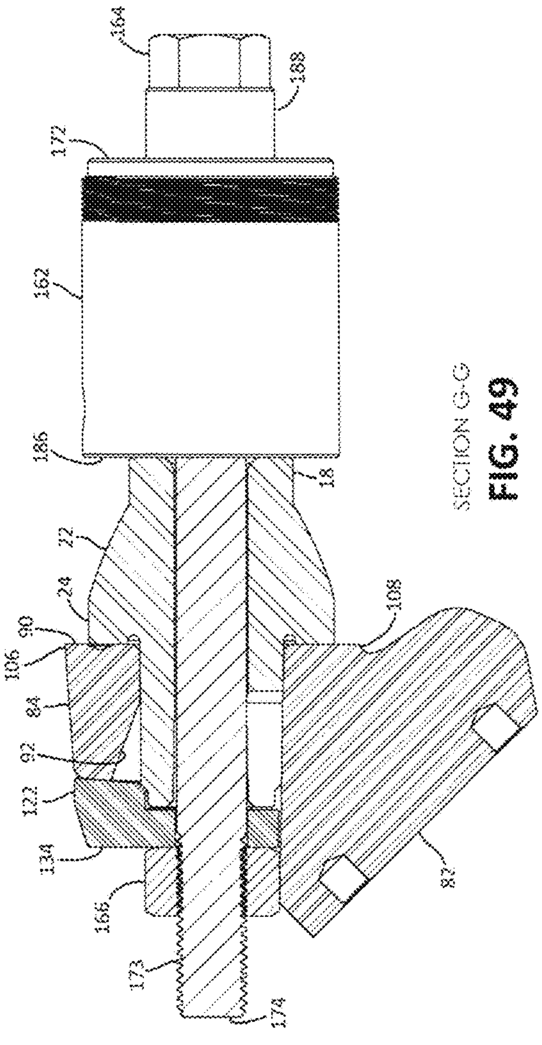
FIG. 49 is a cross-sectional view of the first embodiment of the insertion and extraction system, taken along line G-G of FIG. 48, showing the bolt, the compact hydraulic cylinder, and the nut, assembled with the first embodiment of the bit assembly, without a bit, showing the bit holder, the base block, and the end cover, after fully mounting the bit holder in the base block bore, in accordance with implementations of this disclosure.
Figure 46:
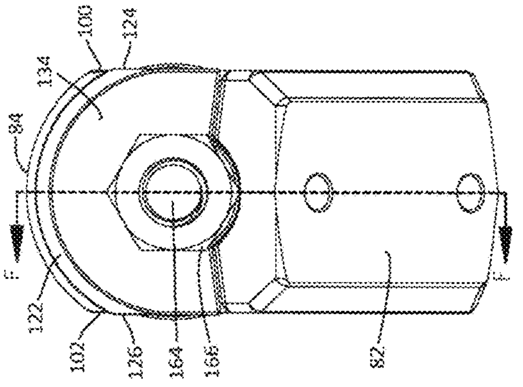
FIG. 46 is a rear elevation view of the first embodiment of the insertion and extraction system, showing the bolt, the compact hydraulic cylinder, and the nut, assembled with the first embodiment of the bit assembly, without a bit, showing the bit holder, the base block, and the end cover, prior to fully mounting the bit holder in the base block bore, in accordance with implementations of this disclosure.
Figure 48:
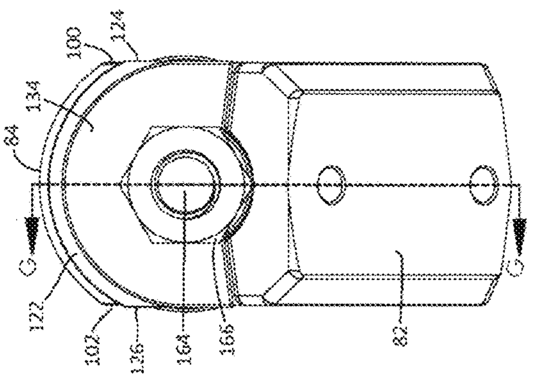
FIG. 48 is a rear elevation view of the first embodiment of the insertion and extraction system, showing the bolt, the compact hydraulic cylinder, and the nut, assembled with the first embodiment of the bit assembly, without a bit, showing the bit holder, the base block, and the end cover, after fully mounting the bit holder in the base block bore, in accordance with implementations of this disclosure.
Figure 51:
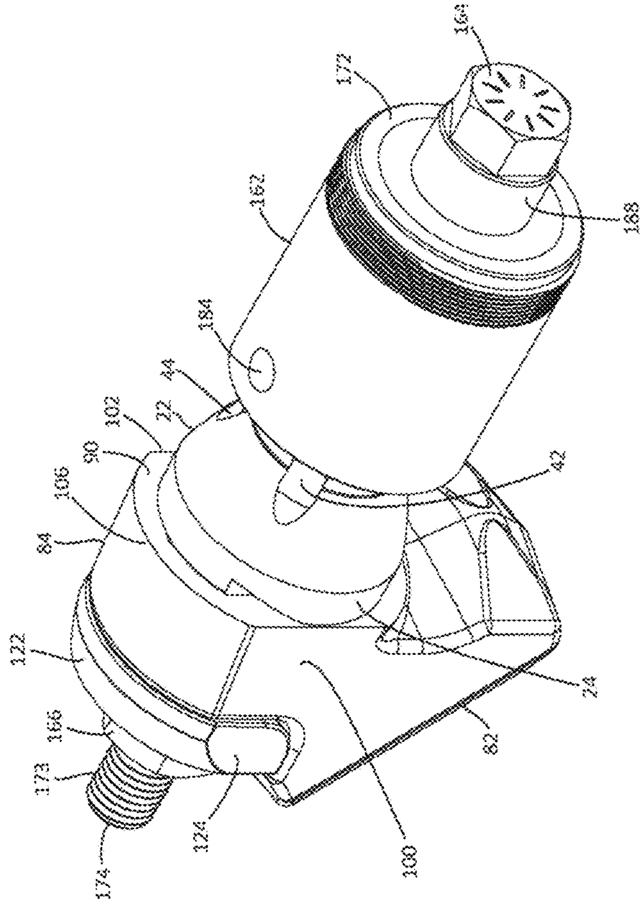
FIG. 51 is a perspective view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, after fully mounting the bit holder in the base block bore, in accordance with implementations of this disclosure.
Figure 50:
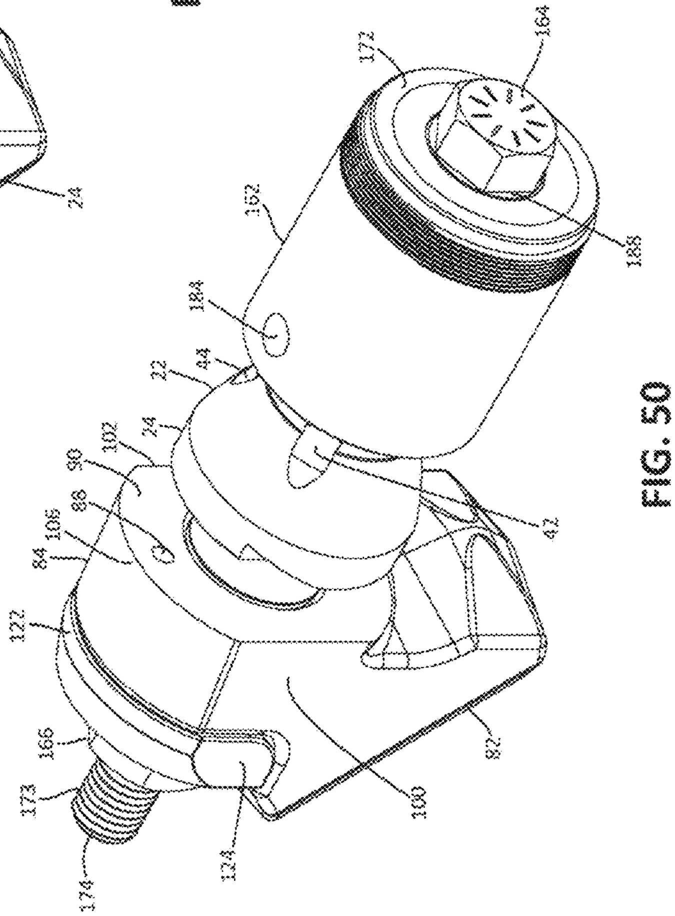
FIG. 50 is a perspective view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, prior to fully mounting the bit holder in the base block bore, in accordance with implementations of this disclosure.
Figure 52:
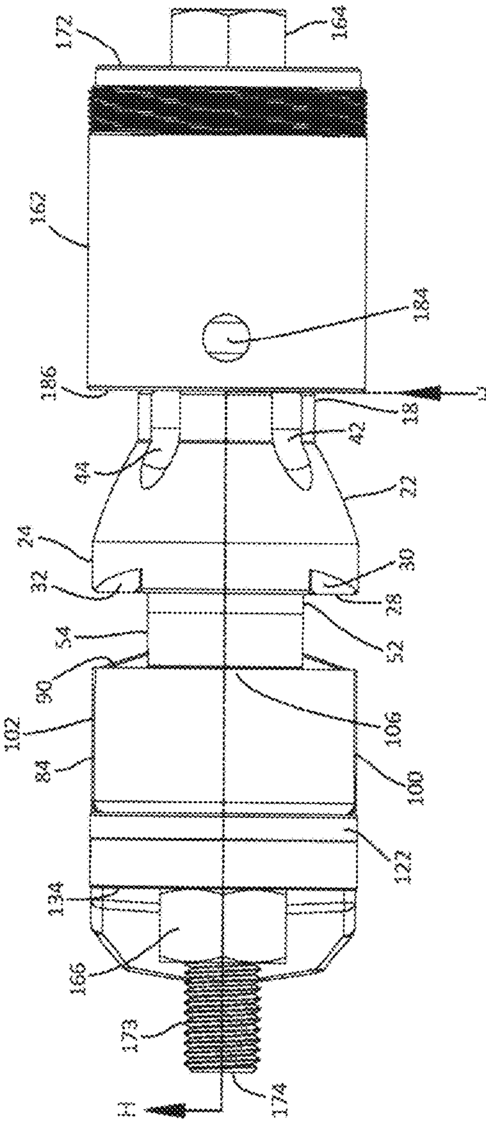
FIG. 52 is a top elevation view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, prior to fully mounting the bit holder in the base block bore, in accordance with implementations of this disclosure.
Figure 53:
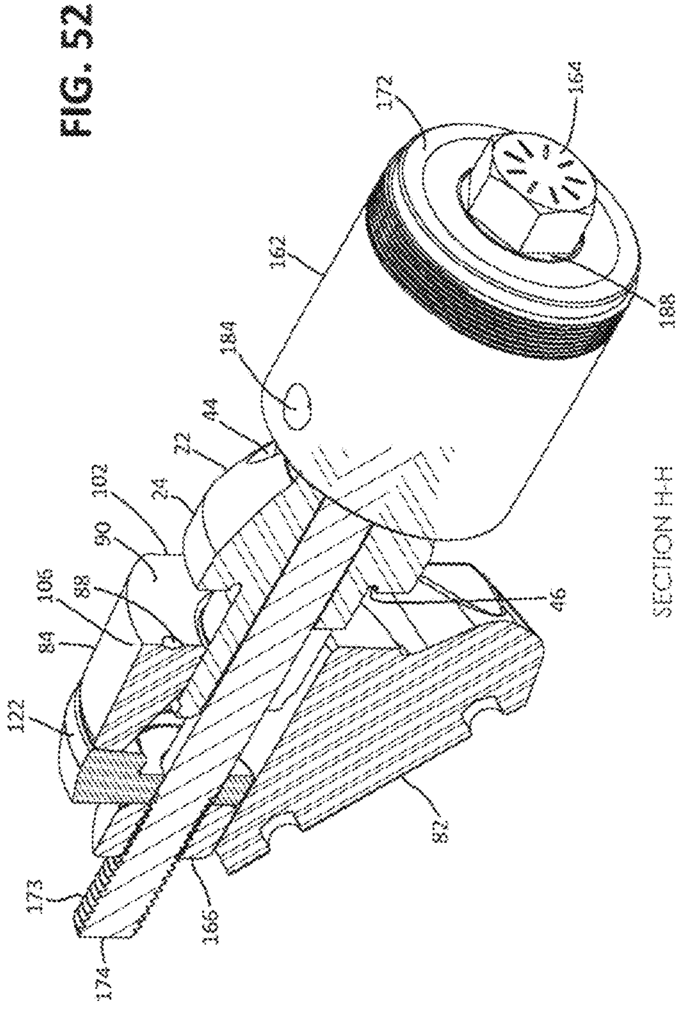
FIG. 53 is a cross-sectional perspective view of the of the first embodiment of the insertion and extraction system, taken along line H-H of FIG. 52, showing the bolt, the compact hydraulic cylinder, and the nut, assembled with the first embodiment of the bit assembly, without a bit, showing the first embodiment of the bit holder, the first embodiment of the base block, and the end cover, prior to fully mounting the bit holder in the base block bore, in accordance with implementations of this disclosure.
Figure 54:
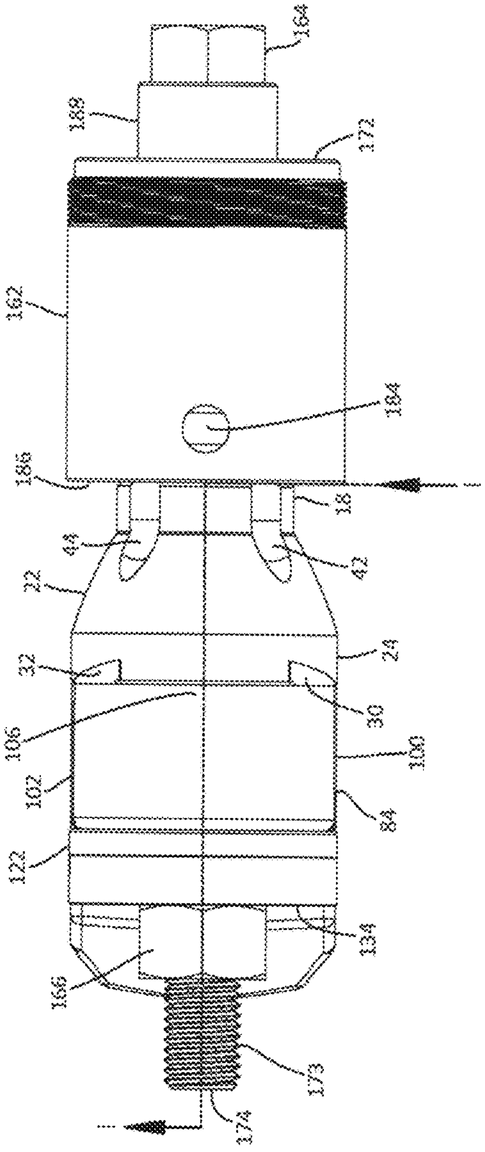
FIG. 54 is a top elevation view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, after fully mounting the bit holder in the base block bore, in accordance with implementations of this disclosure.
Figure 55:
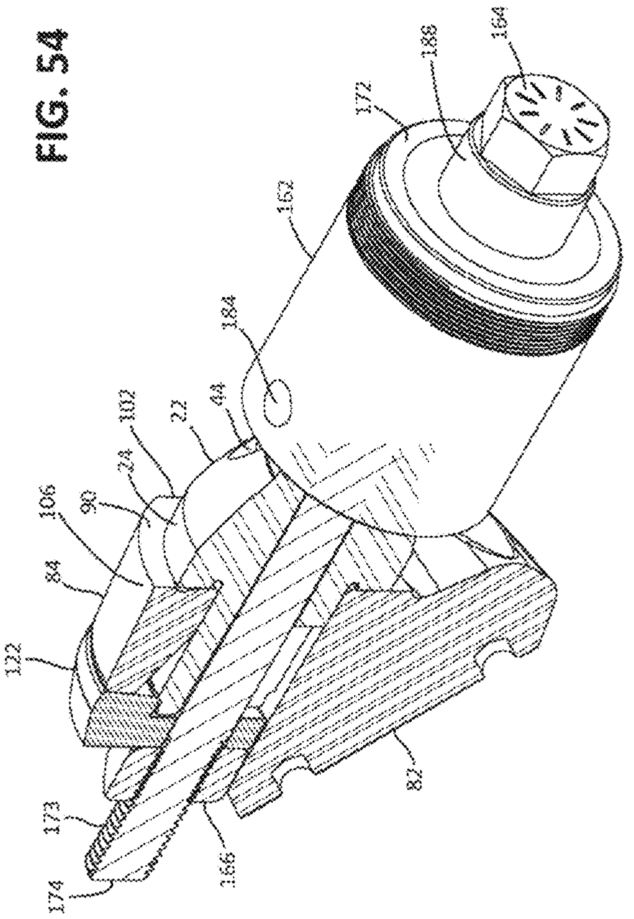
FIG. 55 is a cross-sectional perspective view of the first embodiment of the insertion and extraction system, taken along line I-I of FIG. 54, showing the bolt, the compact hydraulic cylinder, and the nut, assembled with the first embodiment of the bit assembly, without a bit, showing the first embodiment of the bit holder, the first embodiment of the base block, and the end cover, after fully mounting the bit holder in the base block bore, in accordance with implementations of this disclosure.
Figure 57:
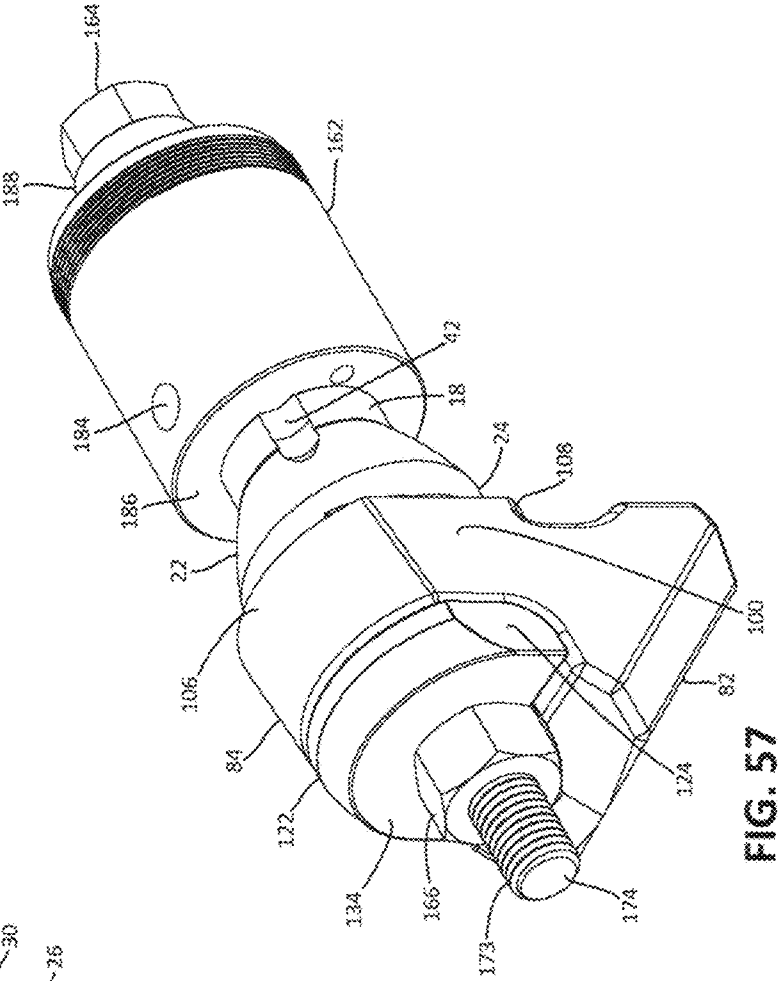
FIG. 57 is a rear perspective view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, after fully mounting the bit holder in the base block bore, in accordance with implementations of this disclosure.
Figure 56:
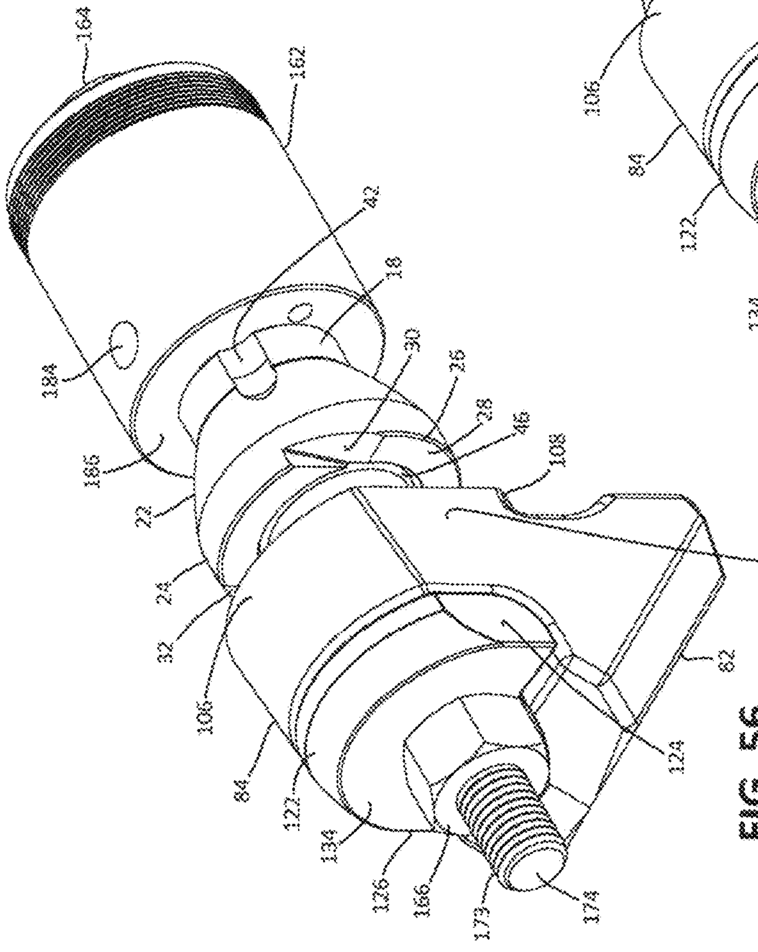
FIG. 56 is a rear perspective view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, prior to fully mounting the bit holder in the base block bore, in accordance with implementations of this disclosure.
Figure 58:
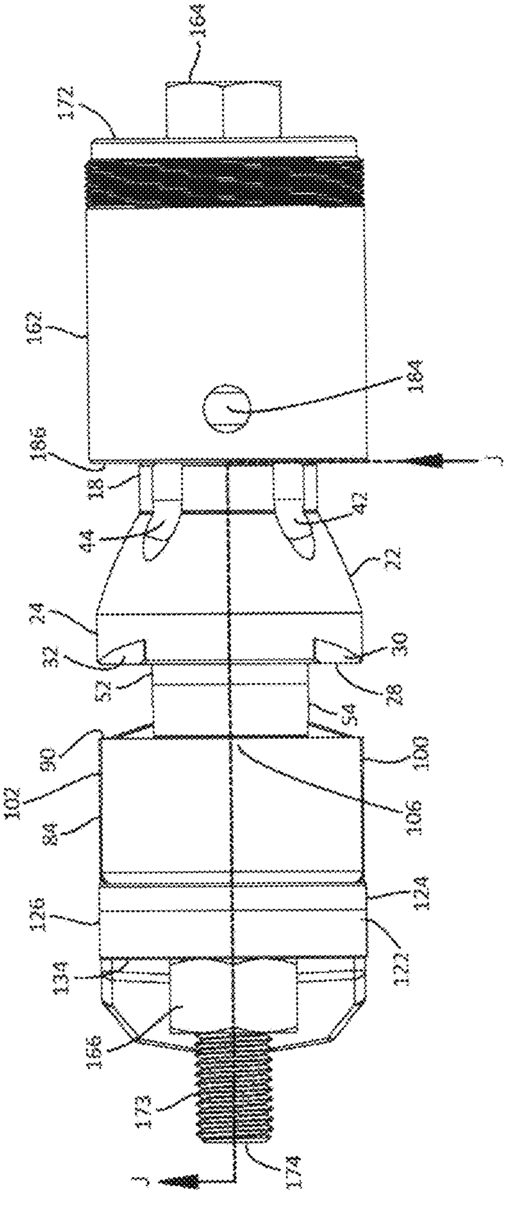
FIG. 58 is a top elevation view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, prior to fully mounting the bit holder in the base block bore, in accordance with implementations of this disclosure.
Figure 59:
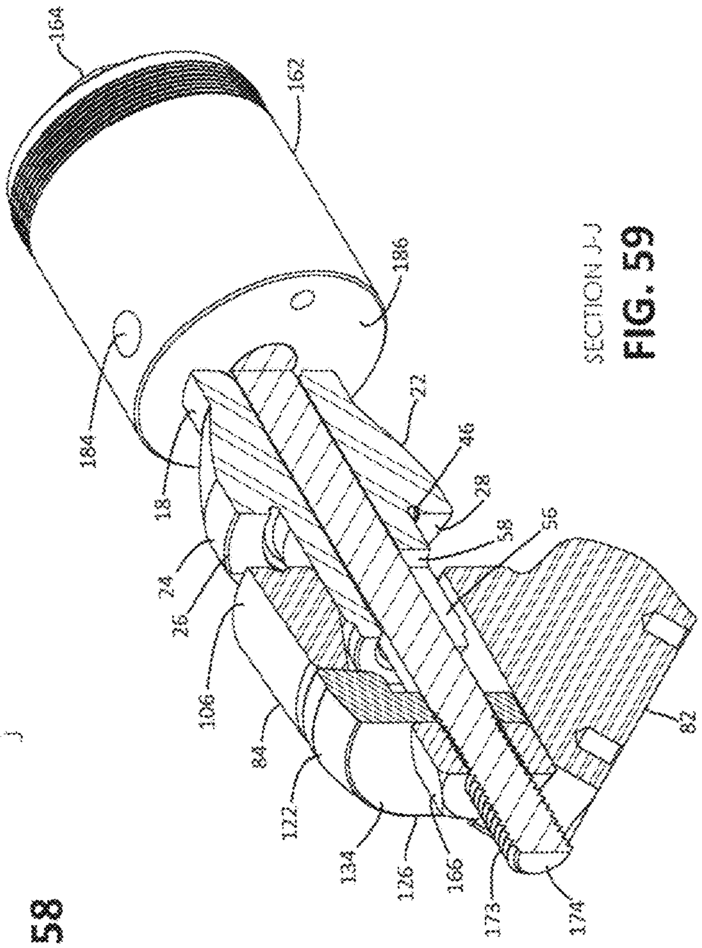
FIG. 59 is a cross-sectional perspective view of the first embodiment of the insertion and extraction system, taken along line J-J of FIG. 58, showing the bolt, the compact hydraulic cylinder, and the nut, assembled with the first embodiment of the bit assembly, without a bit, showing the first embodiment of the bit holder, the first embodiment of the base block, and the end cover, prior to fully mounting the bit holder in the base block bore, in accordance with implementations of this disclosure.
Figure 60:
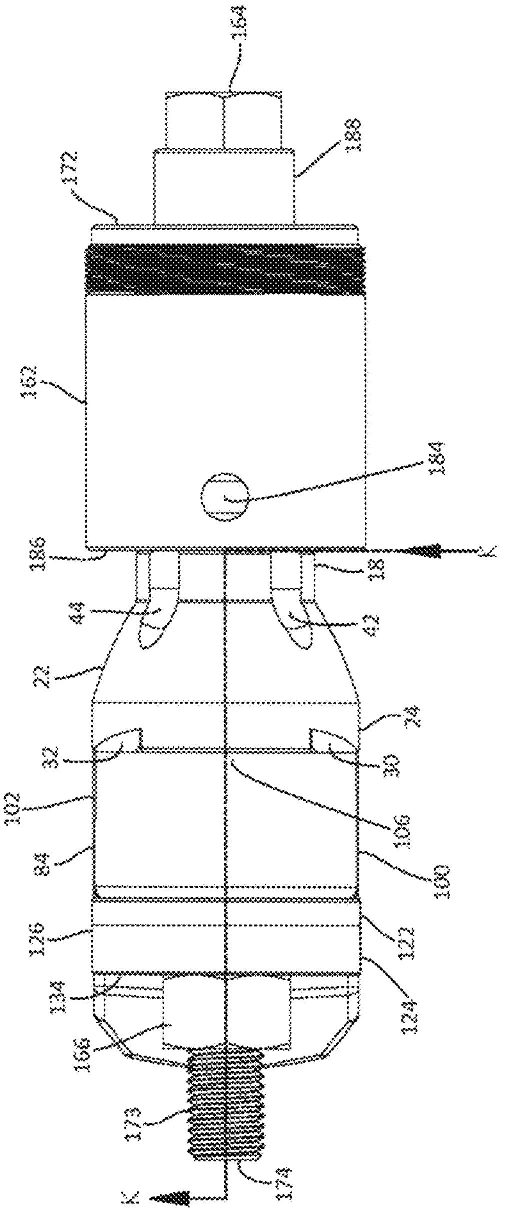
FIG. 60 is a top elevation view of the first embodiment of the insertion and extraction system, showing the bolt, the compact hydraulic cylinder, and the nut, assembled with the first embodiment of the bit assembly, without a bit, showing the first embodiment of the bit holder, the first embodiment of the base block, and the end cover, after fully mounting the bit holder in the base block bore, in accordance with implementations of this disclosure.
Figure 61:
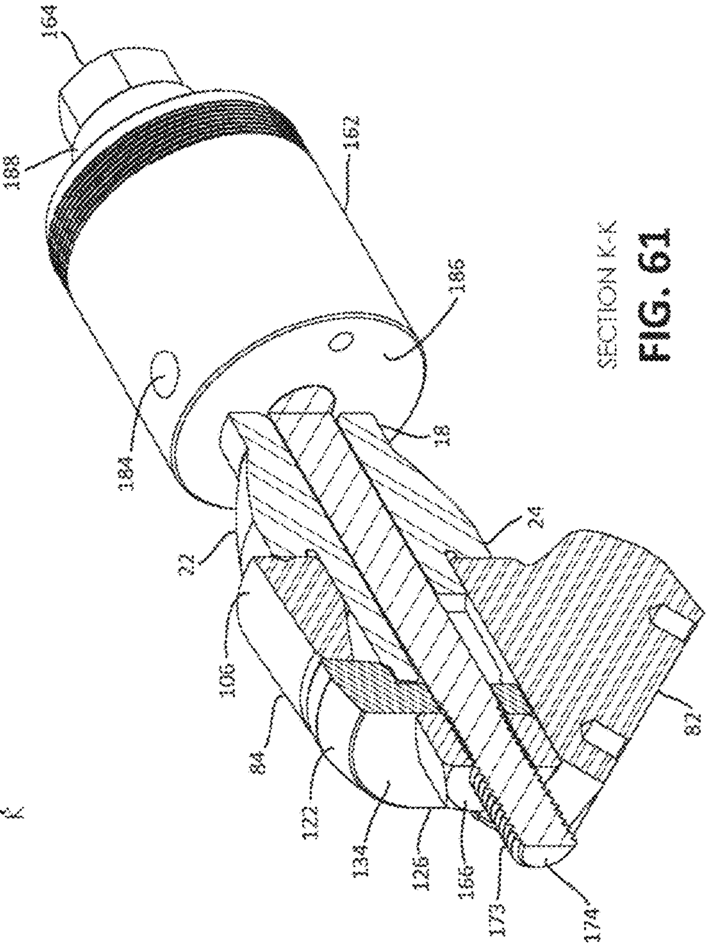
FIG. 61 is a cross-sectional perspective view of the first embodiment of the insertion and extraction system, taken along line K-K of FIG. 60, showing the bolt, the compact hydraulic cylinder, and the nut, assembled with the first embodiment of the bit assembly, without a bit, showing the first embodiment of the bit holder, the first embodiment of the base block, and the end cover, after fully mounting the bit holder in the base block bore, in accordance with implementations of this disclosure.
Figure 62:
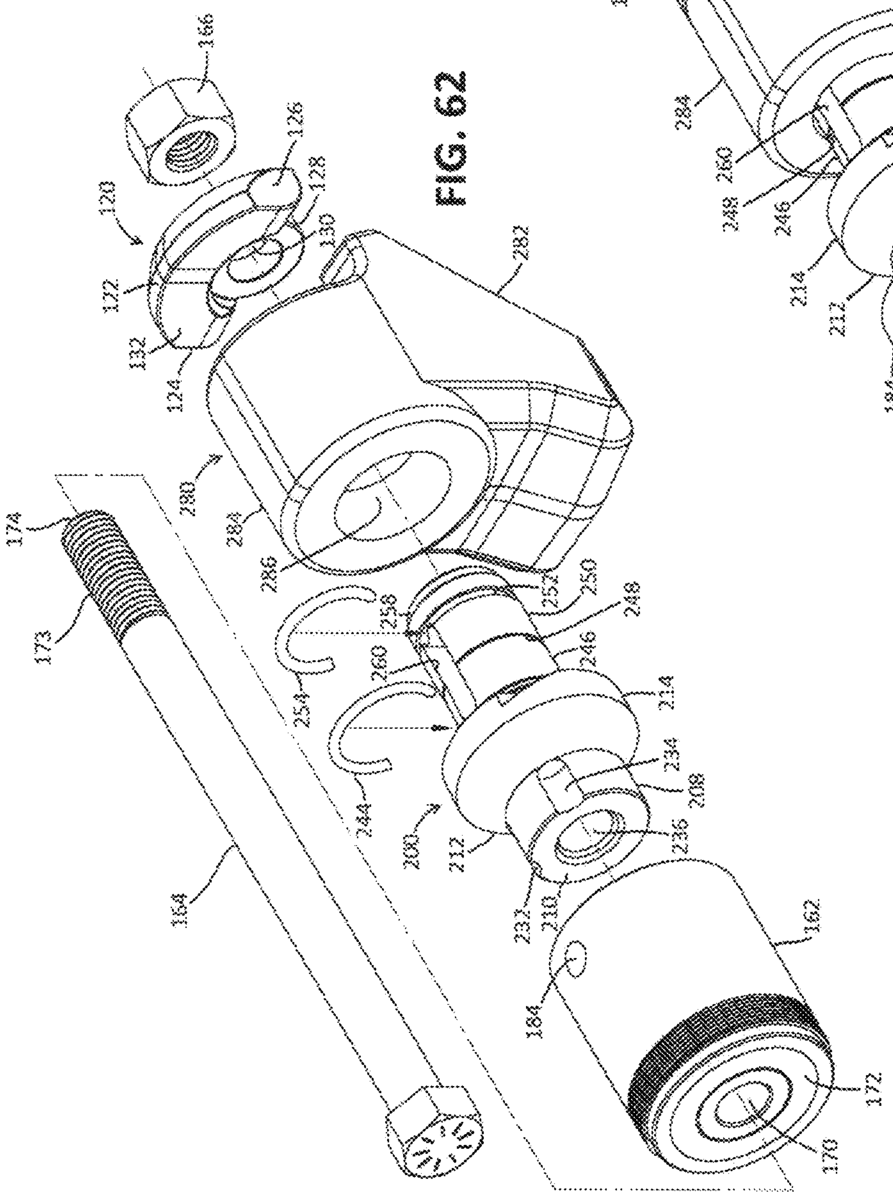
FIG. 62 is an exploded perspective view of the first embodiment of the insertion and extraction system, showing the bolt, the compact hydraulic cylinder, and the nut, and a second embodiment of a bit assembly, without a bit, showing a bit holder, a base block, and the end cover, in accordance with implementations of this disclosure.
Figure 63:
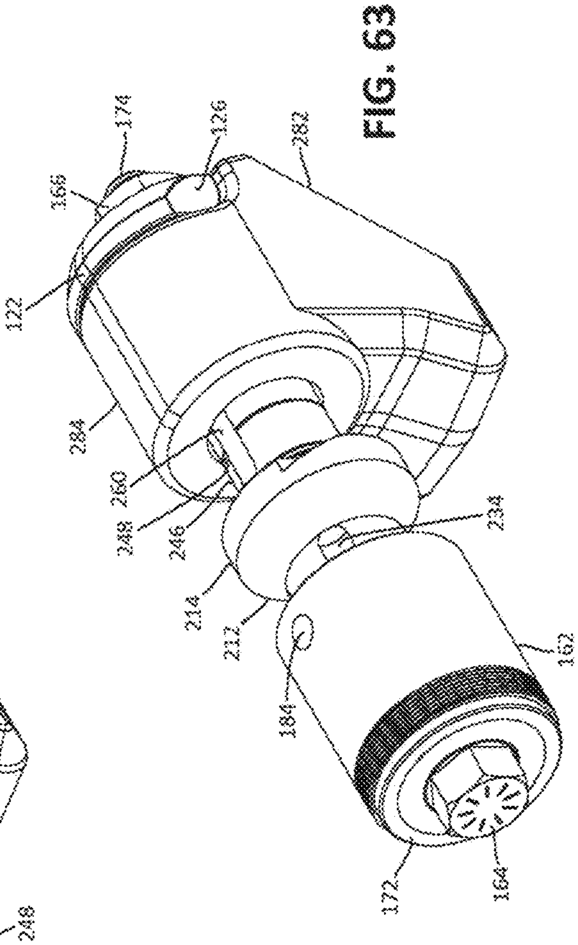
FIG. 63 is a perspective view of the first embodiment of the insertion and extraction system assembled onto the second embodiment of the bit assembly, without a bit, prior to fully mounting the bit holder in the base block bore, in accordance with implementations of this disclosure.
Figure 64:
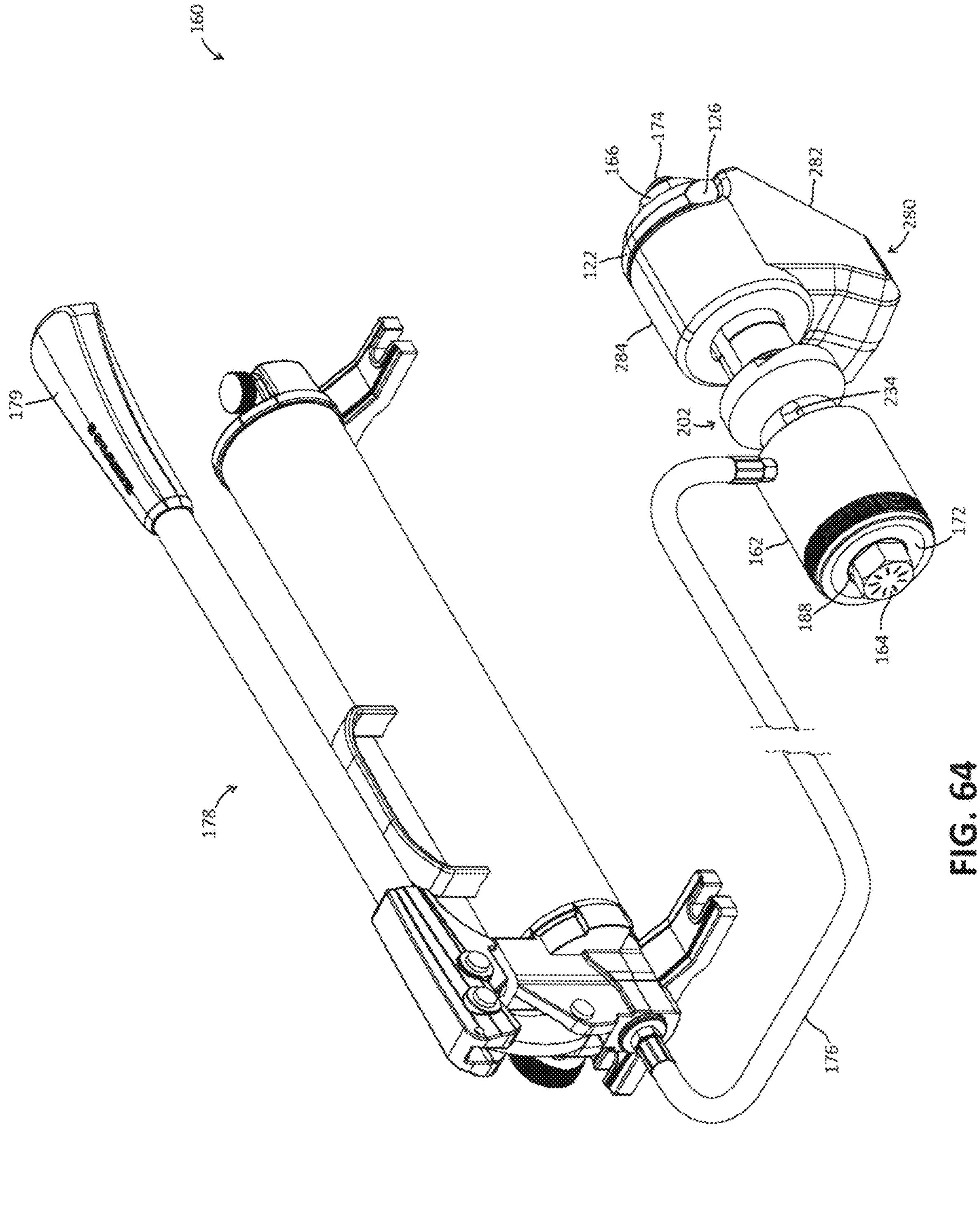
FIG. 64 is a perspective view of the first embodiment of the insertion and extraction system, showing the compact hydraulic cylinder connected to a hydraulic pump, assembled onto the second embodiment of the bit assembly, without a bit, prior to fully mounting the bit holder in the base block bore, in accordance with implementations of this disclosure.
Figure 65:
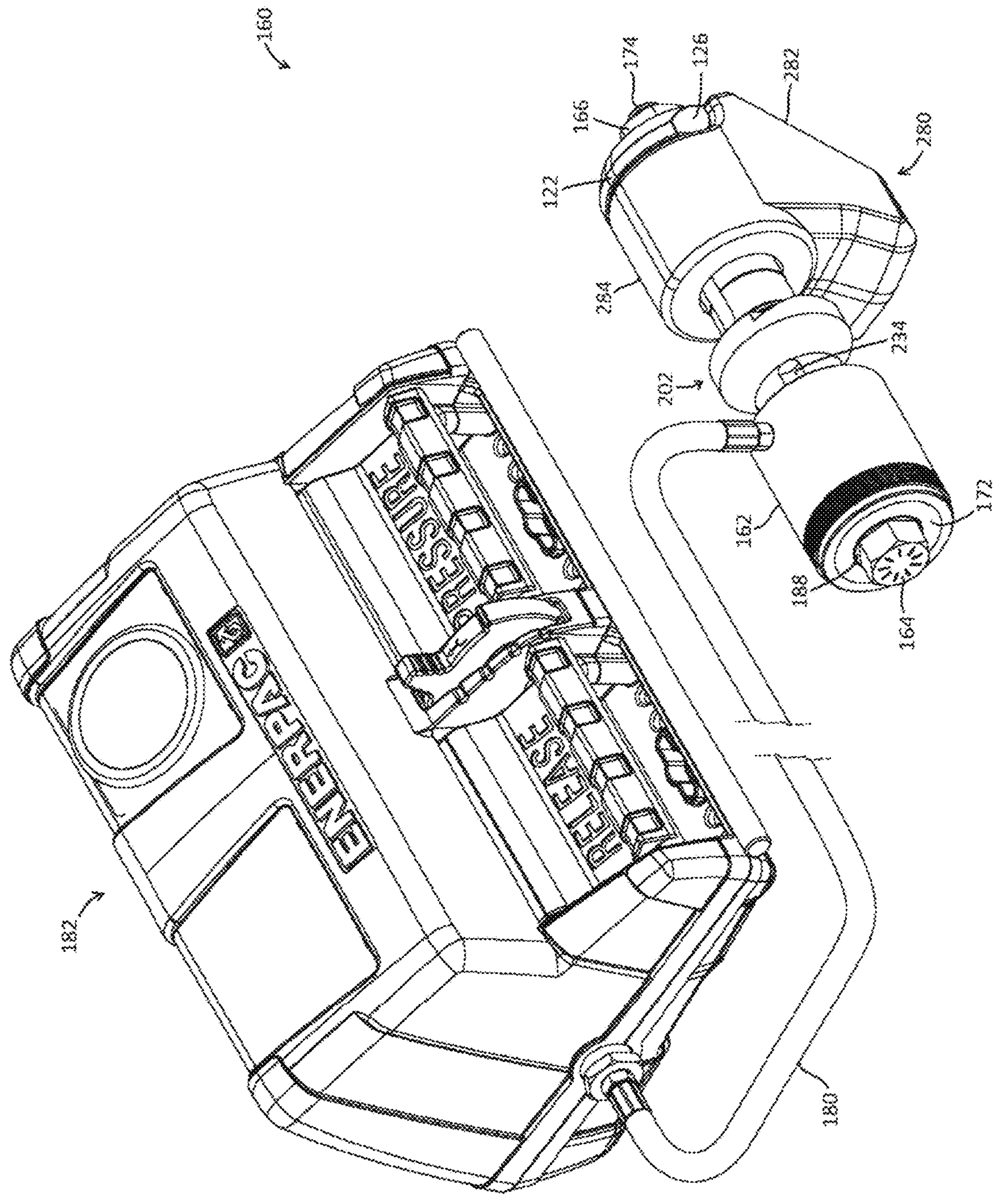
FIG. 65 is a perspective view of the first embodiment of the insertion and extraction system, showing the compact hydraulic cylinder connected to a pneumatically operated hydraulic pump, assembled onto the second embodiment of the bit assembly, without a bit, prior to fully mounting the bit holder in the base block bore, in accordance with implementations of this disclosure.
Figure 66:
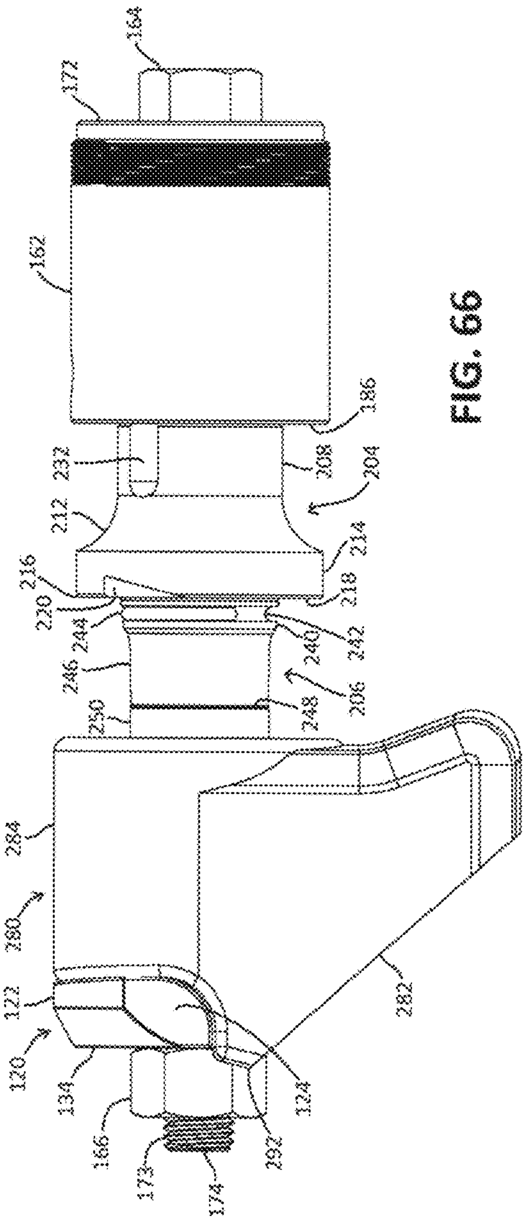
FIG. 66 is a side elevation view of the first embodiment of the insertion and extraction system, showing the bolt, the compact hydraulic cylinder, and the nut, assembled with the second embodiment of the bit assembly, without a bit, showing the second embodiment of the bit holder, the second embodiment of the base block, and the end cover, prior to fully mounting the bit holder in the base block bore, in accordance with implementations of this disclosure.

A first embodiment of an insertion and extraction system 160 in accordance with implementations of the present disclosure, shown in FIGS. 40-81 and 90-125, comprises a compact single acting hydraulic cylinder body 162, a bolt 164, such as a grade 9 ultra-high strength bolt, a nut 166, such as a grade 9 ultra-high strength nut, a hardened washer 120, and an extraction cup 168, which are used in conjunction with a hydraulic pump, such as a manually operated hydraulic pump 178 (FIG. 42) or an EnerPac pneumatically operated hydraulic pump 182 (FIG. 43), to insert and extract a bit holder from a base block. The extraction cup 168, shown in FIGS. 82-89, is used to remove the bit holder from the base block.

Figure 38:
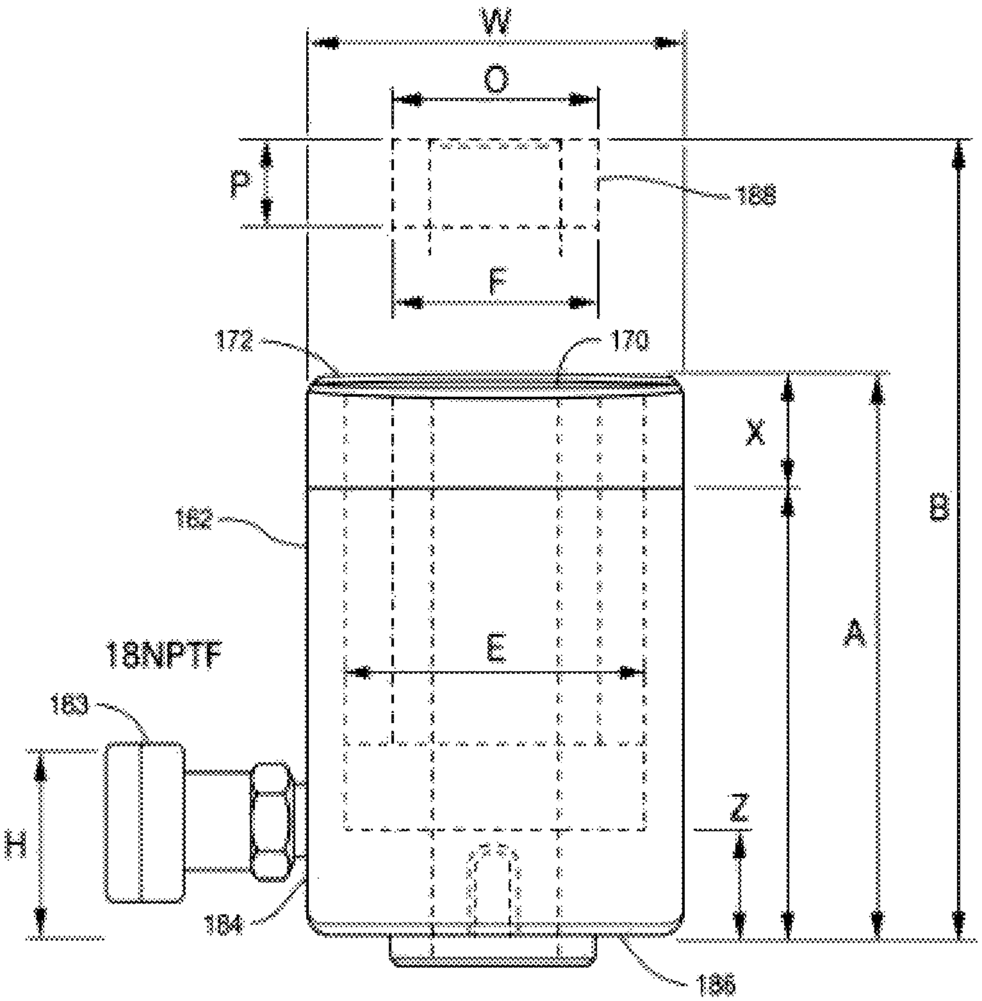
FIG. 38 is a side elevation view of a first embodiment of a compact single acting hydraulic cylinder of a first embodiment of an insertion and extraction system, showing invisible internal components in dotted lines, in accordance with implementations of this disclosure.
Figure 39:
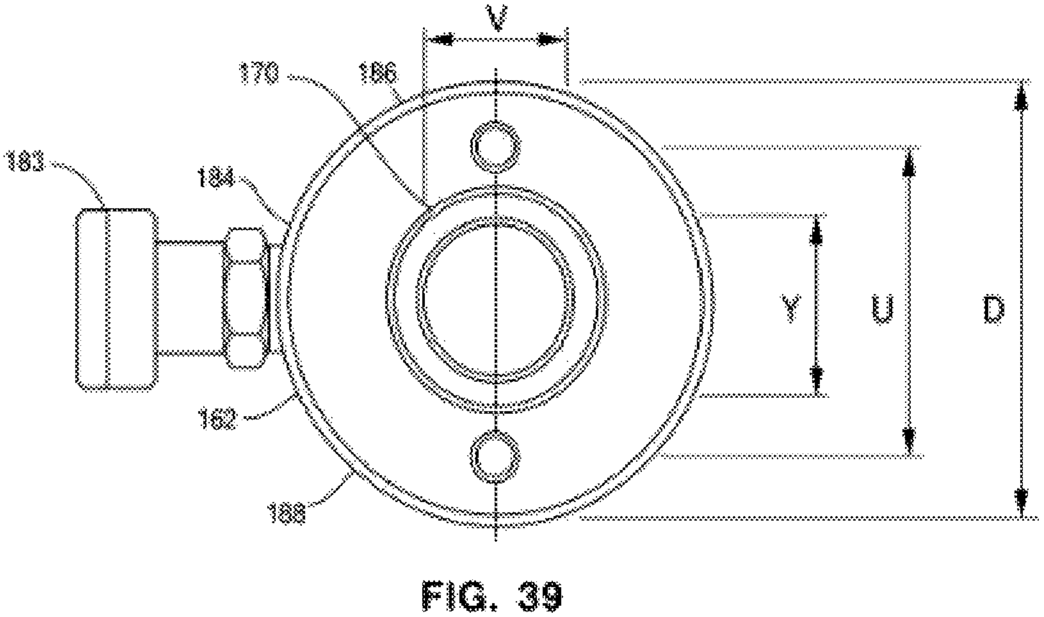
FIG. 39 is an elevation view of a distal end of the first embodiment of the compact single acting hydraulic cylinder of the first embodiment of the insertion and extraction system in accordance with implementations of this disclosure.
Figure 40:
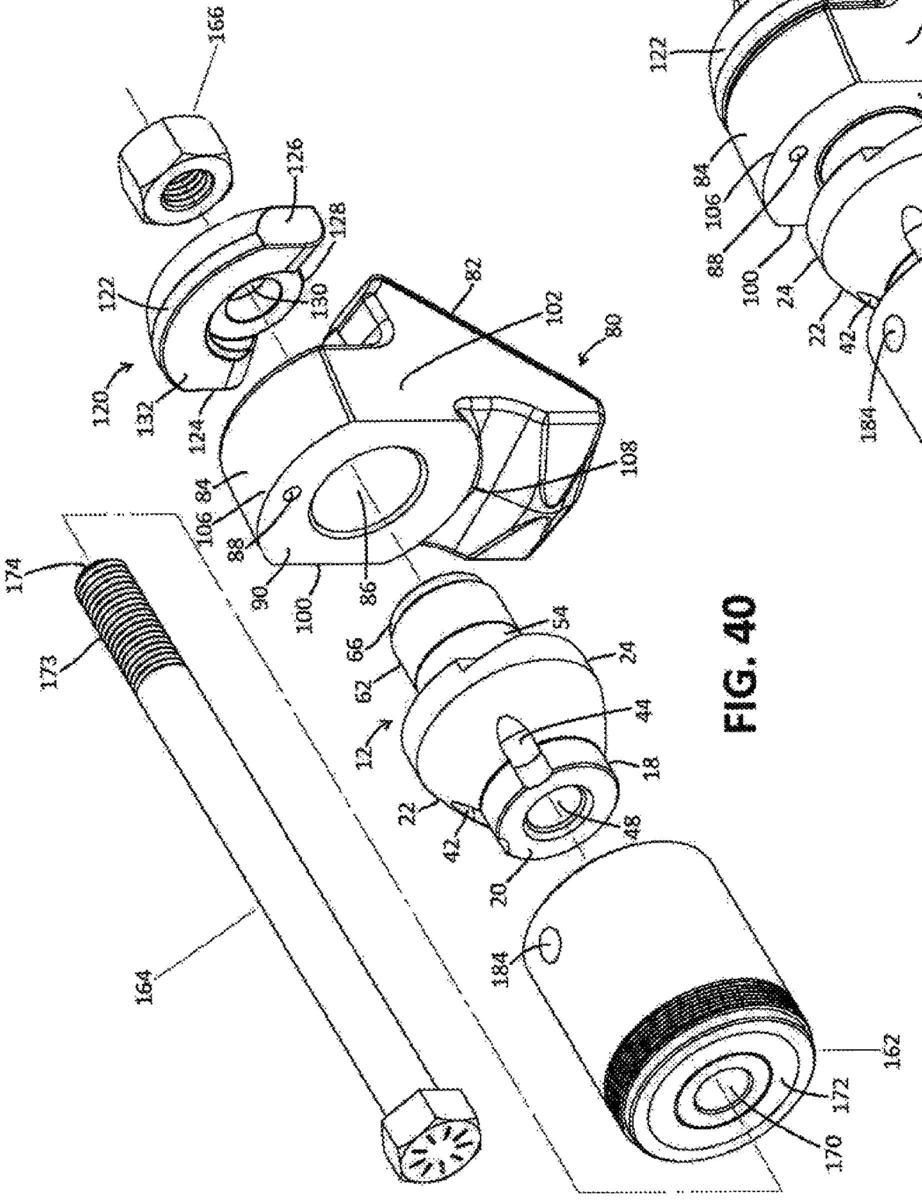
FIG. 40 is an exploded perspective view of the first embodiment of the insertion and extraction system, showing a bolt, the compact hydraulic cylinder, and a nut, and the first embodiment of the bit assembly, without a bit, showing the bit holder, the base block, and the end cover, in accordance with implementations of this disclosure.
Figure 41:
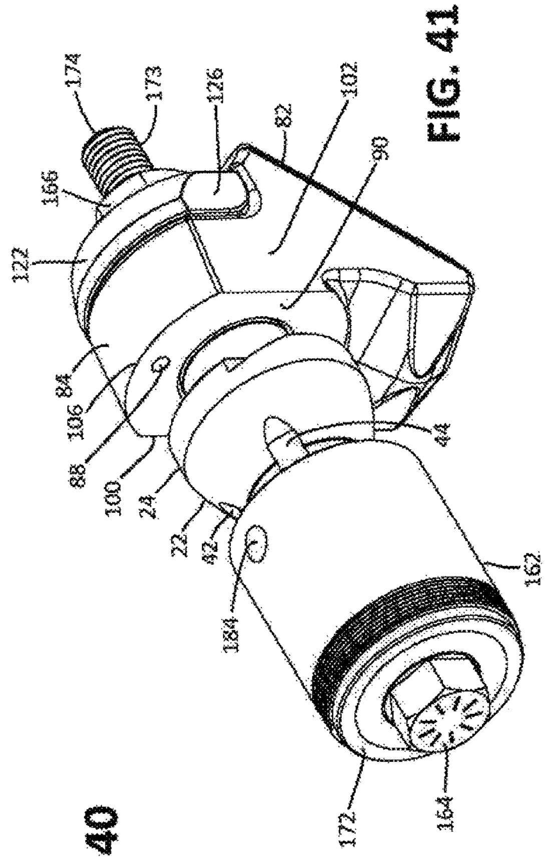
FIG. 41 is a perspective view of the first embodiment of the insertion and extraction system assembled onto the first embodiment of the bit assembly, without a bit, prior to fully mounting the bit holder in the base block bore, in accordance with implementations of this disclosure.

The compact single acting hydraulic cylinder body 162, shown in cross-sectional view in FIGS. 38 and 39, comprises an aperture or through hole 170 at a forward end 172 of the body 162, the through hole 170 adapted to receive the bolt 164 that extends from the forward end 172 of the body 162 to a distal end 186 of the body 162 opposite the forward end 172. A portion of the through hole 170, adjacent the forward end 172, can be threaded. The bolt 164 also includes threading 173 at a distal end 174 of the bolt 164. The hydraulic cylinder body 162 also comprises a hydraulic cylinder piston rod 188. The bolt 164 is stationary and is secured in place between a forward end of the hydraulic cylinder piston rod 188 and a distal end of the washer 120. The hydraulic cylinder body 162 moves rearwardly, pushing the bit holder rearwardly until a rear annular flange of the bit holder seats on a front face of the base block.

Figure 1:
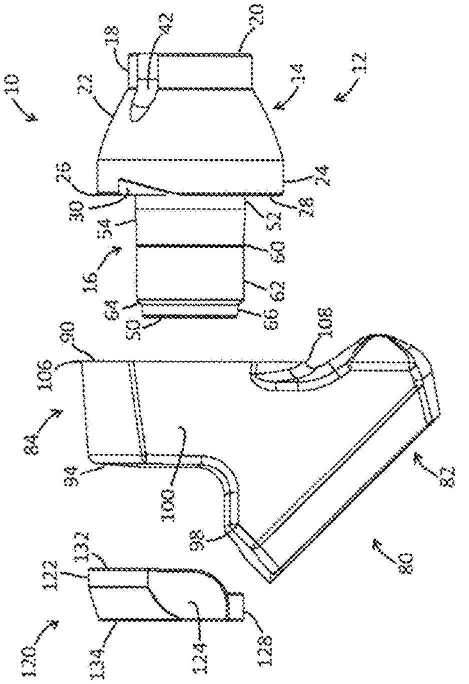
FIG. 1 is an exploded side elevation view of a first embodiment of a bit assembly, without a bit, showing a bit holder, a base block, and an end cover, in accordance with implementations of this disclosure.
Figure 2:
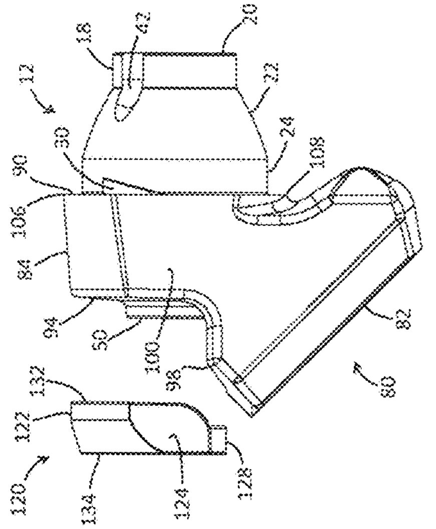
FIG. 2 is an exploded side elevation view of the first embodiment of the bit assembly, without a bit, showing the bit holder mounted in the base block and the end cover, in accordance with implementations of this disclosure.
Figure 3:
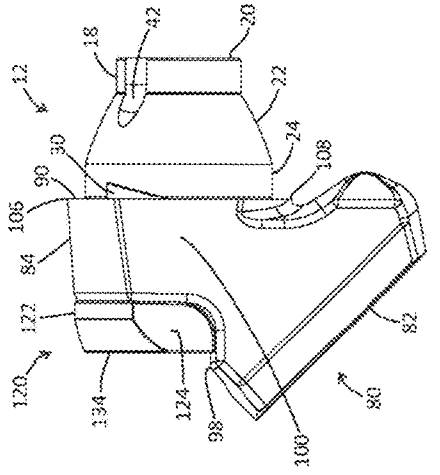
FIG. 3 is a side elevation view of the first embodiment of the bit assembly, without a bit, showing the bit holder mounted in the base block and the end cover assembled onto the base block, in accordance with implementations of this disclosure.
Figure 6:
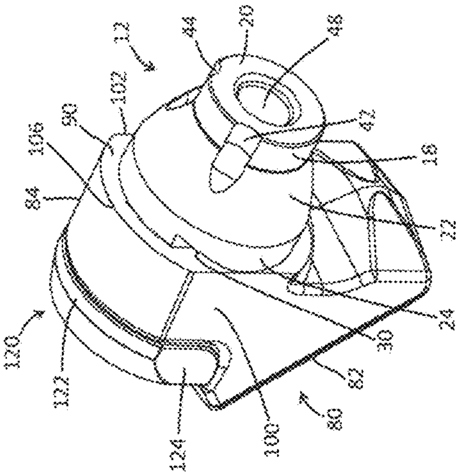
FIG. 6 is a perspective view of the first embodiment of the bit assembly, without a bit, showing the bit holder mounted in the base block and the end cover assembled onto the first embodiment of the base block, in accordance with implementations of this disclosure.
Figure 5:
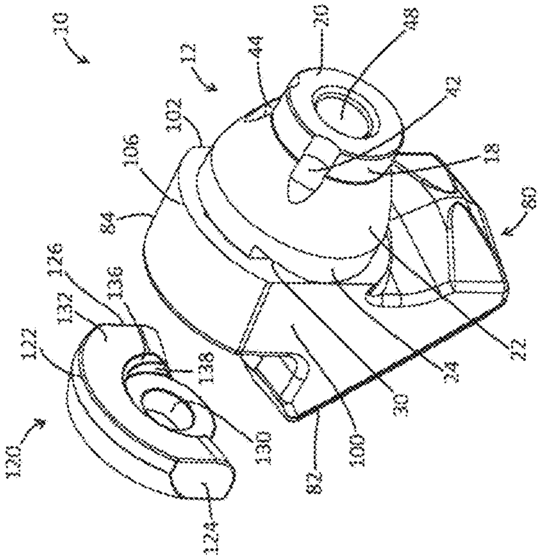
FIG. 5 is an exploded perspective view of the first embodiment of the bit assembly, without a bit, showing the bit holder mounted in the base block and the end cover, in accordance with implementations of this disclosure.
Figure 4:
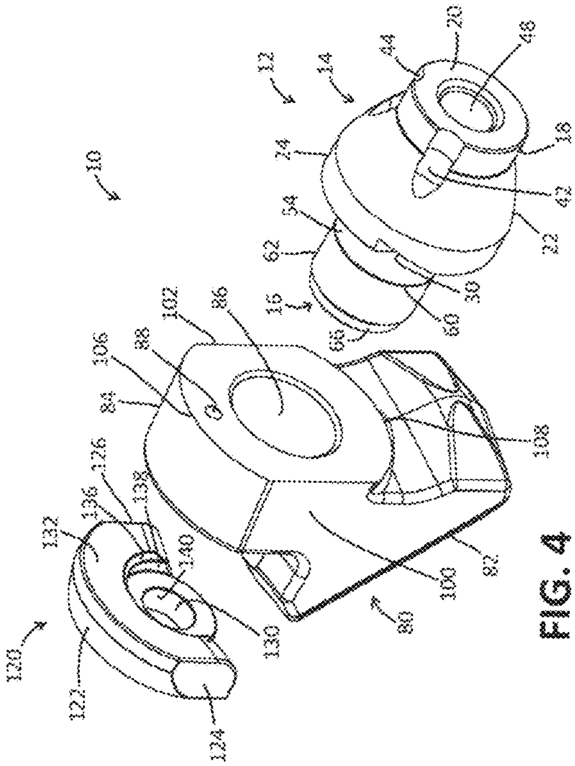
FIG. 4 is an exploded perspective view of the first embodiment of the bit assembly, without a bit, showing the bit holder, the base block, and the end cover, in accordance with implementations of this disclosure.
Figure 9:
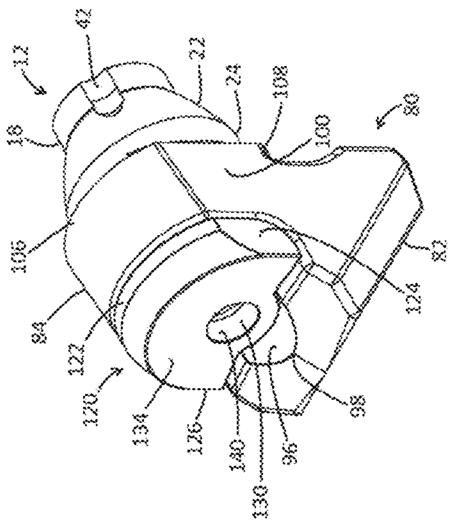
FIG. 9 is a rear perspective view of the first embodiment of the bit assembly, without a bit, showing the bit holder mounted in the base block and the end cover assembled onto the base block, in accordance with implementations of this disclosure.
Figure 7:
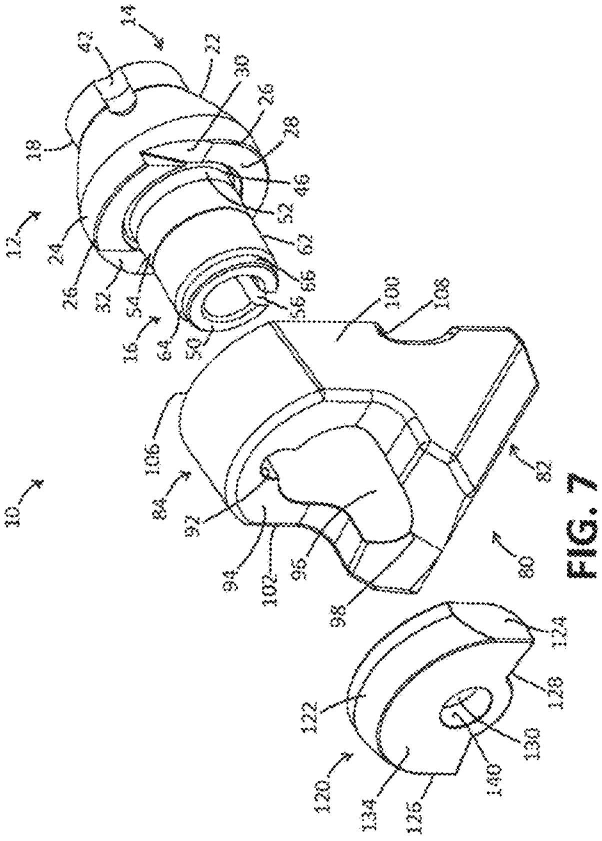
FIG. 7 is an exploded rear perspective view of the first embodiment of the bit assembly, without a bit, showing the bit holder, the base block, and the end cover, in accordance with implementations of this disclosure.
Figure 8:
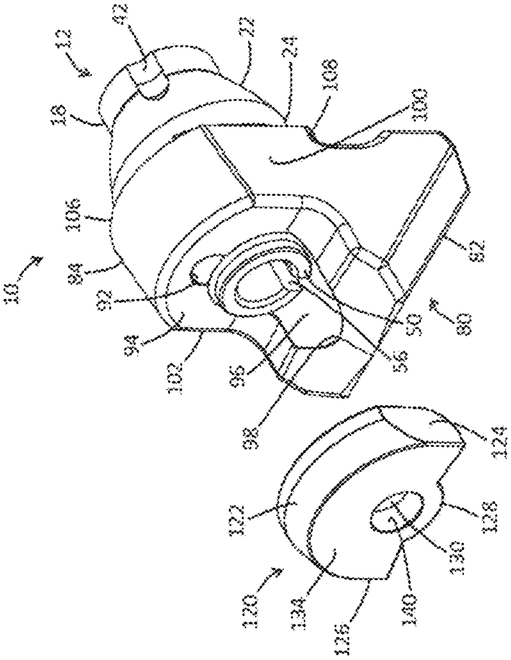
FIG. 8 is an exploded rear perspective view of the first embodiment of the bit assembly, without a bit, showing the bit holder mounted in the base block and the end cover, in accordance with implementations of this disclosure.
Figure 11:
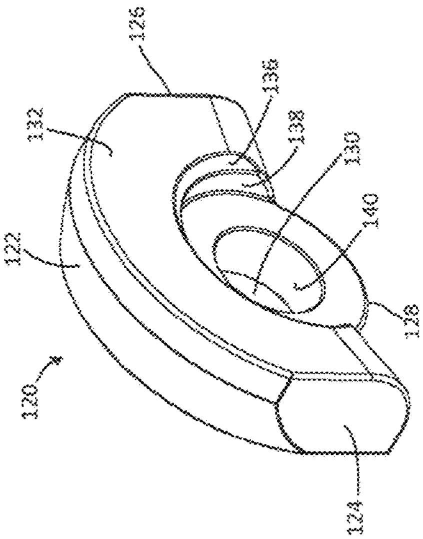
FIG. 11 is a front perspective view of the first embodiment of the end cover in accordance with implementations of this disclosure.
Figure 14:
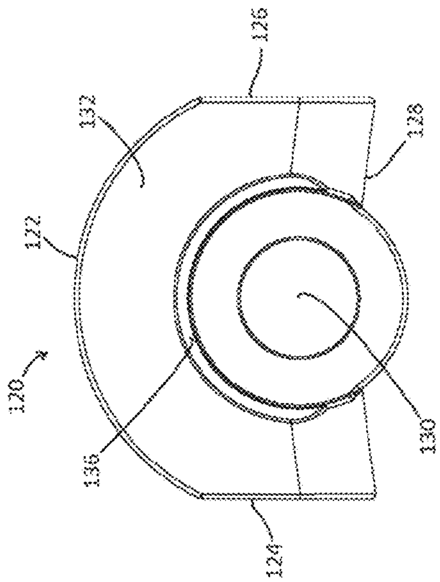
FIG. 14 is a top elevation view of the first embodiment of the end cover in accordance with implementations of this disclosure.
Figure 13:
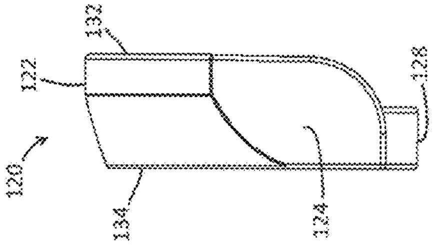
FIG. 13 is a side elevation view of the first embodiment of the end cover in accordance with implementations of this disclosure.
Figure 10:
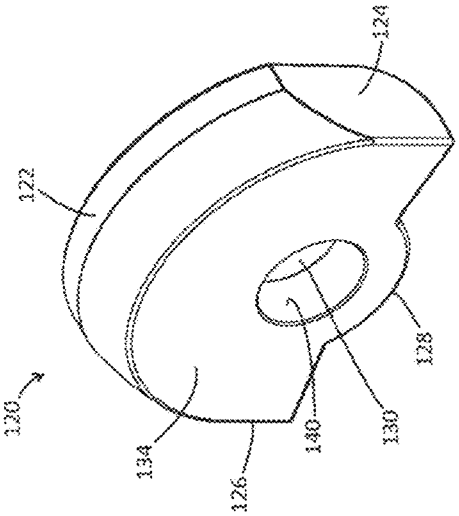
FIG. 10 is a rear perspective view of the first embodiment of the end cover in accordance with implementations of this disclosure.
Figure 12:
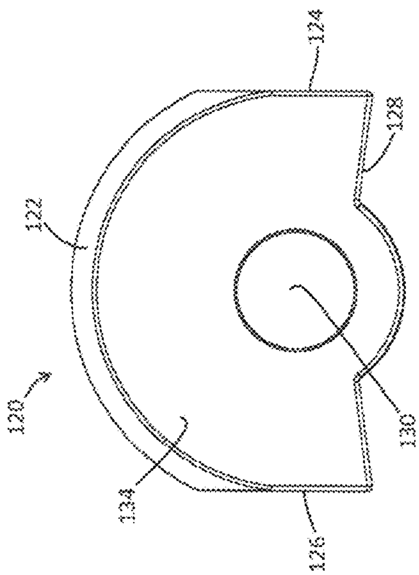
FIG. 12 is a bottom elevation view of the first embodiment of the end cover in accordance with implementations of this disclosure.
Figure 15:
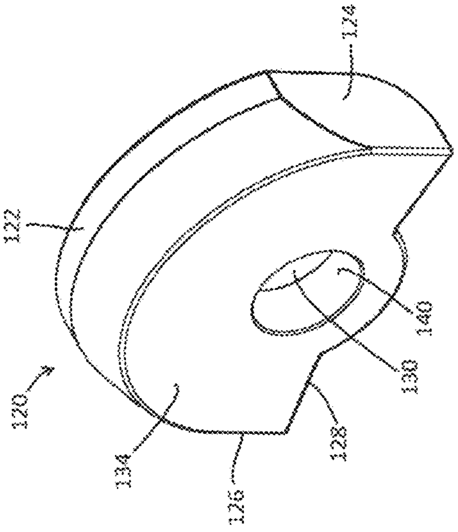
FIG. 15 is a rear perspective view of the first embodiment of the end cover in accordance with implementations of this disclosure.
Figure 16:
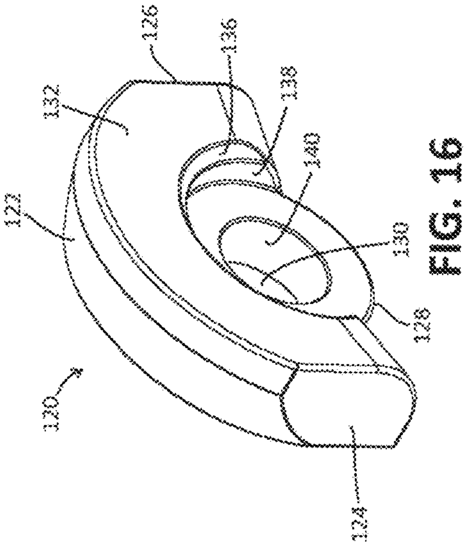
FIG. 16 is a front perspective view of the first embodiment of the end cover in accordance with implementations of this disclosure.
Figure 17:
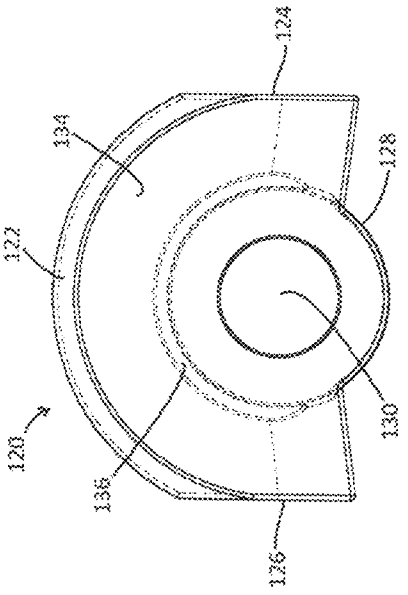
FIG. 17 is a bottom elevation view of the first embodiment of the end cover, showing invisible internal elements in dotted lines, in accordance with implementations of this disclosure.
Figure 18:
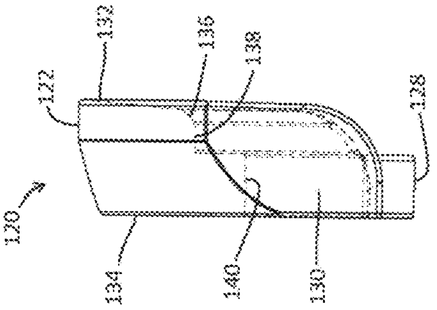
FIG. 18 is a side elevation view of the first embodiment of the end cover, showing invisible internal elements in dotted lines, in accordance with implementations of this disclosure.
Figure 19:
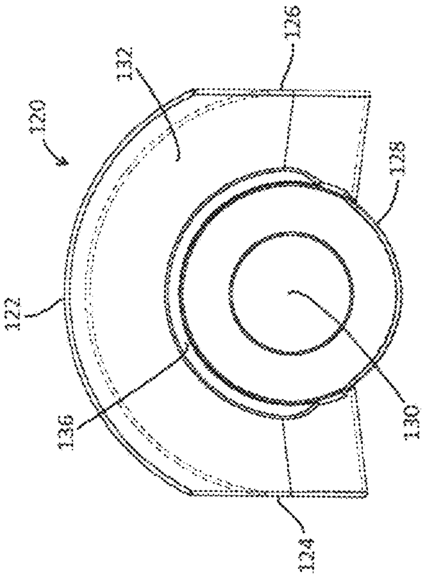
FIG. 19 is a top elevation view of the first embodiment of the end cover, showing invisible internal elements in dotted lines, in accordance with implementations of this disclosure.
Figure 20:
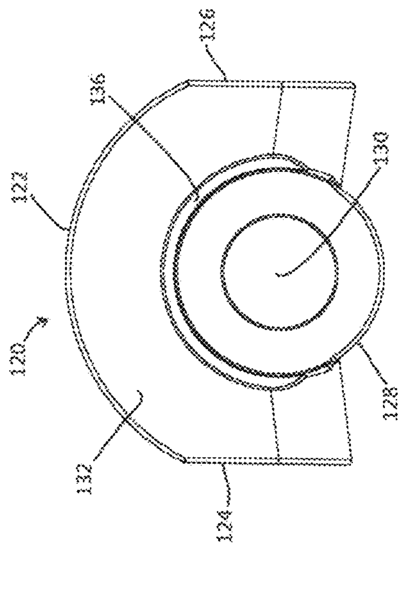
FIG. 20 is a top elevation view of the first embodiment of the end cover in accordance with implementations of this disclosure.
Figure 21:
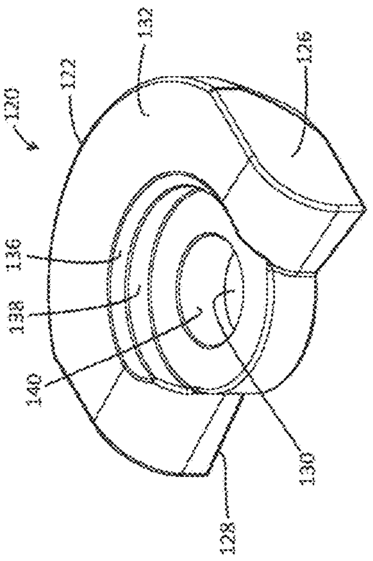
FIG. 21 is a top perspective view of the first embodiment of the end cover in accordance with implementations of this disclosure.
Figure 22:
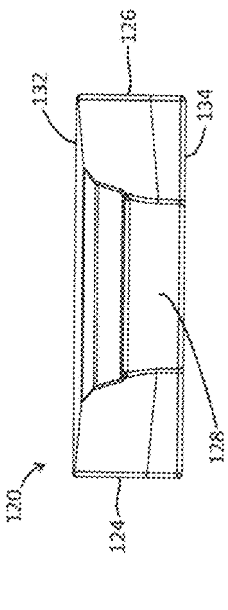
FIG. 22 is a side elevation view of a distal end of the first embodiment of the end cover in accordance with implementations of this disclosure.
Figure 23:
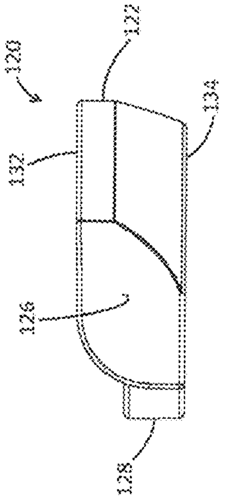
FIG. 23 is a side elevation view of the first embodiment of the end cover in accordance with implementations of this disclosure.
Figure 24:
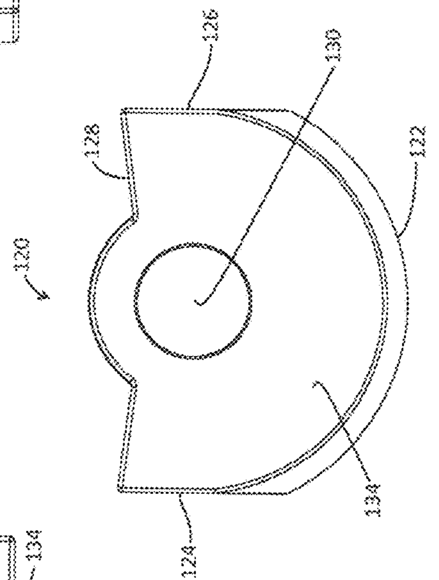
FIG. 24 is a bottom elevation view of the first embodiment of the end cover in accordance with implementations of this disclosure.
Figure 25:
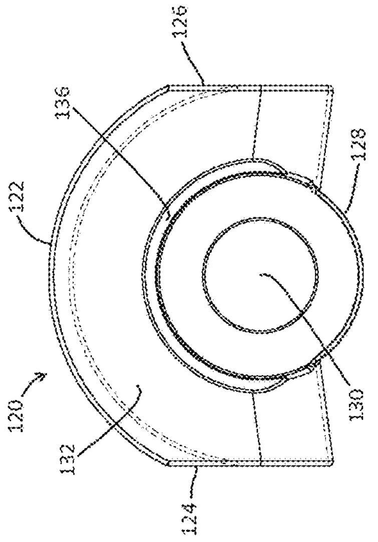
FIG. 25 is a top elevation view of the first embodiment of the end cover, showing invisible internal elements in dotted lines, in accordance with implementations of this disclosure.
Figure 26:
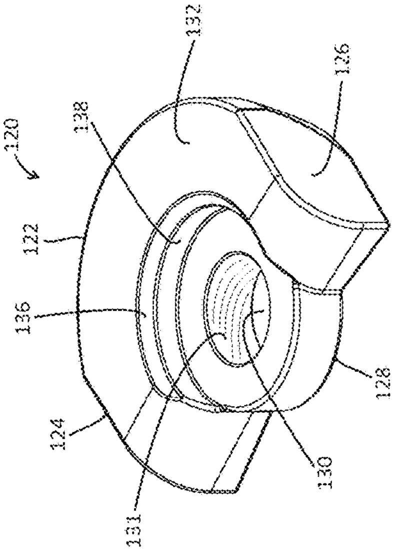
FIG. 26 is a top perspective view of the first embodiment of the end cover in accordance with implementations of this disclosure.
Figure 27:
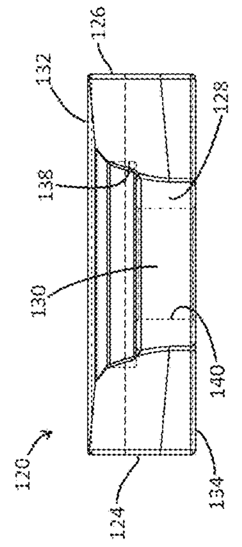
FIG. 27 is a side elevation view of a distal end of the first embodiment of the end cover, showing invisible internal elements in dotted lines, in accordance with implementations of this disclosure.
Figure 28:
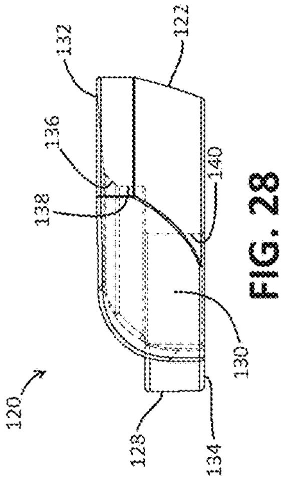
FIG. 28 is a side elevation view of the first embodiment of the end cover, showing invisible internal elements in dotted lines, in accordance with implementations of this disclosure.
Figure 29:
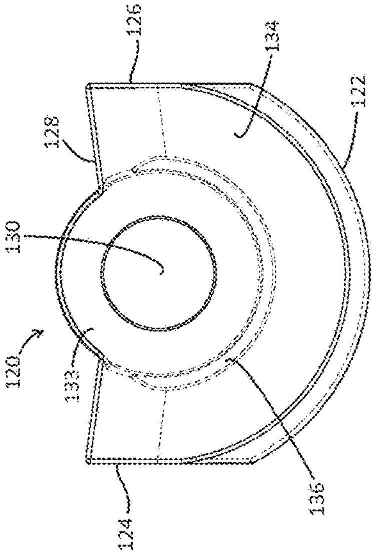
FIG. 29 is a bottom elevation view of the first embodiment of the end cover, showing invisible internal elements in dotted lines, in accordance with implementations of this disclosure.
Figure 32:
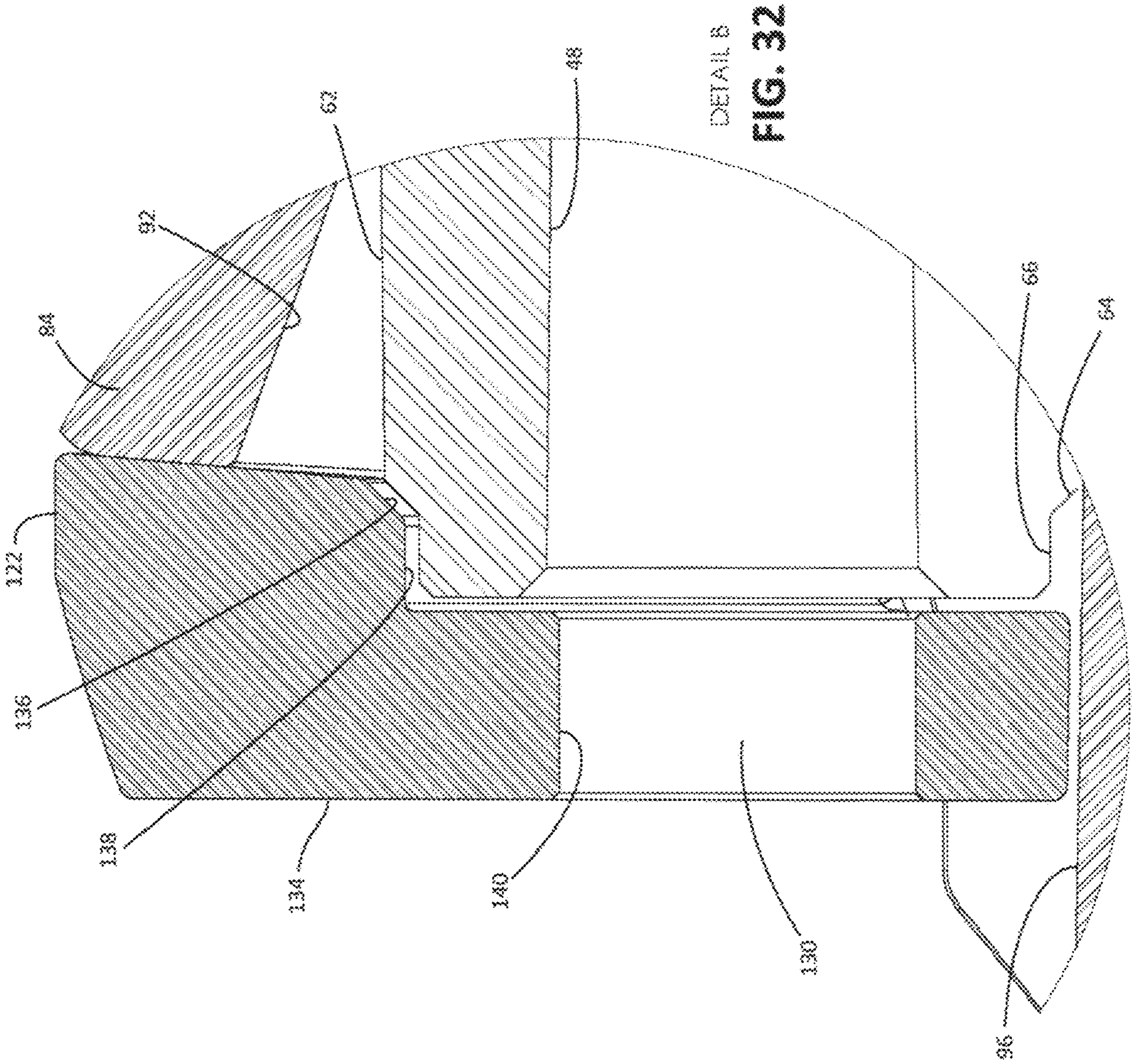
FIG. 32 is detail view of Detail B of the first embodiment of the bit assembly of FIG. 31 in accordance with implementations of this disclosure.
Figure 30:
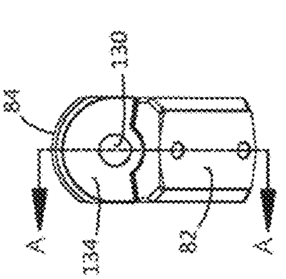
FIG. 30 is a rear elevation view of the first embodiment of the bit assembly, without a bit, showing the bit holder mounted in the base block and the end cover assembled onto the base block, in accordance with implementations of this disclosure.
Figure 31:
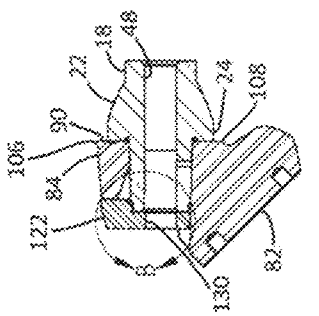
FIG. 31 is a cross-sectional view of the first embodiment of the bit assembly, without a bit, taken along line A-A of FIG. 30, showing the bit holder mounted in the base block and the end cover assembled onto the base block, in accordance with implementations of this disclosure.
Figure 35:
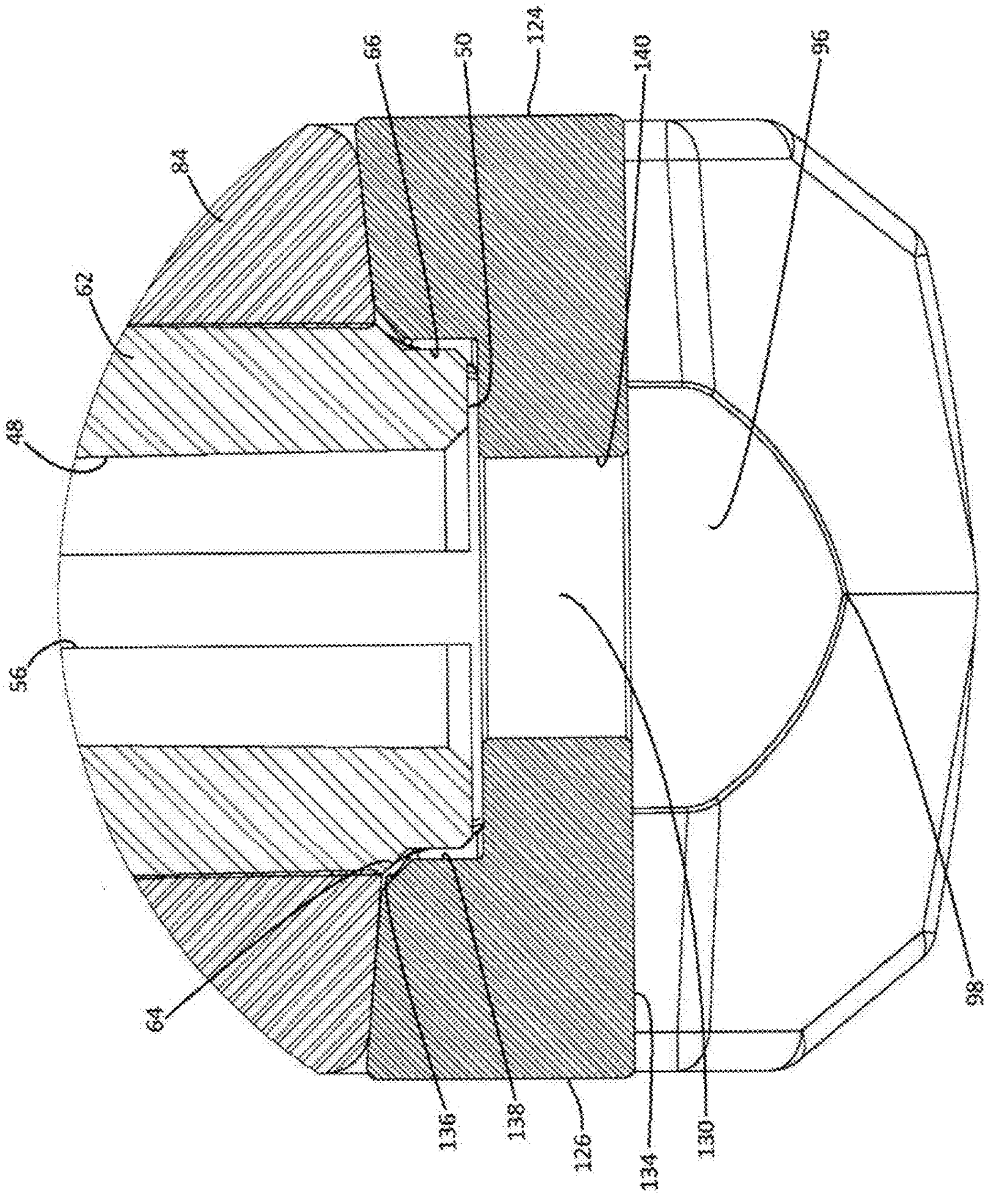
FIG. 35 is a detail view of Detail D of the first embodiment of the bit assembly of FIG. 34 in accordance with implementations of this disclosure.
Figure 33:
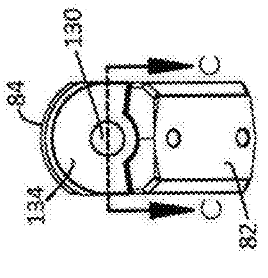
FIG. 33 is a rear elevation view of the first embodiment of the bit assembly, without a bit, showing the bit holder mounted in the base block and the end cover assembled onto the base block, in accordance with implementations of this disclosure.
Figure 34:
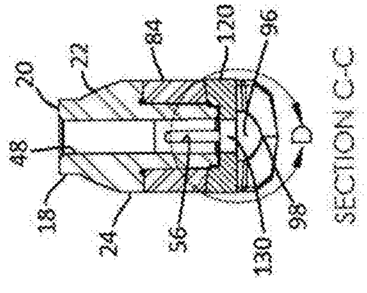
FIG. 34 is a cross-sectional view of the first embodiment of the bit assembly, without a bit, taken along line C-C of FIG. 33, showing the bit holder mounted in the base block and the end cover assembled onto the base block, in accordance with implementations of this disclosure.
Figure 37:
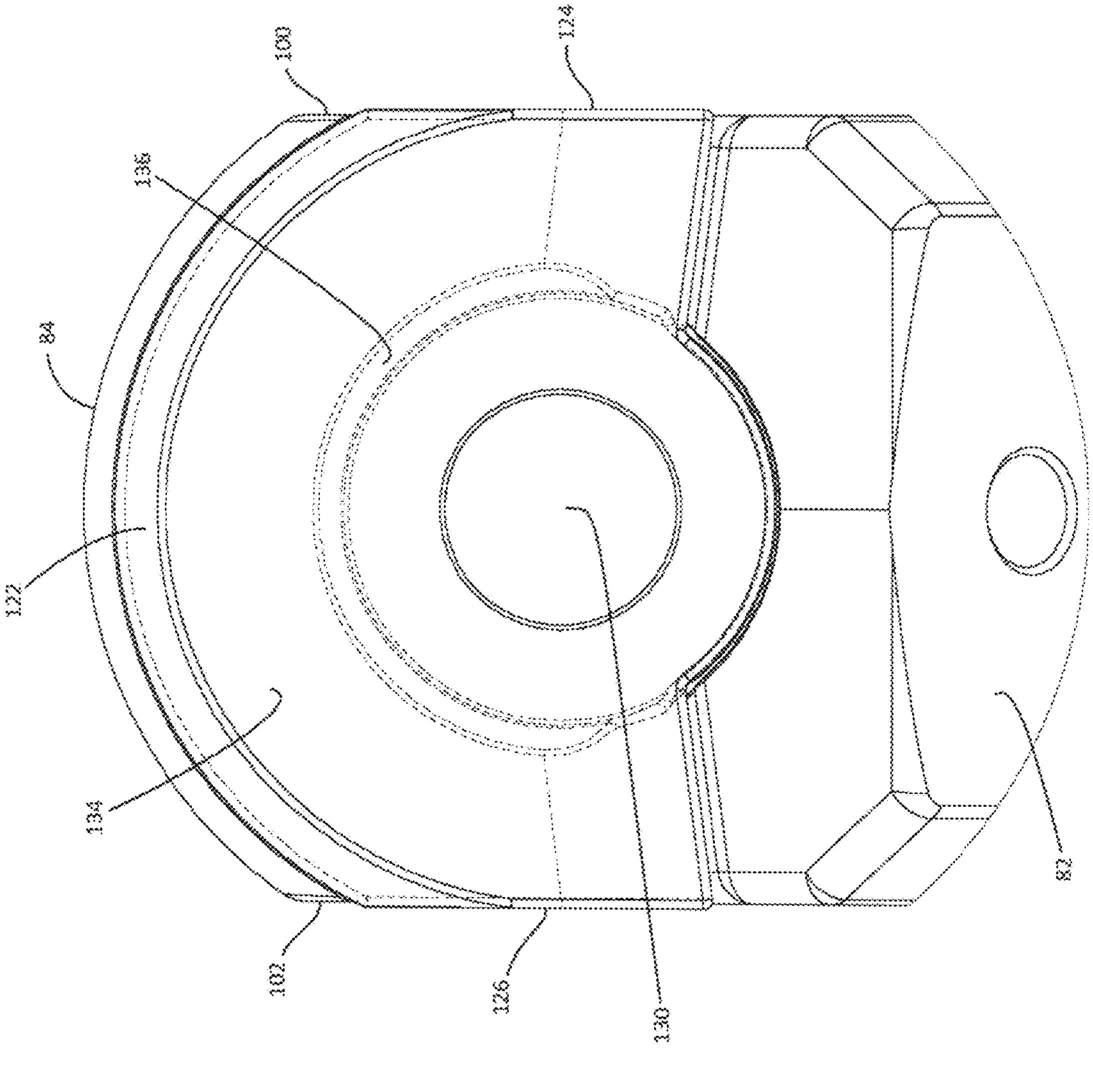
FIG. 37 is a detail view of Detail E of the first embodiment of the bit assembly of FIG. 36 in accordance with implementations of this disclosure.
Figure 36:
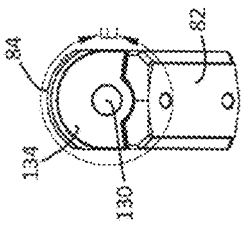
FIG. 36 is a rear elevation view of the first embodiment of the bit assembly, without a bit, showing the bit holder mounted in the base block and the end cover assembled onto the base block, in accordance with implementations of this disclosure.

A first embodiment of the special fitted and hardened end cover 120, shown in FIGS. 10-29, comprises a semicircular top portion 122 and a distal portion 128 opposite the semicircular top portion 122. A pair of flat vertical sides 124, 126 extend from either side of the semicircular top portion 122 to the distal portion 128. A first bore 130, which may be threaded (see 131 in FIG. 26) to replace the threaded nut 166 in a second alternate embodiment, is adjacent the distal portion 128. First bore 130 extends from a front face or surface 132 of the end cover 120 to a rear face or surface 134 of the end cover 120. A tapered forward arcuate segment 136 is positioned between the front face 132 of the end cover 120, and a larger generally semi-cylindrical middle second bore segment 138. An annular or donut shape wall 133 (FIG. 29) extends between segment 136 and the front of first bore 130. Bore 130 extends the rear face 134 of the end cover 120. When mounted onto a base block 84, the centerline of the first bore 130 of the end cover 120 aligns with the base block bore 86. The front face 132 of the end cover 120 is configured to nearly match the distal profile adjacent a distal end surface 94 of the base block 84. The insertion and extraction system 160 of the present disclosure can be used with various types of bit holders and base blocks, including, but not limited to, those shown and described in Applicant's co-pending U.S. Non-provisional application Ser. No. 17/146,992, filed Jan. 12, 2021, and U.S. Non-provisional application Ser. No. 15/699,504, filed Sep. 8, 2017, and Applicant's U.S. Pat. No. 10,968,739, issued Apr. 6, 2021, U.S. Pat. No. 10,947,844, issued Mar. 16, 2021, U.S. Pat. No. 10,995,613, issued May 4, 2021, U.S. Pat. No. 10,767,478, issued Sep. 8, 2020, U.S. Pat. No. 10,633,971, issued Apr. 28, 2020, U.S. Pat. No. 10,502,056, issued Dec. 10, 2019, U.S. Pat. No. 10,415,386, issued Sep. 17, 2019, U.S. Pat. No. 10,577,931, issued Mar. 3, 2020, U.S. Pat. No. 10,337,324, issued Jul. 2, 2019, U.S. Pat. No. 10,370,966, issued Aug. 6, 2019, U.S. Pat. No. 9,879,531, issued Jan. 30, 2018, U.S. Pat. No. 10,072,501, issued Sep. 11, 2018, and U.S. Pat. No. 9,909,416, issued Mar. 6, 2018, the contents of which are incorporated herein by reference in their entireties. Operation of the insertion and extraction system 160 is described below in relation to three embodiments of bit assemblies, without a bit.

Referring to FIGS. 1-9, 31-61, and 88-103, a first embodiment of a bit assembly 10, without a bit, comprises a bit holder 12 and a base block 80. The bit holder 12 includes a bit holder body 14 and a shank 16 axially depending from the bottom of the bit holder body 14. The bit holder body 14 is generally annular in shape and comprises an annular or generally cylindrical upper body portion 18 axially extending from a top surface 20, such as a flat annular top surface. Subjacent the upper body portion 18 is a middle portion 22 that extends axially and radially outwardly to a radially extending generally cylindrical tire portion 24. The middle portion 22, in this illustrated embodiment, has an arcuate shape. In other embodiments, the middle portion 22 can have a frustoconical shape, a convex shape, or a concave shape and the tire portion 24 can have an arcuate shape.

Adjacent the tire portion 24 is a chamfer or tapered portion 26 that axially extends to a flange 28, such as a flat annular flange, of the bit holder body 14. The tire portion 24 includes a pair of tapered cutouts 30, 32, or wedge-shaped undercuts, to provide access and leverage for a tool to extract the bit holder 12 from the base block 80. The tapered cutouts 30, 32 are formed into the tire portion 24 and extend from the flange 28 adjacent to the tire portion 24. The tapered cutouts 30, 32 include a pair of parallel flat vertical inner surfaces 34, 36, respectively, and a pair of flat tapered top surfaces 38, 40, respectively. The outer edge of the flat tapered top surfaces 38, 40 is each arcuate in shape to follow the periphery of the tire portion 24. A pair of notches 42, 44 are formed into the bit holder body 14 and extend from the flat annular top surface 20 through the upper body portion 18 and the middle portion 22, terminating at a point within the middle portion 22. The notches 42, 44 provide access and leverage for a tool to extract, or knock out, a bit from the bit holder body 14.

The shank 16 axially depends from the flange 28 of the bit holder body 14. The bit holder body 14 and the shank 16 are axially aligned about a bit holder bore 48 that extends from the flat annular top surface 20 of the bit holder body 14 to a distal end 50 of the shank 16. In this illustrated embodiment, the shank 16 includes a shortened 1½ inch length. In other embodiments, the shank 16 can include the standard 2⅝ inch length or other suitable length. The shank 16 comprises an increased diameter shortened top segment 52 that axially extends from the flange 28. A decreased diameter mediate segment 54 is adjacent to the increased diameter top segment 52. The decreased diameter mediate segment 54 can have a generally cylindrical shape, an arcuate shape, or can be tapered towards the increased diameter top segment 52 or towards the distal end 50 of the shank 16, as shown in this illustrated embodiment. The shank 16 also includes an annular shoulder 60 disposed between the decreased diameter mediate segment 54 and a lower segment 62. A diameter of the annular shoulder 60 increases, or steps up, as it axially extends from the decreased diameter mediate segment 54 to the lower segment 62. The lower segment 62, in this illustrated embodiment, is tapered outwardly as it extends towards the distal end 50 of the shank 16. The lower segment 62 runs axially from the annular shoulder 60 to a stepped shoulder 64 adjacent the distal end 50 of the shank 16. The stepped shoulder is disposed between the lower segment 62 and the distal end 50 of the shank 16. A diameter of the stepped shoulder 64 decreases, or steps down, as it axially extends from the lower segment 62 to a decreased diameter distal segment 66. The decreased diameter distal segment 66 axially extends from the stepped shoulder 64 to the distal end 50 of the shank 18 and is generally C-shaped when viewed from the distal end 50.

In this illustrated embodiment, the shank 16 also includes a slot 56 that extends from an upper termination 58 in the decreased diameter mediate segment 54 to the distal end 50 of the shank 16. Optionally, or in an alternate embodiment, the shank 16 can also include an internally oriented slot (not shown) that can be located approximately 180 degrees around the annular shank 16 from the first slot 56. This second slot is parallel to the first slot 56 and is an internal slot having a rearward semicircular termination (not shown) inwardly adjacent to the distal end 50 of the shank 16 and a forward semicircular termination (not shown) generally coinciding longitudinally and axially with the upper termination 58 of the first slot 56.

The base block 80 comprises a base 82 and a shortened front end or shortened bit holder receiving portion 84. The base 82 can be flat or slightly concave to fit a drum or additional mounting plates on which a singular or a plurality of base blocks can be mounted. The shortened front end 84 includes a base block bore 86, shown in FIGS. 4 and 7, that is symmetrical with the shank 16 along a centerline. The shortened front end 84 and the base block bore 86 extending axially through the shortened front end 84 are shortened to approximately 1.5 inches in length, in this embodiment, by removing material from the rear of the shortened front end 84. The shortened front end 84 includes, in this embodiment, an indentation 88 (FIGS. 4, 38, 39, and 50) on a front face 90 (FIG. 4) of the base block 80. The shortened front end 84 also includes, in this embodiment, a slot 92 (FIGS. 7, 8, 32, 47, and 49) decreasing in radial size from a rear face 92 (FIGS. 7 and 8) of the shortened front end 84 to a position mediate the front face 90. The slot 92 provides added room for a punch (not shown) to operate and push the shank of a bit out of the bit holder.

The base block 80 also includes an arcuate bore 86 extension 96 (FIGS. 7-9, 32, 35, 99, and 103) starting at an inner portion of the base block bore 86 adjacent the rear face 92 of the shortened front end 84 and extending toward a rear 98 (FIGS. 7-9, 35, 97, 99, and 103) of the base block 80. The extension 96 does not serve a function when the base block 84 is used with a shortened shank bit holder 12. However, over time the extreme forces from cutting conditions will wear the base block bore 86 and bit holder shank 16 such that the shortened shank bit holder 12 may not successfully be retained in the base block bore 86 and the shortened shank bit holder 12 must be replaced with a standard 2⅝ inch length shank bit holder (not shown). The extension 96 engages the 2⅝ inch long shank of the standard bit holder adjacent its distal end and provides sufficient sideways force against that portion of the shank to retain the standard bit holder in the base block 80 bore.

The shortened front end 84 also includes a pair of flat vertical sides 100, 102, shown in FIGS. 1-9, that extend near and/or adjacent to the base 82. The flat vertical sides 100, 102 reduce the dimensions of the base block 80 width and allow bit assemblies to be positioned in closer center-to-center axial bit tip orientation in order to degrade the road to a smoother surface. A vertical distance between a top portion 106 and a bottom portion 108 of the shortened front end 84 is greater than a horizontal distance between the flat vertical sides 100, 102 of the shortened front end 84.

To insert the bit holder 12 in the base block 80, the bit holder 12 is partially inserted into the bore 86 of the base block 80, the end cover 120 is mounted onto the rear face 94 of the shortened front end 84 of the base block 80, and the compact hydraulic cylinder body 162 is placed onto the flat annular top surface 20 of the bit holder 12. The bolt 164 is then inserted through the aperture 170 at the forward end 172 of the compact hydraulic cylinder body 162, through the bore 48 of the bit holder 12 and the base block bore 86, and through the bore 130 of the end cover 120. The nut 166 is then threaded onto the distal end 174 of the bolt 164, such that all components are fully preassembled and axially aligned about the bit holder 12 longitudinal axis with the hydraulic cylinder piston rod 188 in a relaxed, retracted position, as shown in FIGS. 40, 41, 44, 47, 50, 52, 53, 56, 58, and 59, prior to insertion of the bit holder 12 into the base block bore 86.

A hose 176 from the manually operated hydraulic pump 178 (FIGS. 40, 64, 74, 90, 106, and 116) or a hose 180 from the pneumatically operated hydraulic pump 182 (FIGS. 41, 65, 75, 91, 107, and 117) is connected to a cross or through hole 184 of the compact hydraulic cylinder body 162. The pneumatically operated hydraulic pump 182 operates under air pressure and can attain hydraulic pressure of 10,000 PSI. The hydraulic pressure of the air operated hydraulic pump 182 can be changed or adjusted by rotating a single screw (not shown) on the hydraulic pump 182. Operation of pump 178 or pump 182 causes the compact hydraulic cylinder body 162 to move axially towards the base block 80, extending the hydraulic cylinder piston rod 188 forward of the forward end 172 of the hydraulic cylinder body 162, as shown in FIGS. 45, 49, 51, 54, 55, 57, 60, and 61, thereby pushing the bit holder 12 into the bore 86 of the base block 80 until the annular back flange 28 of the bit holder body 14 seats on the front face 90 of the shortened front end 84 of the base block 80, achieving mounting of the bit holder 12 into the bore 86 of the base block 80 in less than 30 seconds. The bit assembly 10, without a bit, is shown prior to operation of the pump 178 or pump 182 in FIGS. 40, 41, 44, 47, 50, 52, 53, 56, 58, and 59 and is shown after mounting of the bit holder 12 in the base block 80 in FIGS. 45, 49, 51, 54, 55, 57, 60, and 61.

To extract the bit holder 12 from the base block 80, the distal end 194 of the extraction cup 168 is placed onto the forward end of the bit holder 12, such that the bit holder body 14 is completely enclosed within the generally cylindrical distal portion 428 of bore 420 of the extraction cup 168, and the compact hydraulic cylinder body 162 is placed onto the forward end 192 of the extraction cup 168. The bolt 164 is then inserted through the aperture 170 at the forward end of the hydraulic cylinder piston rod 188, and through the bore 48 of the bit holder 12 and the base block bore 86. The nut 166 is then threaded onto the distal end 174 of the bolt 164, with the hydraulic cylinder piston rod 188 in a relaxed, retracted position, as shown in FIGS. 91-94, 97, 100, 102, and 103, prior to extraction of the bit holder 12 from the base block bore 86.

The hose 176 from the manually operated hydraulic pump 178 (FIGS. 40, 64, 74, 90, 106, and 116) or the hose 180 from the pneumatically operated hydraulic pump 182 (FIGS. 41, 65, 75, 91, 107, and 117) is connected to the cross or through hole 184 of the compact hydraulic cylinder body 162. The pneumatically operated hydraulic pump 182 operates under air pressure and can attain hydraulic pressure of 10,000 PSI. The hydraulic pressure of the air operated hydraulic pump 182 can be changed or adjusted by rotating a single screw on the hydraulic pump 182. Operation of pump 178 or pump 182 causes the compact hydraulic cylinder body 162 to move axially and pull the bit holder 12 from the base block 80, extending the hydraulic cylinder piston rod 188 forward of the forward end 172 of the hydraulic cylinder body 162, as shown in FIGS. 95, 99, 101, 104, and 105, thereby pulling the bit holder 12 from the bore 86 of the base block 80, achieving extraction of the bit holder 12 from the bore 86 of the base block 80 in less than 30 seconds. The bit assembly 10, without a bit, is shown prior to operation of the pump 178 or pump 182 in FIGS. 91-94, 97, 100, 102, and 103 and is shown after extraction of the bit holder 12 in the base block 80 in FIGS. 95, 99, 101, 104, and 105.

Referring to FIGS. 62-71 and 104-113, a second embodiment of a bit assembly 200, without a bit, comprises a bit holder 202 and a base block 280. The bit holder 202 includes a bit holder body 204 and a shank 206 axially depending from the bottom of the bit holder body 204. The bit holder body 204 is generally annular in shape and comprises an annular or generally cylindrical upper body portion 208 axially extending from a top surface 210, such as a flat annular top surface. Subjacent the upper body portion 208 is a middle portion 212 that extends axially and radially outwardly to a radially extending generally cylindrical tire portion 214. The middle portion 212, in this illustrated embodiment, has an arcuate shape. In other embodiments, the middle portion 212 can have a frustoconical shape, a convex shape, or a concave shape and the tire portion 214 can have an arcuate shape.

Adjacent the tire portion 214 is a chamfer or tapered portion 216 that axially extends to a flange 218, such as a flat annular flange, of the bit holder body 204. The tire portion 214 includes a pair of tapered cutouts 220, 222, or wedge-shaped undercuts, to provide access and leverage for a tool to extract the bit holder 202 from the base block 280. The tapered cutouts 220, 222 are formed into the tire portion 214 and extend from the flange 218 adjacent to the tire portion 214. The tapered cutouts 220, 222 include a pair of parallel flat vertical inner surfaces 224, 226, respectively, and a pair of flat tapered top surfaces 228, 230, respectively. The outer edge of the flat tapered top surfaces 228, 230 is each arcuate in shape to follow the periphery of the tire portion 214. A pair of notches 232, 234 are formed into the bit holder body 204 and extend from the flat annular top surface 210 through the upper body portion 208, terminating at a point adjacent the middle portion 212. The notches 232, 234 provide access and leverage for a tool to extract, or knock out, a bit from the bit holder body 204.

The shank 206 axially depends from the flange 218 of the bit holder body 204. The bit holder body 204 and the shank 206 are axially aligned about a bit holder bore 236 that extends from the flat annular top surface 210 of the bit holder body 204 to a distal end 238 of the shank 206. In this illustrated embodiment, the shank 206 includes a standard 2¾ or 2⅝ inch length. In other embodiments, the shank can include a shortened 1½ inch length or other suitable length. The shank 206 comprises a tapered top segment 240 that axially extends from the flange 218. The tapered top segment includes an annular groove 242 adapted to receive a flexible ring or annular non-continuous ring 244. A decreased diameter mediate segment 246 is adjacent to the tapered top segment 240. The decreased diameter mediate segment 246 can have a generally cylindrical shape, an arcuate shape, or can be tapered towards the tapered top segment 240, as shown in this illustrated embodiment, or can be tapered towards the distal end 238 of the shank 206. The shank 206 also includes an annular shoulder 248 disposed between the decreased diameter mediate segment 246 and a lower segment 250. A diameter of the annular shoulder 248 increases, or steps up, as it axially extends from the decreased diameter mediate segment 246 to the lower segment 250. The lower segment 250, in this illustrated embodiment, is tapered outwardly as it extends towards the distal end 238 of the shank 206. The lower segment 248 includes an annular groove 252 adapted to receive a flexible ring or annular non-continuous ring 254. The lower segment 250 runs axially from the annular shoulder 248 to a stepped shoulder 256 adjacent the distal end 238 of the shank 206. The stepped shoulder 256 is disposed between the lower segment 250 and the distal end 238 of the shank 206. A diameter of the stepped shoulder 256 decreases, or steps down, as it axially extends from the lower segment 250 to a decreased diameter distal segment 258. The decreased diameter distal segment 258 axially extends from the stepped shoulder 256 to the distal end 238 of the shank 206 and is generally C-shaped when viewed from the distal end 238.

In this illustrated embodiment, the shank 206 also includes a first slot 260 that extends from an upper termination 262 in the decreased diameter mediate segment 246, adjacent the top segment 240, to the distal end 238 of the shank 206. The shank 206 also includes an internally oriented second slot 264 that can be located approximately 180 degrees around the annular shank 206 from the first slot 260. This second slot 264 is parallel to the first slot 260 and is an internal slot having a rearward semicircular termination 266 inwardly adjacent to the distal end 238 of the shank 206 and a forward semicircular termination 268 generally coinciding longitudinally and axially with the upper termination 262 of the first slot 260.

The base block 280 comprises a base 282 and a bit holder receiving portion 284. The base 282 can be flat or slightly concave to fit a drum or additional mounting plates on which a singular or a plurality of base blocks can be mounted. The receiving portion 284 includes a base block bore 286, shown in FIGS. 62 and 104, that is symmetrical with the shank 206 along a centerline. The base block bore 286, in this illustrated embodiment, includes a tapered portion 294 axially extending from a front face 298 of the receiving portion 284 to a generally cylindrical portion 296 that axially extends to a rear face 290 of the receiving portion 284. The base block 280 includes an arcuate bore 286 extension 288 (FIGS. 69, 71, 111, and 113) axially extending from a distal end of the base block bore 286 adjacent the rear face 290 of the receiving portion 284 and extending toward a rear 292 (FIGS. 69, 71, 111, and 113) of the base block 280. In this illustrated embodiment, the arcuate bore 286 extension 288 is generally cylindrical and continuous with the base block bore 286. In other embodiments, the arcuate bore 286 extension 288 can be tapered and/or not continuous with the base block bore 286.

To insert the bit holder 202 in the base block 280, the bit holder 202 is partially inserted into the bore 286 of the base block 280, the end cover 120 is mounted onto the rear face 290 of the bit holder receiving portion 284 of the base block 280, and the compact hydraulic cylinder body 162 is placed onto the flat annular top surface 210 of the bit holder 202. The bolt 164 is then inserted through the aperture 170 at the forward end 172 of the compact hydraulic cylinder body 162, through the bore 236 of the bit holder 202 and the base block bore 286, and through the bore 130 of the end cover 120. The nut 166 is then threaded onto the distal end 174 of the bolt 164, such that all components are axially aligned about the bit holder 202 longitudinal axis with the hydraulic cylinder piston rod 188 in a relaxed, retracted position, as shown in FIGS. 63-66 and 69, prior to insertion of the bit holder 202 into the base block bore 286.

Figure 67:
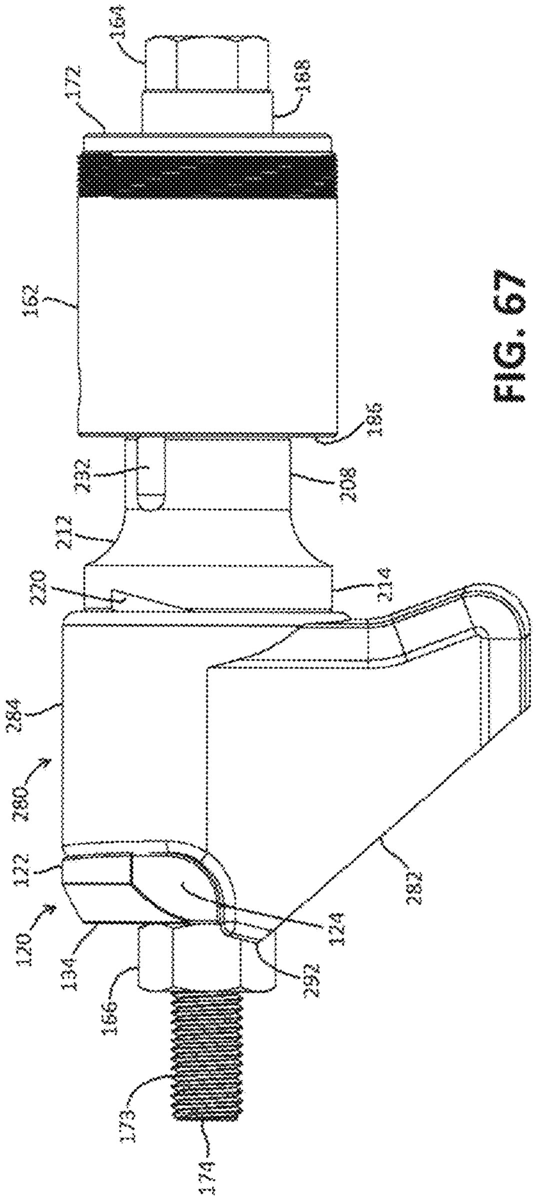
FIG. 67 is a side elevation view of the first embodiment of the insertion and extraction system, showing the bolt, the compact hydraulic cylinder, and the nut, assembled with the second embodiment of the bit assembly, without a bit, showing the second embodiment of the bit holder, the second embodiment of the base block, and the end cover, after fully mounting the bit holder in the base block bore, in accordance with implementations of this disclosure.
Figure 69:
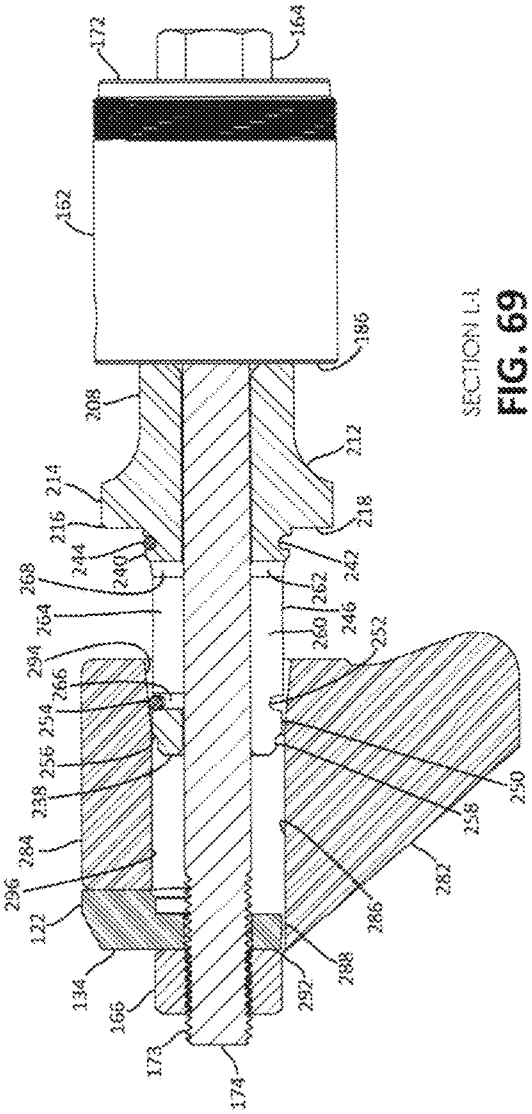
FIG. 69 is a cross-sectional view of the first embodiment of the insertion and extraction system, taken along line L-L of FIG. 68, showing the bolt, the compact hydraulic cylinder, and the nut, assembled with the second embodiment of the bit assembly, without a bit, showing the second embodiment of the bit holder, the second embodiment of the base block, and the end cover, prior to fully mounting the bit holder in the base block bore, in accordance with implementations of this disclosure.
Figure 71:
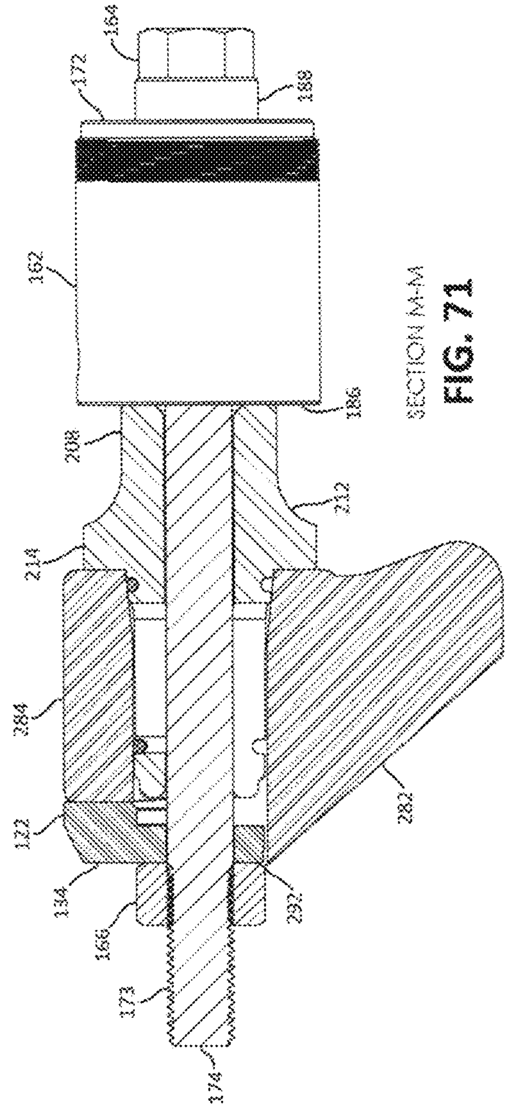
FIG. 71 is a cross-sectional view of the first embodiment of the insertion and extraction system, taken along line M-M of FIG. 70, showing the bolt, the compact hydraulic cylinder, and the nut, assembled with the second embodiment of the bit assembly, without a bit, showing the second embodiment of the bit holder, the second embodiment of the base block, and the end cover, after fully mounting the bit holder in the base block bore, in accordance with implementations of this disclosure.
Figure 68:
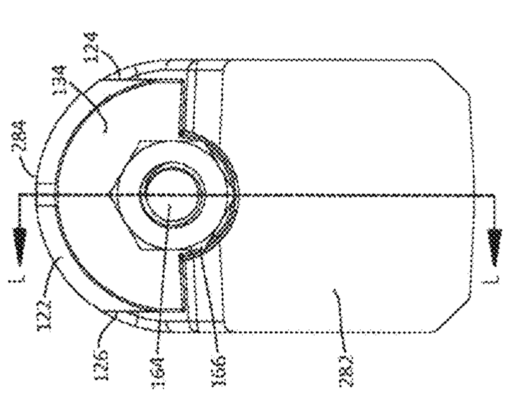
FIG. 68 is a rear elevation view of the first embodiment of the insertion and extraction system, showing the bolt, the compact hydraulic cylinder, and the nut, assembled with the second embodiment of the bit assembly, without a bit, showing the second embodiment of the bit holder, the second embodiment of the base block, and the end cover, prior to fully mounting the bit holder in the base block bore, in accordance with implementations of this disclosure.
Figure 70:
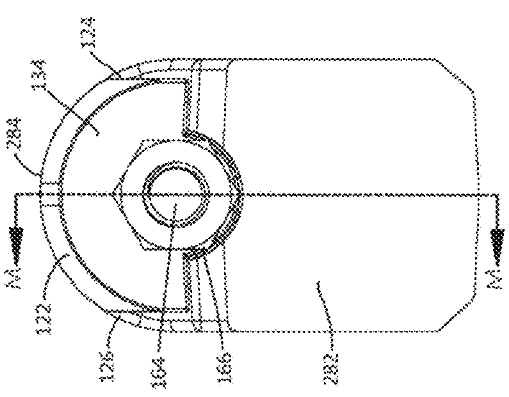
FIG. 70 is a rear elevation view of the first embodiment of the insertion and extraction system, showing the bolt, the compact hydraulic cylinder, and the nut, assembled with the second embodiment of the bit assembly, without a bit, showing the second embodiment of the bit holder, the second embodiment of the base block, and the end cover, after fully mounting the bit holder in the base block bore, in accordance with implementations of this disclosure.
Figure 72:
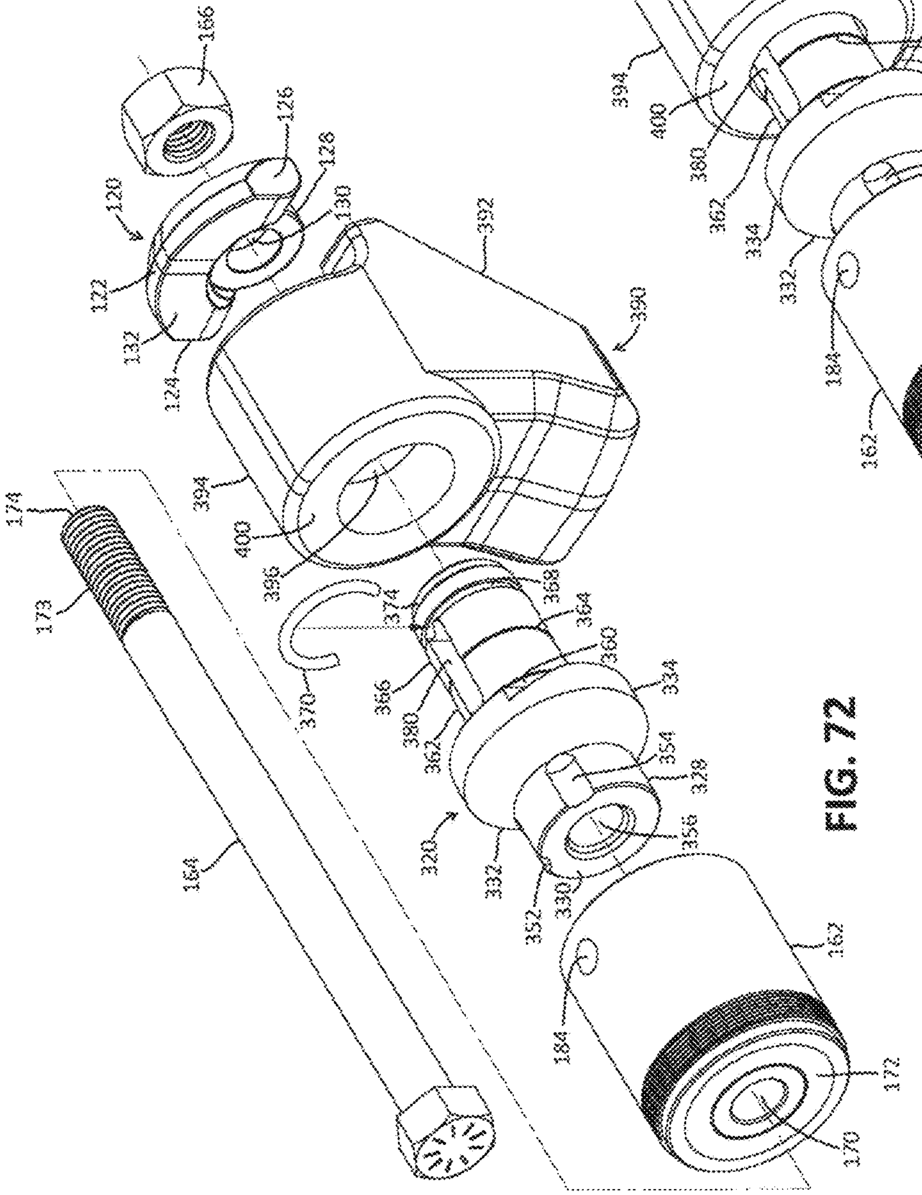
FIG. 72 is an exploded perspective view of the first embodiment of the insertion and extraction system, showing the bolt, the compact hydraulic cylinder, and the nut, and a third embodiment of a bit assembly, without a bit, showing a bit holder, a base block, and the end cover, in accordance with implementations of this disclosure.
Figure 73:
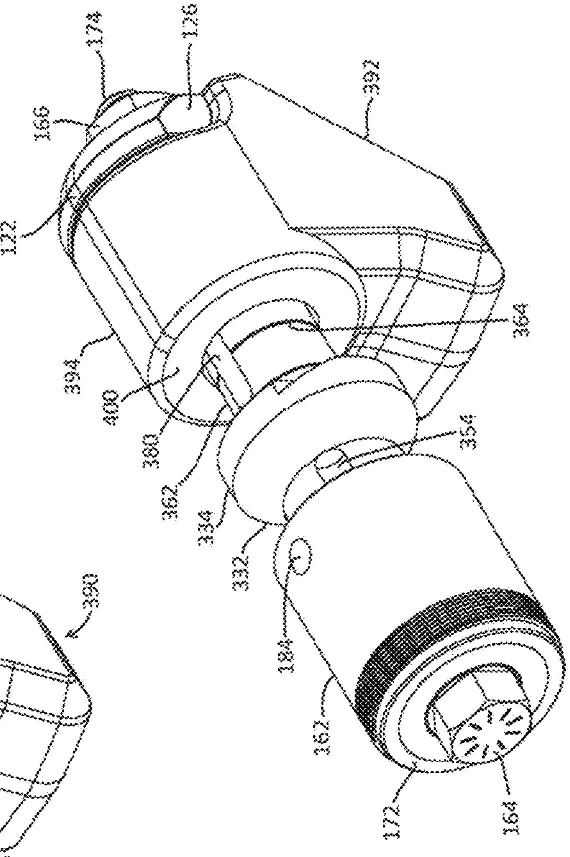
FIG. 73 is a perspective view of the first embodiment of the insertion and extraction system assembled onto the third embodiment of the bit assembly, without a bit, prior to fully mounting the bit holder in the base block bore, in accordance with implementations of this disclosure.
Figure 74:
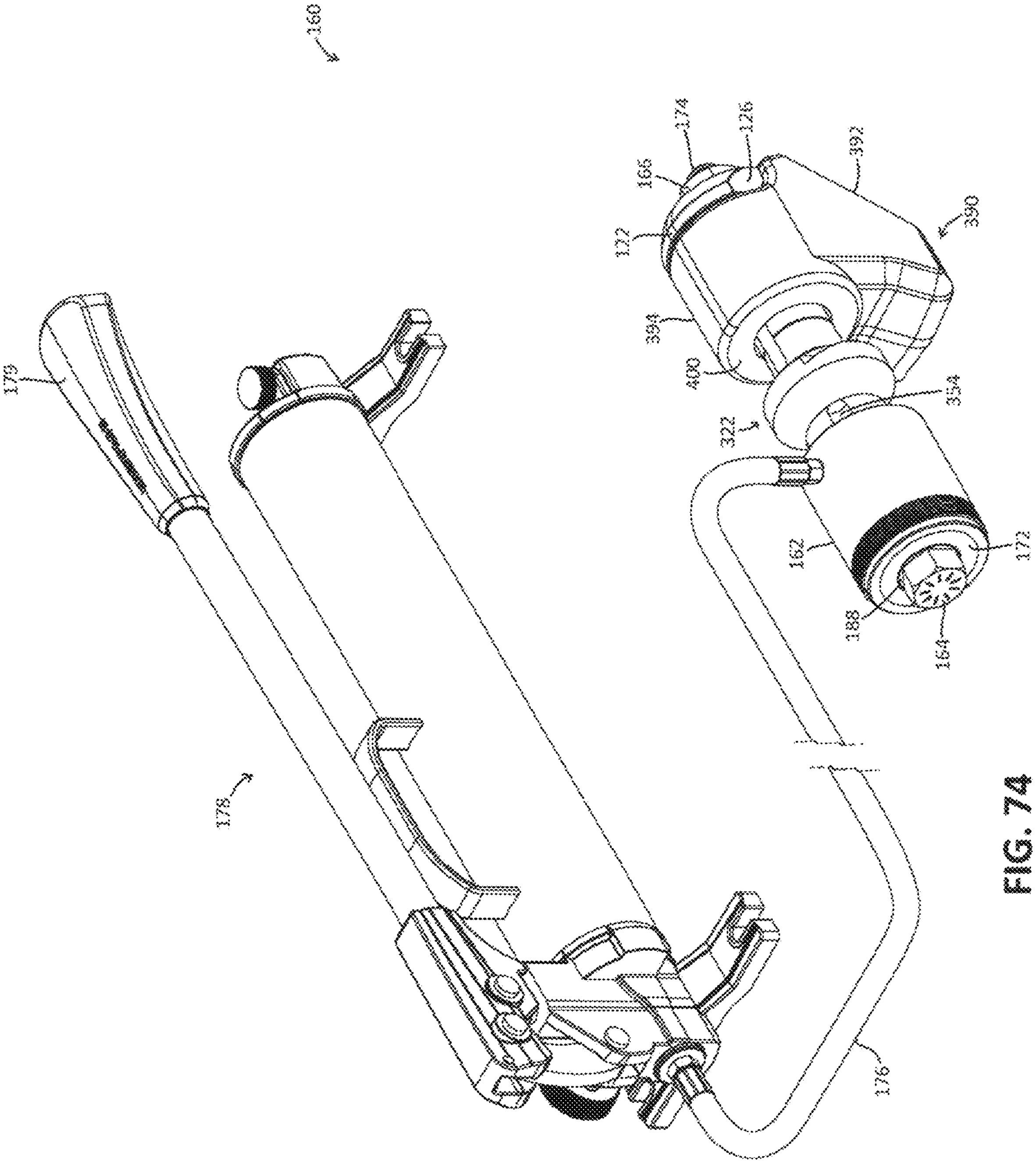
FIG. 74 is a perspective view of the first embodiment of the insertion and extraction system, showing the compact hydraulic cylinder connected to a hydraulic pump, assembled onto the third embodiment of the bit assembly, without a bit, prior to fully mounting the bit holder in the base block bore, in accordance with implementations of this disclosure.
Figure 75:
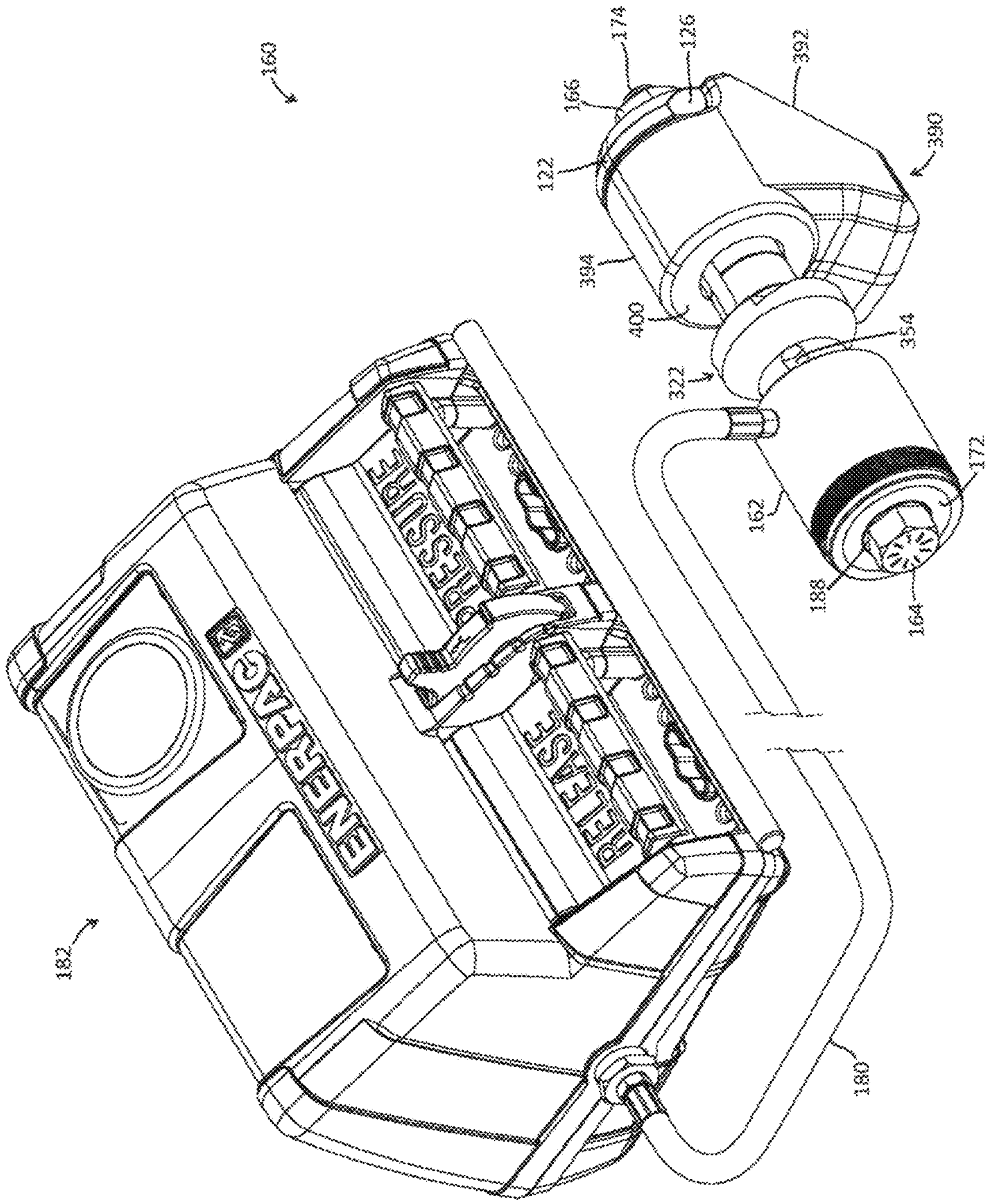
FIG. 75 is a perspective view of the first embodiment of the insertion and extraction system, showing the compact hydraulic cylinder connected to a pneumatically operated hydraulic pump, assembled onto the third embodiment of the bit assembly, without a bit, prior to fully mounting the bit holder in the base block bore, in accordance with implementations of this disclosure.
Figure 76:
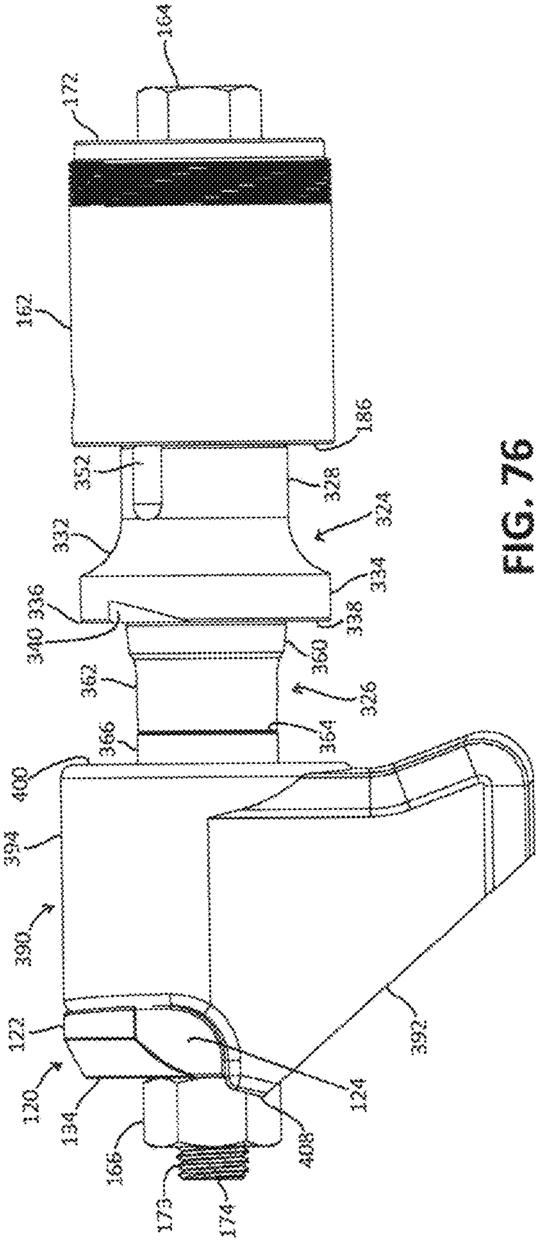
FIG. 76 is a side elevation view of the first embodiment of the insertion and extraction system, showing the bolt, the compact hydraulic cylinder, and the nut, assembled with the third embodiment of the bit assembly, without a bit, showing the third embodiment of the bit holder, the third embodiment of the base block, and the end cover, prior to fully mounting the bit holder in the base block bore, in accordance with implementations of this disclosure.

The hose 176 from the manually operated hydraulic pump 178 (FIGS. 40, 64, 74, 90, 106, and 116) or the hose 180 from the pneumatically operated hydraulic pump 182 (FIGS. 41, 65, 75, 91, 107, and 117) is connected to the cross or through hole 184 of the compact hydraulic cylinder body 162. The pneumatically operated hydraulic pump 182 operates under air pressure and can attain hydraulic pressure of 10,000 PSI. The hydraulic pressure of the air operated hydraulic pump 182 can be changed or adjusted by rotating a single screw (not shown) on the hydraulic pump 182. Operation of pump 178 or pump 182 causes the compact hydraulic cylinder body 162 to move axially and force the compact hydraulic cylinder body 162 toward the base block 280, as shown in FIGS. 67 and 71, thereby pushing the bit holder 202 into the bore 286 of the base block 280 until the annular back flange 218 of the bit holder body 204 seats on the front face 298 of the bit holder receiving portion 284 of the base block 280, achieving mounting of the bit holder 202 into the bore 286 of the base block 280 in less than 30 seconds. The bit assembly 200, without a bit, is shown prior to operation of the pump 178 or pump 182 in FIGS. 63-66 and 69 and is shown after mounting of the bit holder 202 in the base block 280 in FIGS. 67 and 71.

To extract the bit holder 202 from the base block 280, the distal end 194 of the extraction cup 168 is placed onto the forward end of the bit holder 202, such that the bit holder body 204 is completely enclosed within the generally cylindrical distal portion 428 of bore 420 of the extraction cup 168, and the compact hydraulic cylinder body 162 is placed onto the forward end 192 of the extraction cup 168. The bolt 164 is then inserted through the aperture 170 at the forward end of the hydraulic cylinder piston rod 188, and through the bore 236 of the bit holder 202 and the base block bore 286. The nut 166 is then threaded onto the distal end 174 of the bolt 164, with the hydraulic cylinder piston rod 188 in a relaxed, retracted position, as shown in FIGS. 107-110 and 113, prior to extraction of the bit holder 202 from the base block bore 286.

Figure 111:
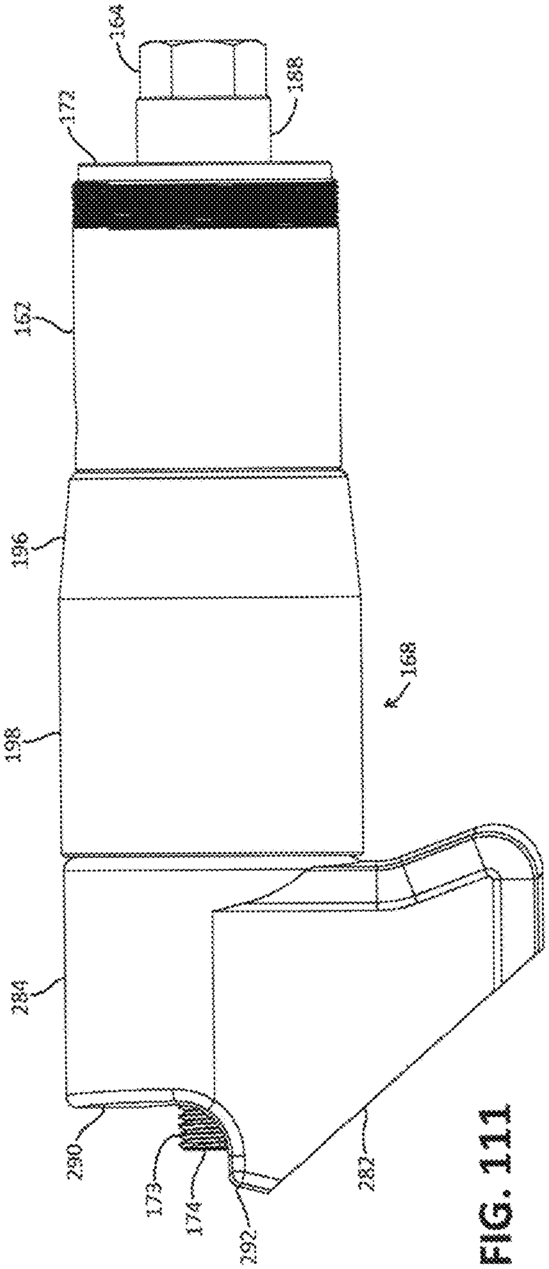
FIG. 111 is a side elevation view of the first embodiment of the insertion and extraction system, showing the bolt, the compact hydraulic cylinder, the extraction cup, and the nut, assembled with the second embodiment of the bit assembly, without a bit, showing the second embodiment of the bit holder, the second embodiment of the base block, and the end cover, after partially extracting the bit holder from the base block bore, in accordance with implementations of this disclosure.
Figures 112, 113, 114, 115:
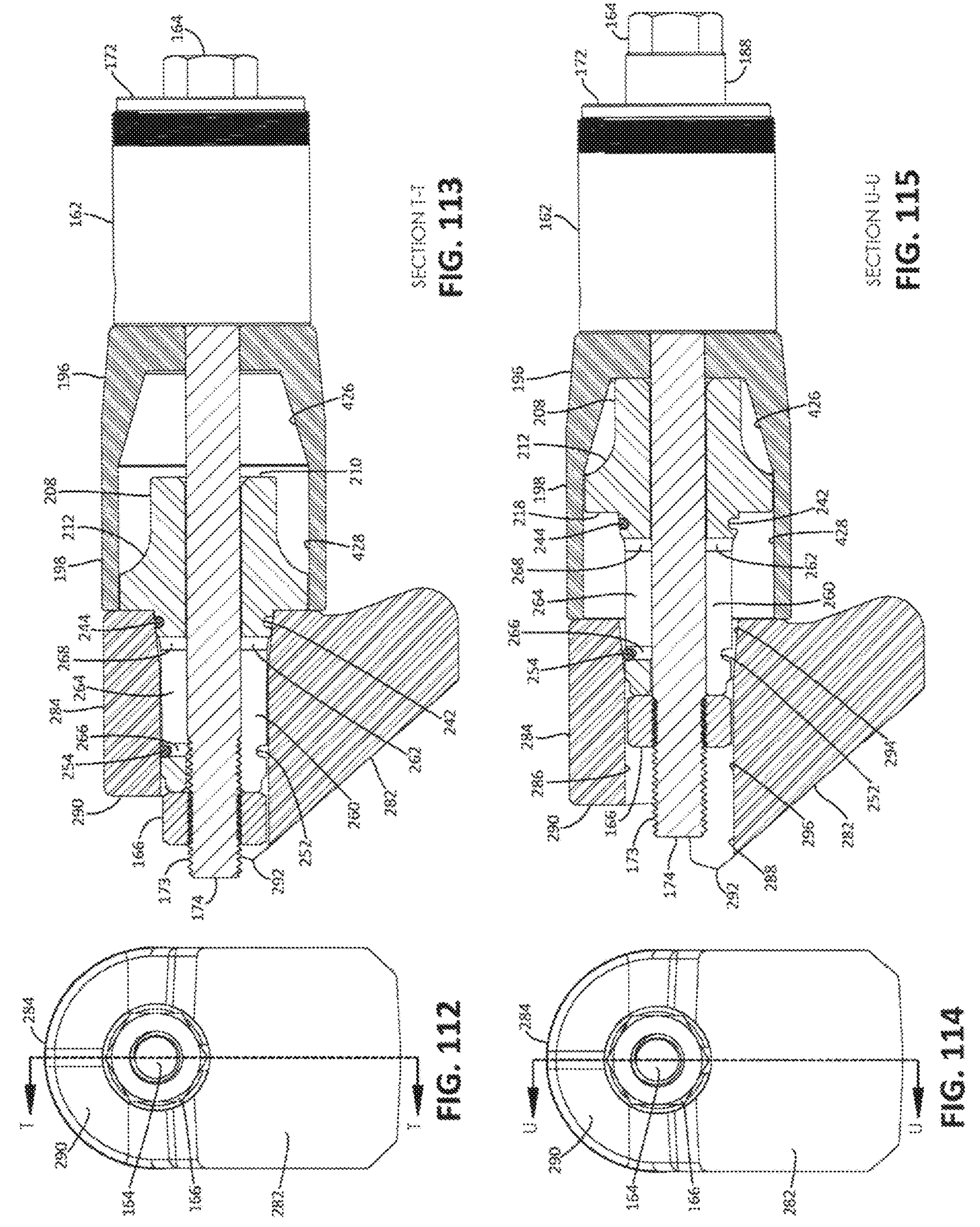
FIG. 112 is a rear elevation view of the first embodiment of the insertion and extraction system, showing the bolt, the compact hydraulic cylinder, the extraction cup, and the nut, assembled with the second embodiment of the bit assembly, without a bit, showing the second embodiment of the bit holder, the second embodiment of the base block, and the end cover, prior to extracting the bit holder from the base block bore, in accordance with implementations of this disclosure.
FIG. 113 is a cross-sectional view of the first embodiment of the insertion and extraction system, taken along line T-T of FIG. 112, showing the bolt, the compact hydraulic cylinder, the extraction cup, and the nut, assembled with the second embodiment of the bit assembly, without a bit, showing the second embodiment of the bit holder, the second embodiment of the base block, and the end cover, prior to extracting the bit holder from the base block bore, in accordance with implementations of this disclosure.
FIG. 114 is a rear elevation view of the first embodiment of the insertion and extraction system, showing the bolt, the compact hydraulic cylinder, the extraction cup, and the nut, assembled with the second embodiment of the bit assembly, without a bit, showing the second embodiment of the bit holder, the second embodiment of the base block, and the end cover, after partially extracting the bit holder from the base block bore, in accordance with implementations of this disclosure.
FIG. 115 is a cross-sectional view of the first embodiment of the insertion and extraction system, taken along line U-U of FIG. 114, showing the bolt, the compact hydraulic cylinder, the extraction cup, and the nut, assembled with the second embodiment of the bit assembly, without a bit, showing the second embodiment of the bit holder, the second embodiment of the base block, and the end cover, after partially extracting the bit holder from the base block bore, in accordance with implementations of this disclosure.
Figures 116, 117:
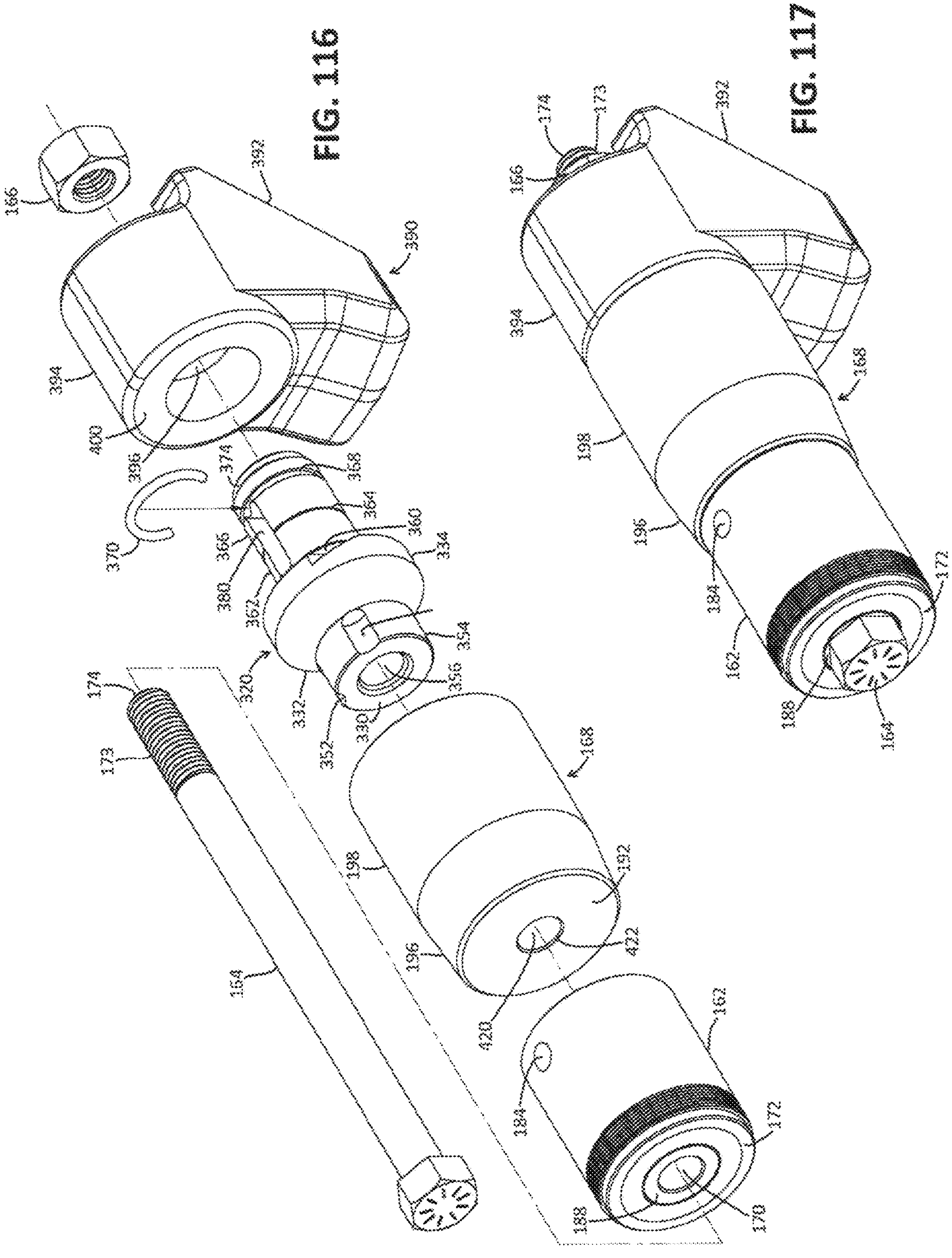
FIG. 116 is an exploded perspective view of the first embodiment of the insertion and extraction system, showing the bolt, the compact hydraulic cylinder, the extraction cup, and the nut, and the third embodiment of the bit assembly, without a bit, showing the third embodiment of the bit holder, the third embodiment of the base block, and the end cover, in accordance with implementations of this disclosure.
Figure 118:
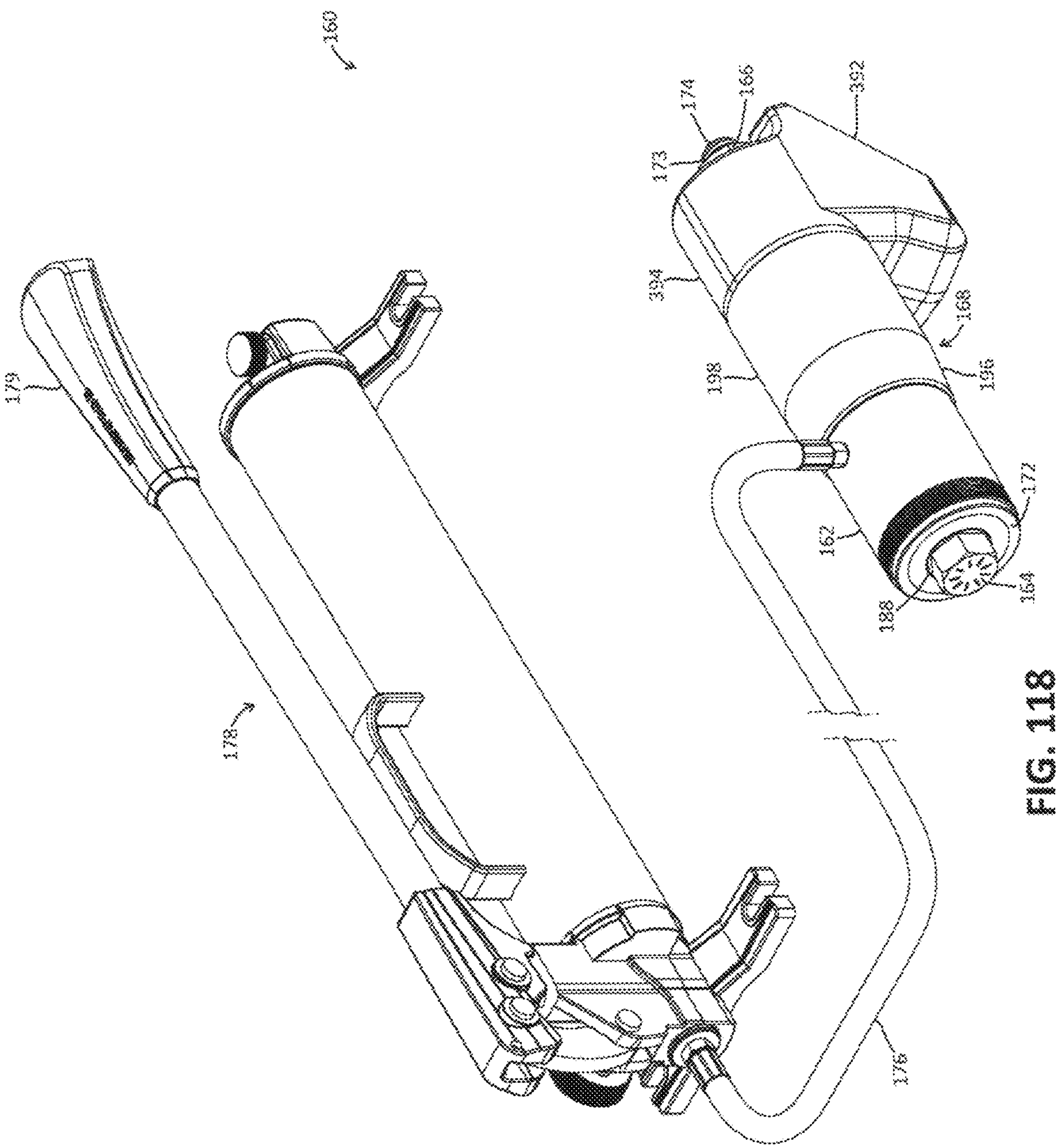
Figure 119:
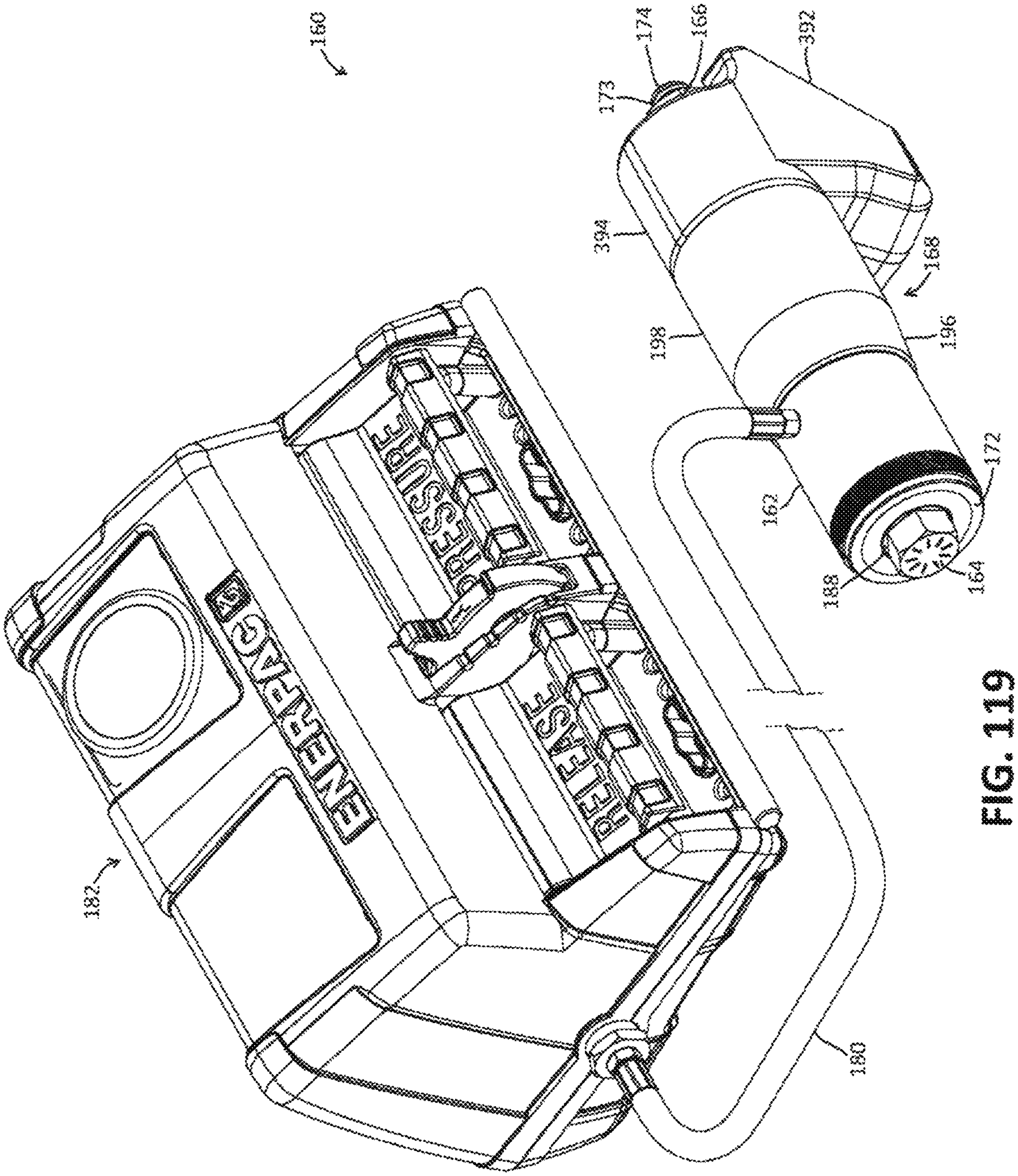

The hose 176 from the manually operated hydraulic pump 178 (FIGS. 40, 64, 74, 90, 106, and 116) or the hose 180 from the pneumatically operated hydraulic pump 182 (FIGS. 41, 65, 75, 91, 107, and 117) is connected to the cross or through hole 184 of the compact hydraulic cylinder body 162. The pneumatically operated hydraulic pump 182 operates under air pressure and can attain hydraulic pressure of 10,000 PSI. The hydraulic pressure of the air operated hydraulic pump 182 can be changed or adjusted by rotating a single screw on the hydraulic pump 182. Operation of pump 178 or pump 182 causes the compact hydraulic cylinder body 162 to move axially and pull the bit holder 202 from the base block 280, extending the hydraulic cylinder piston rod 188 forward of the forward end 172 of the hydraulic cylinder body 162, as shown in FIGS. 111 and 115, thereby pulling the bit holder 202 from the bore 286 of the base block 280, achieving extraction of the bit holder 202 from the bore 286 of the base block 280 in less than 30 seconds. The bit assembly 200, without a bit, is shown prior to operation of the pump 178 or pump 182 in FIGS. 107-110 and 113 and is shown after extraction of the bit holder 202 from the base block 280 in FIGS. 111 and 115.

Referring to FIGS. 72-81 and 114-123, a third embodiment of a bit assembly 320, without a bit, comprises a bit holder 322 and a base block 390. The bit holder 322 includes a bit holder body 324 and a shank 326 axially depending from the bottom of the bit holder body 324. The bit holder body 324 is generally annular in shape and comprises an annular or generally cylindrical upper body portion 328 axially extending from a top surface 330, such as a flat annular top surface. Subjacent the upper body portion 328 is a middle portion 332 that extends axially and radially outwardly to a radially extending generally cylindrical tire portion 334. The middle portion 332, in this illustrated embodiment, has an arcuate shape. In other embodiments, the middle portion 332 can have a frustoconical shape, a convex shape, or a concave shape and the tire portion 334 can have an arcuate shape.

Adjacent the tire portion 334 is a chamfer or tapered portion 336 that axially extends to a flange 338, such as a flat annular flange, of the bit holder body 324. The tire portion 334 includes a pair of tapered cutouts 340, 342, or wedge-shaped undercuts, to provide access and leverage for a tool to extract the bit holder 322 from the base block 390. The tapered cutouts 340, 342 are formed into the tire portion 334 and extend from the flange 338 adjacent to the tire portion 334. The tapered cutouts 340, 342 include a pair of parallel flat vertical inner surfaces 344, 346, respectively, and a pair of flat tapered top surfaces 348, 350, respectively. The outer edge of the flat tapered top surfaces 348, 350 is each arcuate in shape to follow the periphery of the tire portion 334. A pair of notches 352, 354 are formed into the bit holder body 324 and extend from the flat annular top surface 330 through the upper body portion 328, terminating at a point adjacent the middle portion 332. The notches 352, 354 provide access and leverage for a tool to extract, or knock out, a bit from the bit holder body 324.

The shank 326 axially depends from the flange 338 of the bit holder body 324. The bit holder body 324 and the shank 326 are axially aligned about a bit holder bore 356 that extends from the flat annular top surface 330 of the bit holder body 324 to a distal end 358 of the shank 326. In this illustrated embodiment, the shank 326 includes a standard 2¾ or 2⅝ inch length. In other embodiments, the shank can include a shortened 1½ inch length or other suitable length. The shank 326 comprises a tapered top segment 360 that axially extends from the flange 338. A decreased diameter mediate segment 362 is adjacent to the tapered top segment 360. The decreased diameter mediate segment 360 can have a generally cylindrical shape, an arcuate shape, or can be tapered towards the tapered top segment 360, as shown in this illustrated embodiment, or can be tapered towards the distal end 358 of the shank 326. The shank 326 also includes an annular shoulder 364 disposed between the decreased diameter mediate segment 362 and a lower segment 366. A diameter of the annular shoulder 364 increases, or steps up, as it axially extends from the decreased diameter mediate segment 362 to the lower segment 366. The lower segment 366, in this illustrated embodiment, is tapered outwardly as it extends towards the distal end 358 of the shank 326. The lower segment 366 includes an annular groove 368 adapted to receive a flexible ring or annular non-continuous ring 370. The lower segment 366 runs axially from the annular shoulder 364 to a stepped shoulder 372 adjacent the distal end 358 of the shank 326. The stepped shoulder 372 is disposed between the lower segment 366 and the distal end 358 of the shank 326. A diameter of the stepped shoulder 372 decreases, or steps down, as it axially extends from the lower segment 366 to a decreased diameter distal segment 374. The decreased diameter distal segment 374 axially extends from the stepped shoulder 372 to the distal end 358 of the shank 326 and is generally C-shaped when viewed from the distal end 358.

To insert the bit holder 322 in the base block 390, the bit holder 322 is partially inserted into the bore 396 of the base block 390, the end cover 120 is mounted onto the rear face 404 of the bit holder receiving portion 394 of the base block 390, and the compact hydraulic cylinder body 162 is placed onto the flat annular top surface 330 of the bit holder 322. The bolt 164 is then inserted through the aperture 170 at the forward end 172 of the compact hydraulic cylinder body 162, through the bore 356 of the bit holder 322 and the base block bore 396, and through the bore 130 of the end cover 120. The nut 166 is then threaded onto the distal end 174 of the bolt 164, such that all components are axially aligned about the bit holder 322 longitudinal axis with the hydraulic cylinder piston rod 188 in a relaxed, retracted position, as shown in FIGS. 73-76 and 79, prior to insertion of the bit holder 322 into the base block bore 396.

The base block 390 comprises a base 392 and a bit holder receiving portion 394. The base 392 can be flat or slightly concave to fit a drum or additional mounting plates on which a singular or a plurality of base blocks can be mounted. The receiving portion 394 includes a base block bore 396, shown in FIGS. 72 and 114, that is symmetrical with the shank 326 along a centerline. The base block bore 396, in this illustrated embodiment, includes a tapered portion 398 axially extending from a front face 400 of the receiving portion 394 to a generally cylindrical portion 402 that axially extends to a rear face 404 of the receiving portion 394. The base block 390 includes an arcuate bore 396 extension 406 (FIGS. 79, 121, and 123) axially extending from a distal end of the base block bore 286 adjacent the rear face 404 of the receiving portion 394 and extending toward a rear 408 (FIGS. 79, 80, 121, and 123) of the base block 390. In this illustrated embodiment, the arcuate bore 396 extension 408 is generally cylindrical and continuous with the base block bore 396. In other embodiments, the arcuate bore 3966 extension 408 can be tapered and/or not continuous with the base block bore 396.

To insert the bit holder 322 in the base block 390, the bit holder 322 is partially inserted into the bore 396 of the base block 390, the washer 120 is mounted onto the rear face 404 of the bit holder receiving portion 394 of the base block 390, and the compact hydraulic cylinder body 162 is placed onto the flat annular top surface 330 of the bit holder 322. The bolt 164 is then inserted through the aperture 170 at the forward end 172 of the compact hydraulic cylinder body 162, through the bore 356 of the bit holder 322 and the base block bore 396, and through the bore 130 of the washer 120. The nut 166 is then threaded onto the distal end 174 of the bolt 164, such that all components are axially aligned about the bit holder 322 longitudinal axis with the hydraulic cylinder piston rod 188 in a relaxed, retracted position, as shown in FIGS. 73-76 and 79, prior to insertion of the bit holder 322 into the base block bore 396.

Figure 77:
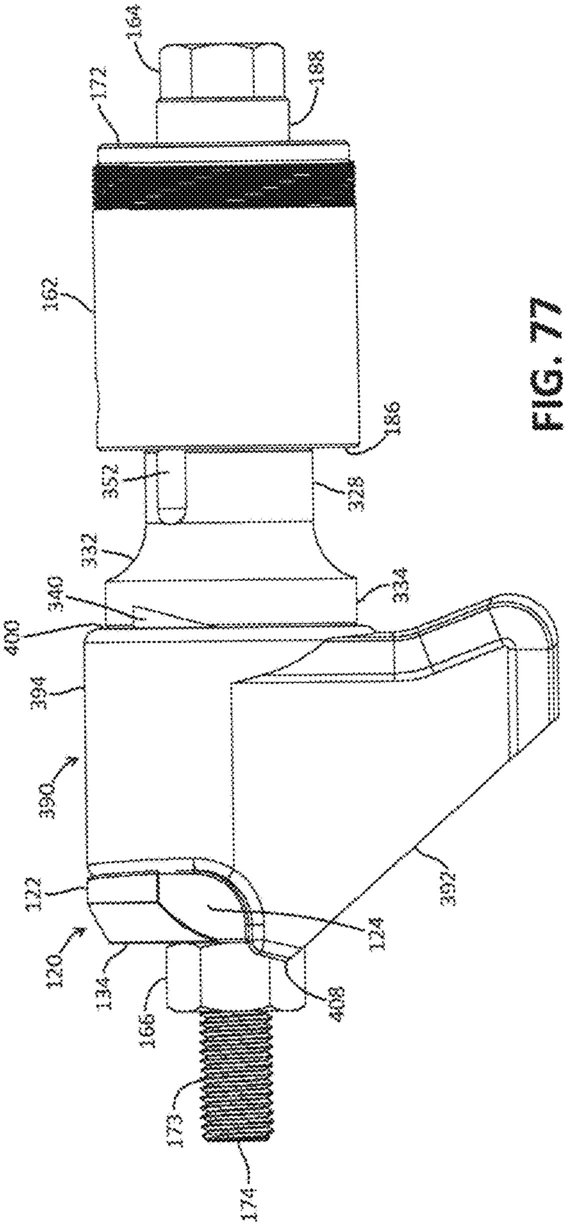
FIG. 77 is a side elevation view of the first embodiment of the insertion and extraction system, showing the bolt, the compact hydraulic cylinder, and the nut, assembled with the third embodiment of the bit assembly, without a bit, showing the bit holder, the base block, and the end cover, after fully mounting the bit holder in the base block bore, in accordance with implementations of this disclosure.
Figure 79:
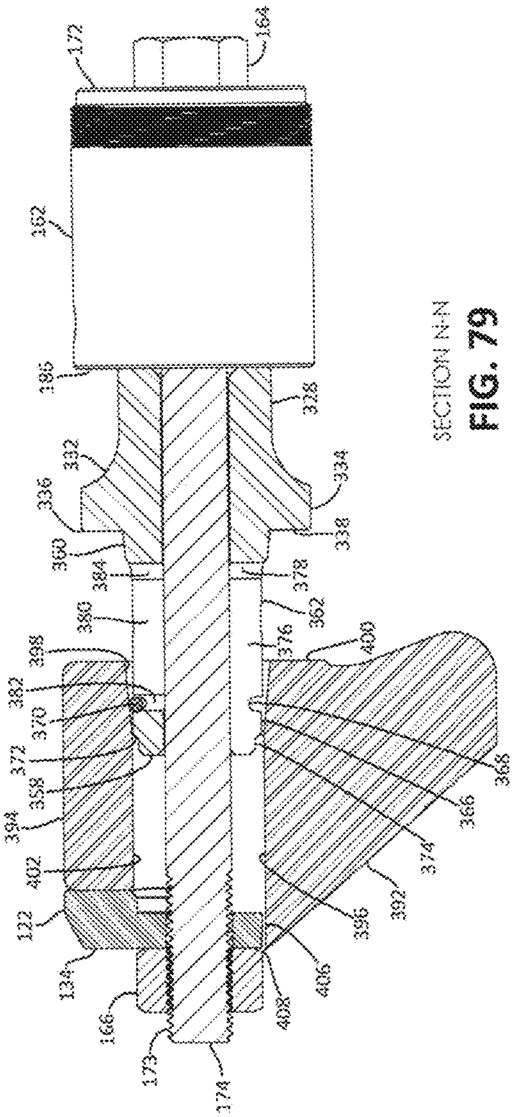
FIG. 79 is a cross-sectional view of the first embodiment of the insertion and extraction system, taken along line N-N of FIG. 78, showing the bolt, the compact hydraulic cylinder, and the nut, assembled with the third embodiment of the bit assembly, without a bit, showing the bit holder, the base block, and the end cover, prior to fully mounting the bit holder in the base block bore, in accordance with implementations of this disclosure.
Figure 81:
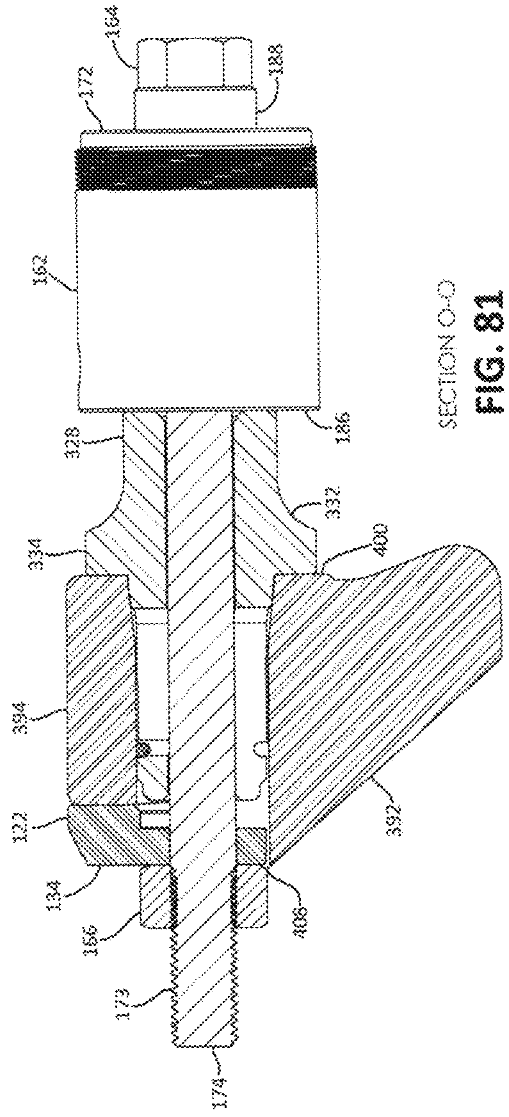
FIG. 81 is a cross-sectional view of the first embodiment of the insertion and extraction system, taken along line O—O of FIG. 80, showing the bolt, the compact hydraulic cylinder, and the nut, assembled with the third embodiment of the bit assembly, without a bit, showing the bit holder, the base block, and the end cover, after fully mounting the bit holder in the base block bore, in accordance with implementations of this disclosure.
Figure 78:
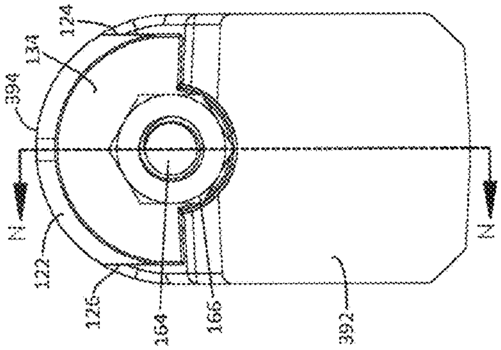
FIG. 78 is a rear elevation view of the first embodiment of the insertion and extraction system, showing the bolt, the compact hydraulic cylinder, and the nut, assembled with the third embodiment of the bit assembly, without a bit, showing the bit holder, the base block, and the end cover, prior to fully mounting the bit holder in the base block bore, in accordance with implementations of this disclosure.
Figure 80:
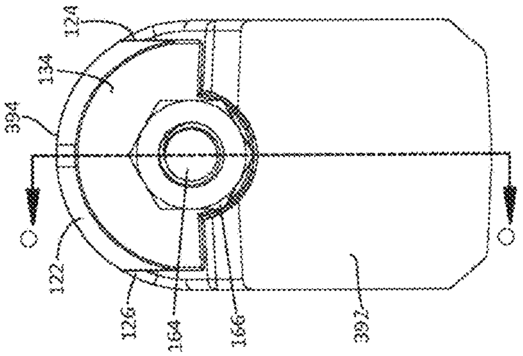
FIG. 80 is a rear elevation view of the first embodiment of the insertion and extraction system, showing the bolt, the compact hydraulic cylinder, and the nut, assembled with the third embodiment of the bit assembly, without a bit, showing the bit holder, the base block, and the end cover, after fully mounting the bit holder in the base block bore, in accordance with implementations of this disclosure.
Figure 82:
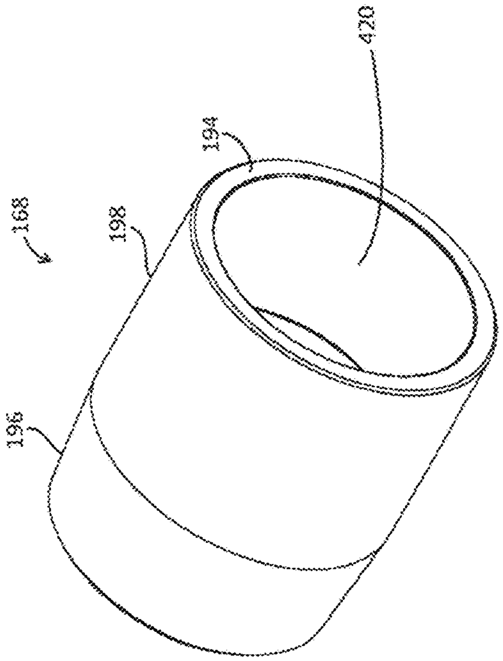
FIG. 82 is a perspective view of a first embodiment of an extraction cup of the first embodiment of the insertion and extraction system in accordance with implementations of this disclosure.
Figure 84:
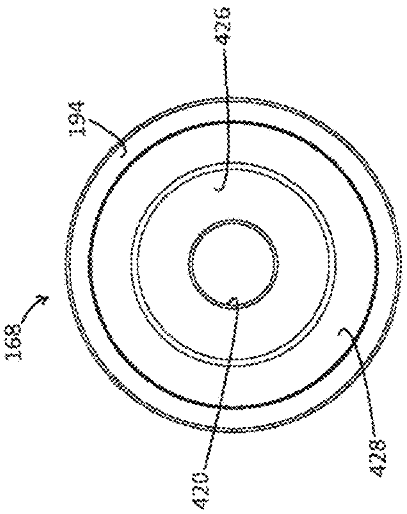
FIG. 84 is a top elevation view of the first embodiment of the extraction cup of the first embodiment of the insertion and extraction system in accordance with implementations of this disclosure.
Figure 83:
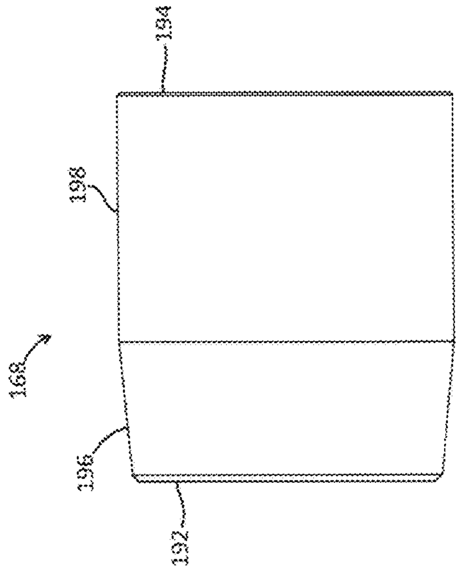
FIG. 83 is a side elevation view of the first embodiment of the extraction cup of the first embodiment of the insertion and extraction system in accordance with implementations of this disclosure.
Figure 85:
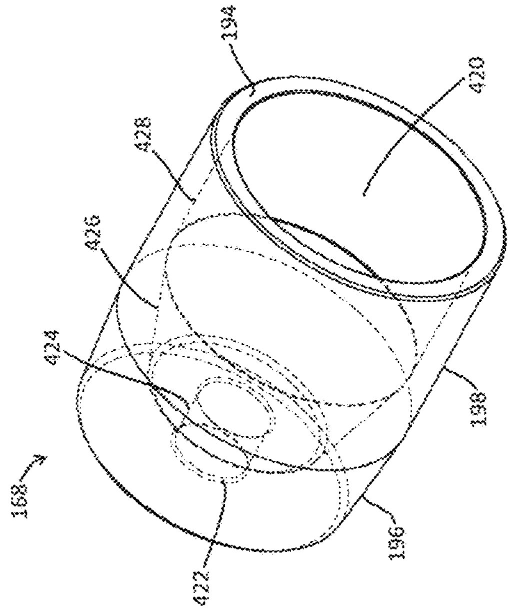
FIG. 85 is a perspective view of the first embodiment of the extraction cup of the first embodiment of the insertion and extraction system, showing invisible internal elements in dotted lines, in accordance with implementations of this disclosure.
Figure 86:
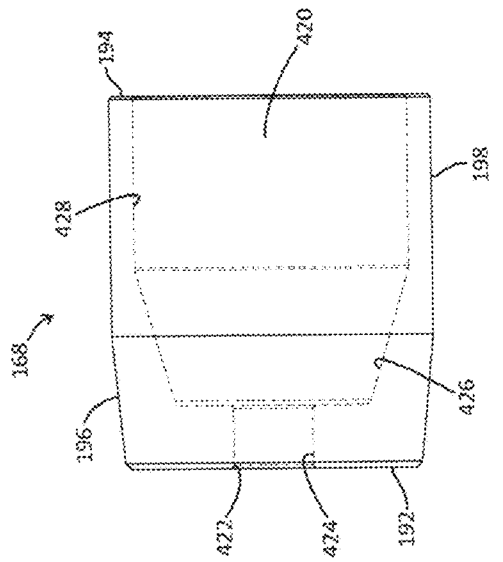
FIG. 86 is a side elevation view of the first embodiment of the extraction cup of the first embodiment of the insertion and extraction system, showing invisible internal elements in dotted lines, in accordance with implementations of this disclosure.
Figure 87:
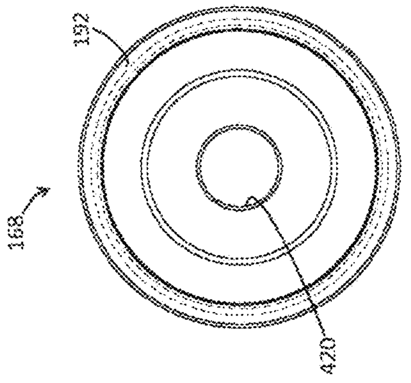
FIG. 87 is a top elevation view of the first embodiment of the extraction cup of the first embodiment of the insertion and extraction system, showing invisible internal elements in dotted lines, in accordance with implementations of this disclosure.
Figure 89:
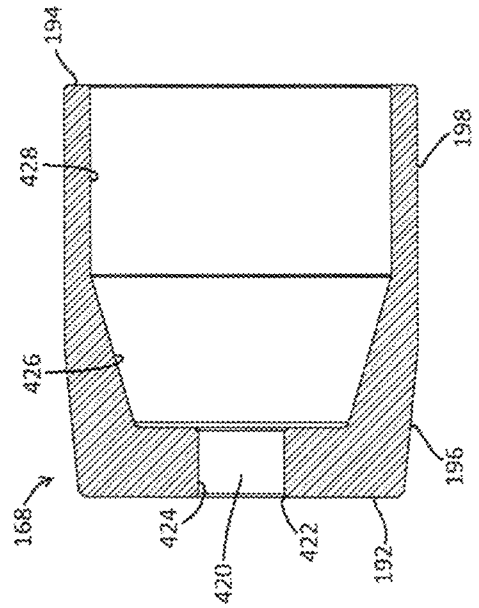
FIG. 89 is a cross-sectional view of the first embodiment of the extraction cup of the first embodiment of the insertion and extraction system, taken along Line X-X of FIG. 88, in accordance with implementations of this disclosure.
Figure 88:
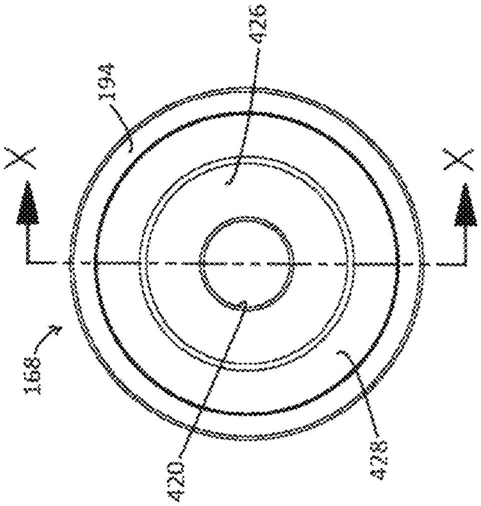
FIG. 88 is a rear elevation view of a distal end of the first embodiment of the extraction cup of the first embodiment of the insertion and extraction system in accordance with implementations of this disclosure.
Figure 90:
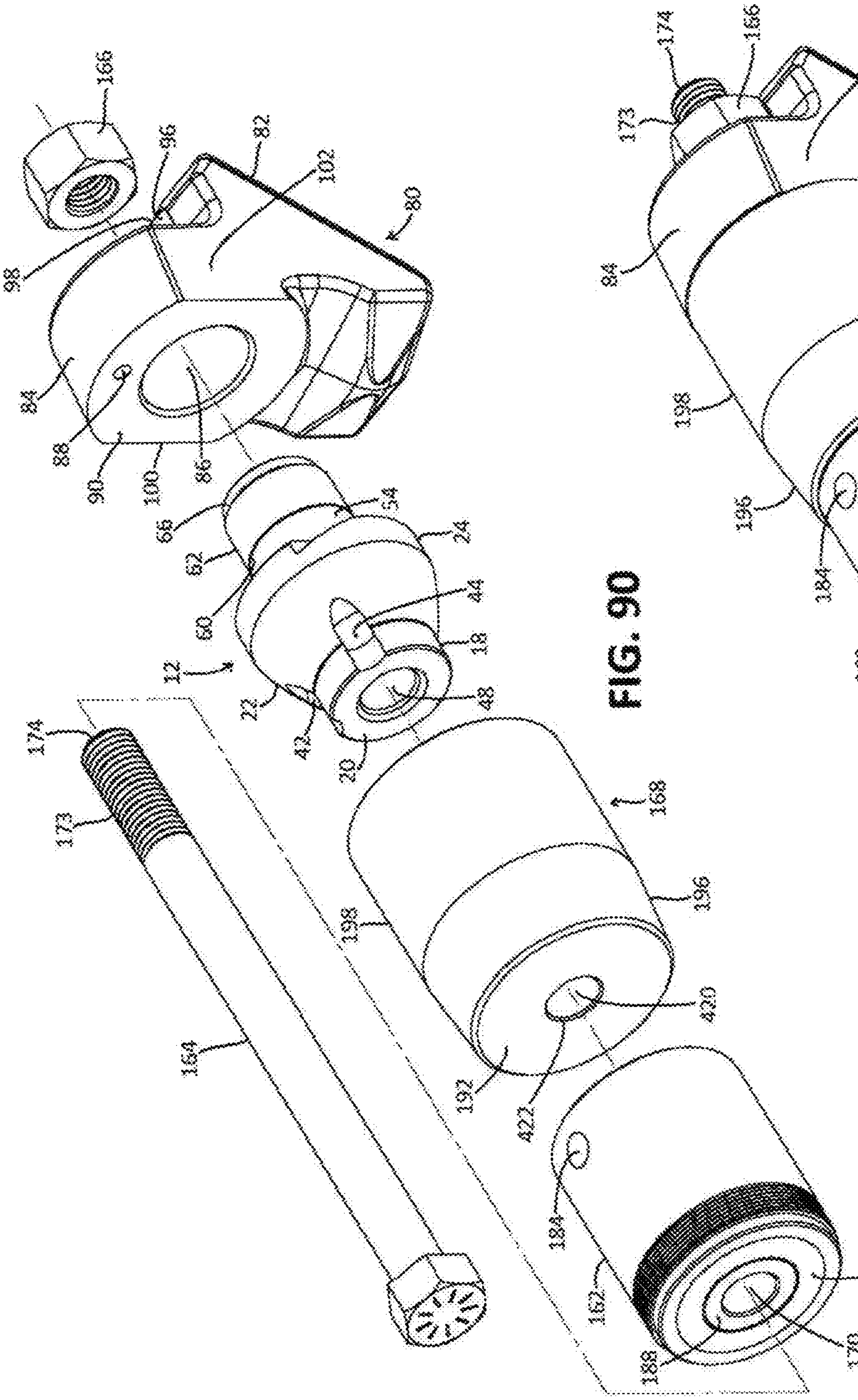
FIG. 90 is an exploded perspective view of the first embodiment of the insertion and extraction system, showing the bolt, the compact hydraulic cylinder, the extraction cup, and the nut, and the first embodiment of the bit assembly, without a bit, showing the bit holder, the base block, and the end cover, in accordance with implementations of this disclosure.
Figure 91:
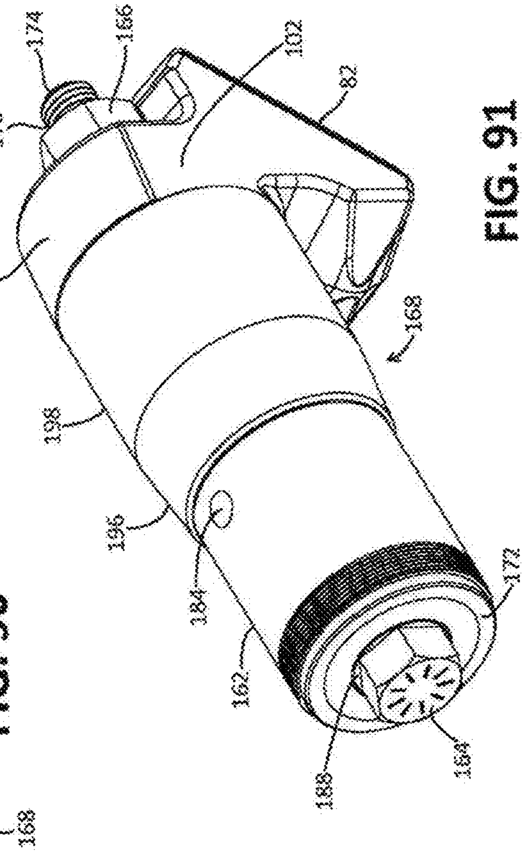
FIG. 91 is a perspective view of the first embodiment of the insertion and extraction system assembled onto the first embodiment of the bit assembly, without a bit, prior to extracting the bit holder from the base block bore, in accordance with implementations of this disclosure.
Figure 92:
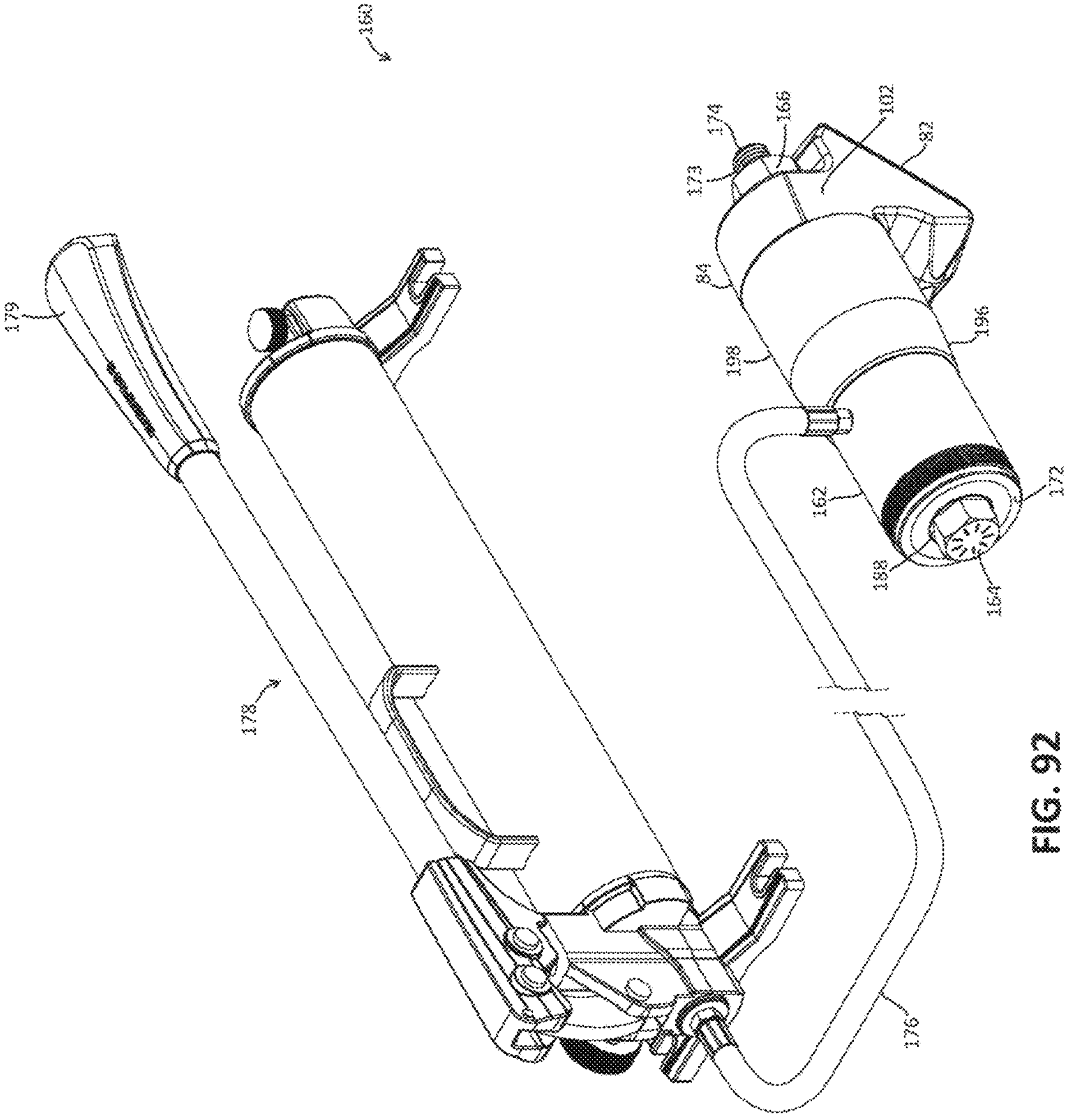
FIG. 92 is a perspective view of the first embodiment of the insertion and extraction system, showing the compact hydraulic cylinder connected to a hydraulic pump, assembled onto the first embodiment of the bit assembly, without a bit, prior to extracting the bit holder from the base block bore, in accordance with implementations of this disclosure.
Figure 93:
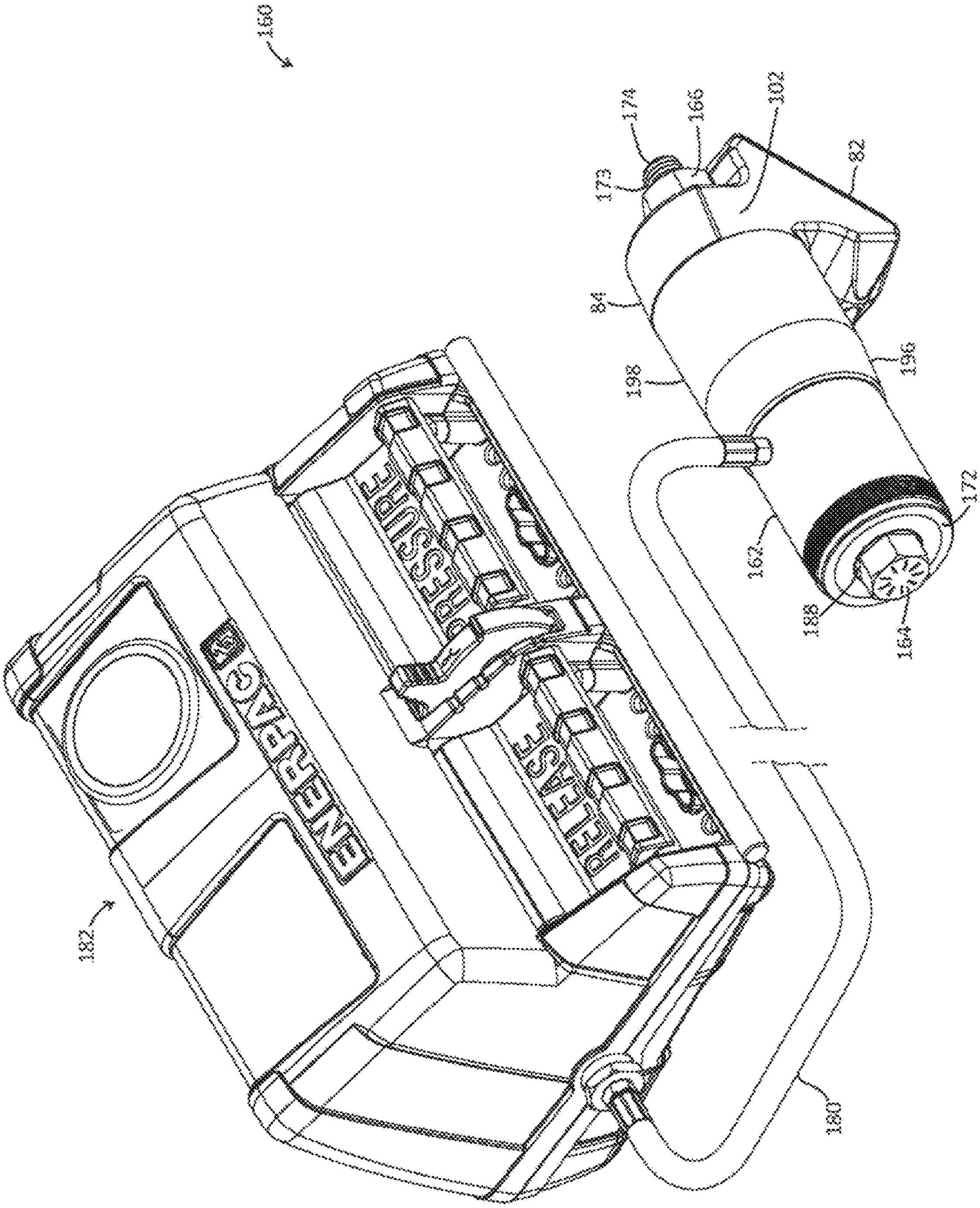
FIG. 93 is a perspective view of the first embodiment of the insertion and extraction system, showing the compact hydraulic cylinder connected to a pneumatically operated hydraulic pump, assembled onto the first embodiment of the bit assembly, without a bit, prior to extracting the bit holder from the base block bore, in accordance with implementations of this disclosure.
Figure 94:
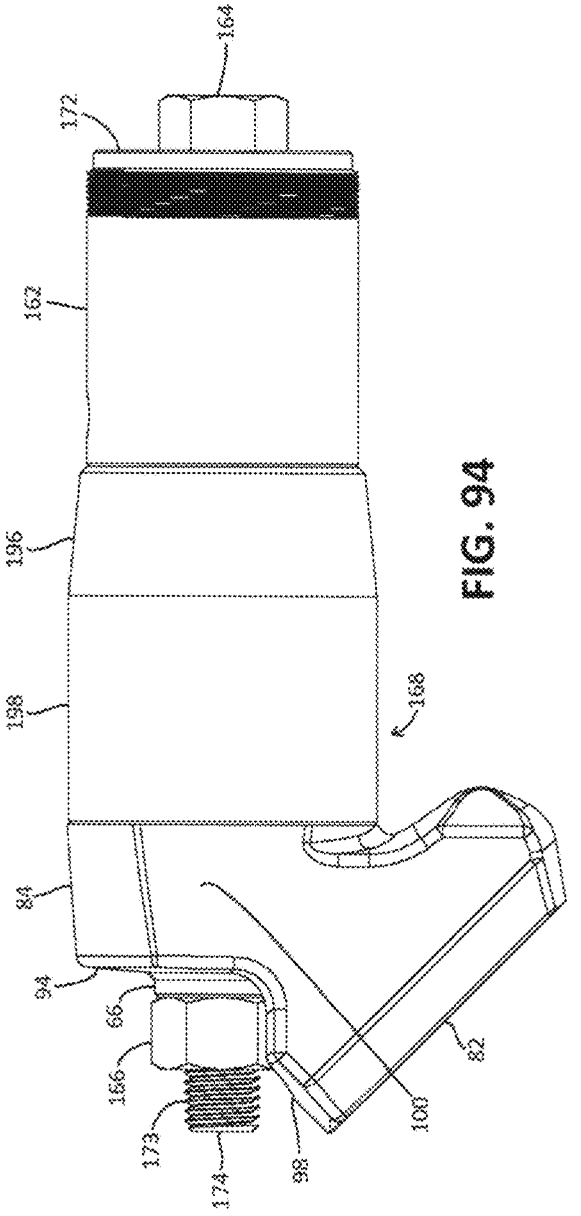
FIG. 94 is a side elevation view of the first embodiment of the insertion and extraction system, showing the bolt, the compact hydraulic cylinder, the extraction cup, and the nut, assembled with the first embodiment of the bit assembly, without a bit, showing the bit holder, the base block, and the end cover, prior to extracting the bit holder from the base block bore, in accordance with implementations of this disclosure.
Figure 95:
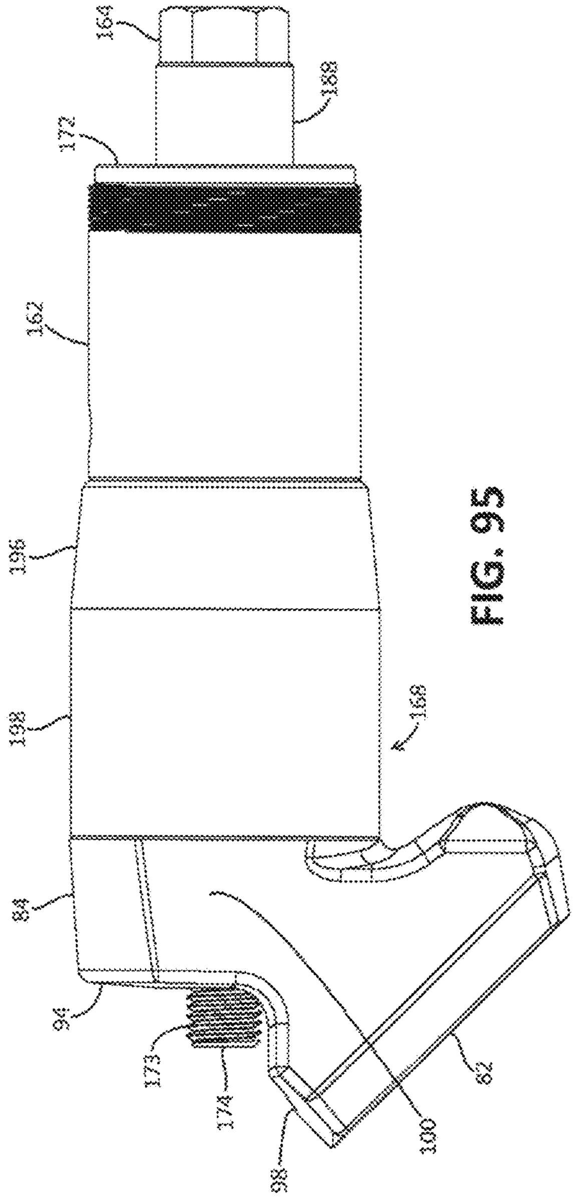
FIG. 95 is a side elevation view of the first embodiment of the insertion and extraction system, showing the bolt, the compact hydraulic cylinder, the extraction cup, and the nut, assembled with the first embodiment of the bit assembly, without a bit, showing the bit holder, the base block, and the end cover, after partially extracting the bit holder from the base block bore, in accordance with implementations of this disclosure.
Figure 97:
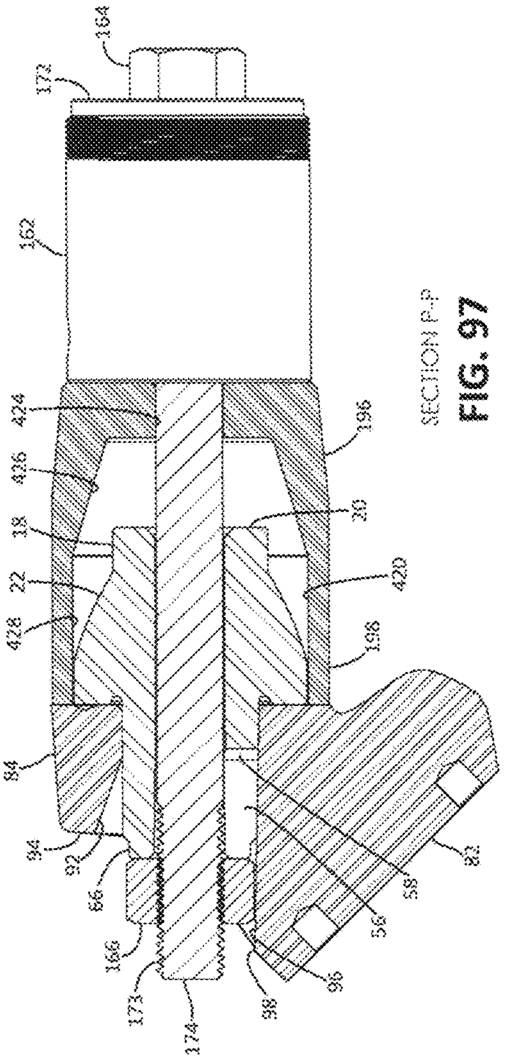
FIG. 97 is a cross-sectional view of the first embodiment of the insertion and extraction system, taken along line P-P of FIG. 96, showing the bolt, the compact hydraulic cylinder, the extraction cup, and the nut, assembled with the first embodiment of the bit assembly, without a bit, showing the first embodiment of the bit holder, the first embodiment of the base block, and the end cover, prior to extracting the bit holder from the base block bore, in accordance with implementations of this disclosure.
Figure 99:
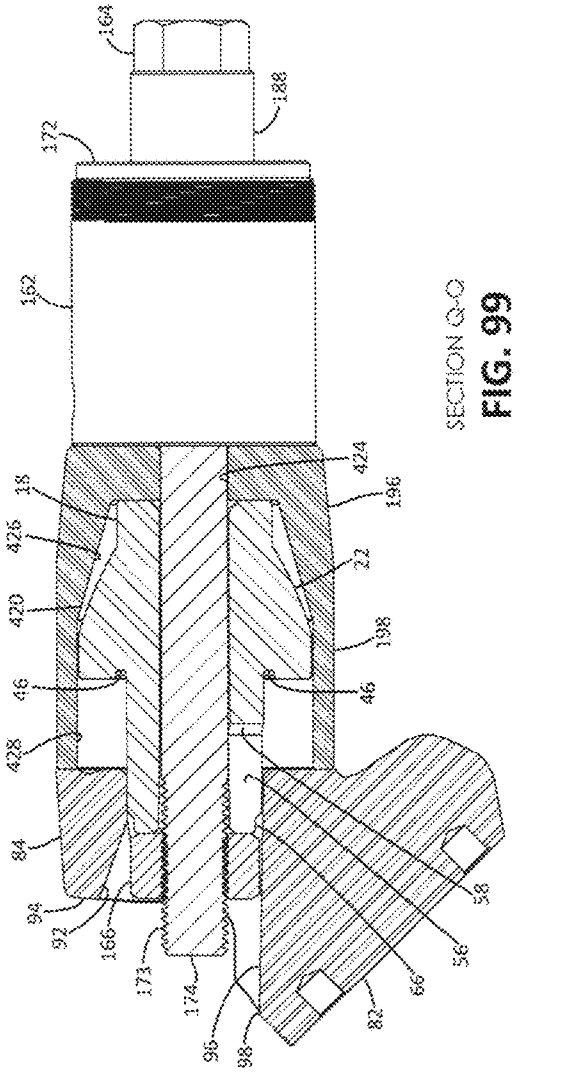
FIG. 99 is a cross-sectional view of the first embodiment of the insertion and extraction system, taken along line Q-Q of FIG. 98, showing the bolt, the compact hydraulic cylinder, the extraction cup, and the nut, assembled with the first embodiment of the bit assembly, without a bit, showing the bit holder, the base block, and the end cover, after partially extracting the bit holder from the base block bore, in accordance with implementations of this disclosure.
Figure 96:
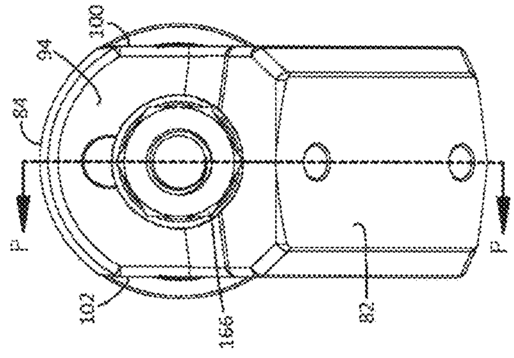
FIG. 96 is a rear elevation view of the first embodiment of the insertion and extraction system, showing the bolt, the compact hydraulic cylinder, the extraction cup, and the nut, assembled with the first embodiment of the bit assembly, without a bit, showing the first embodiment of the bit holder, the first embodiment of the base block, and the end cover, prior to extracting the bit holder from the base block bore, in accordance with implementations of this disclosure.
Figure 98:
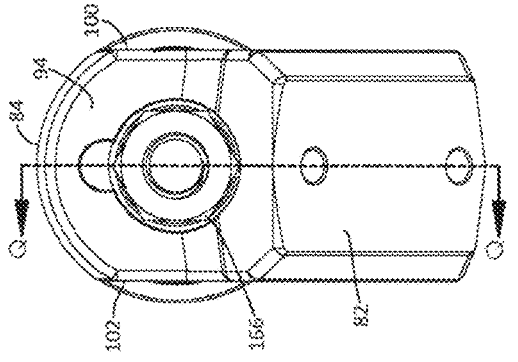
FIG. 98 is a rear elevation view of the first embodiment of the insertion and extraction system, showing the bolt, the compact hydraulic cylinder, the extraction cup, and the nut, assembled with the first embodiment of the bit assembly, without a bit, showing the first embodiment of the bit holder, the first embodiment of the base block, and the end cover, after partially extracting the bit holder from the base block bore, in accordance with implementations of this disclosure.
Figure 101:
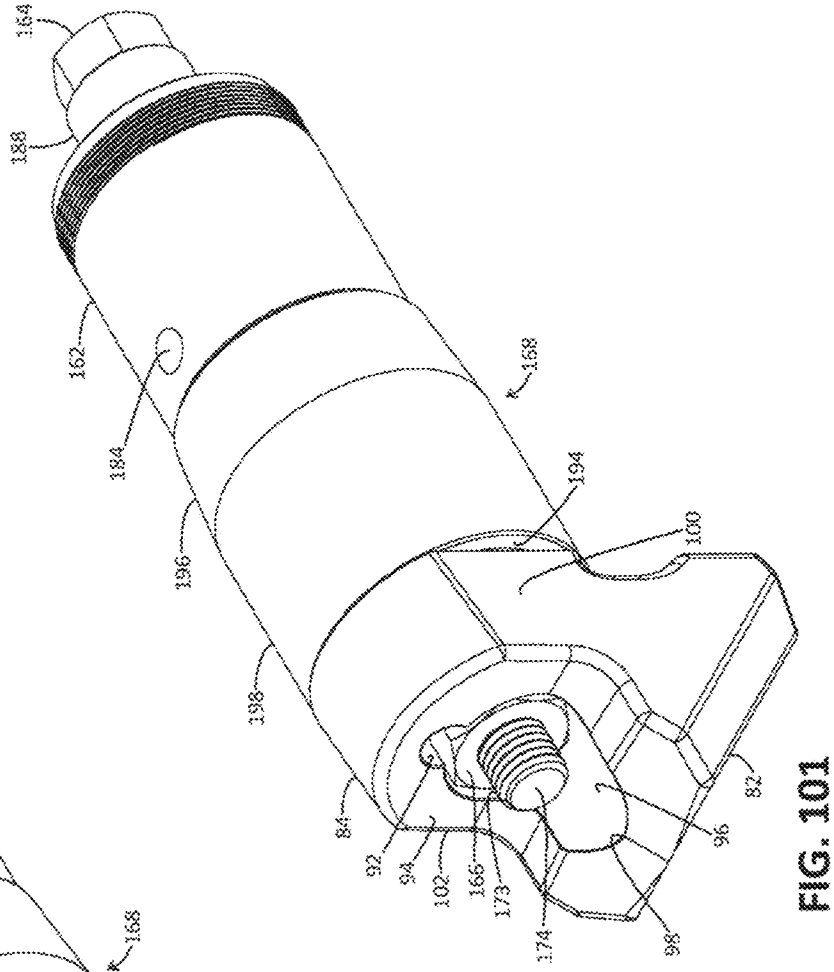
FIG. 101 is a rear perspective view of the first embodiment of the insertion and extraction system, showing the bolt, the compact hydraulic cylinder, the extraction cup, and the nut, assembled with the first embodiment of the bit assembly, without a bit, showing the bit holder, the base block, and the end cover, after partially extracting the bit holder from the base block bore, in accordance with implementations of this disclosure.
Figure 100:
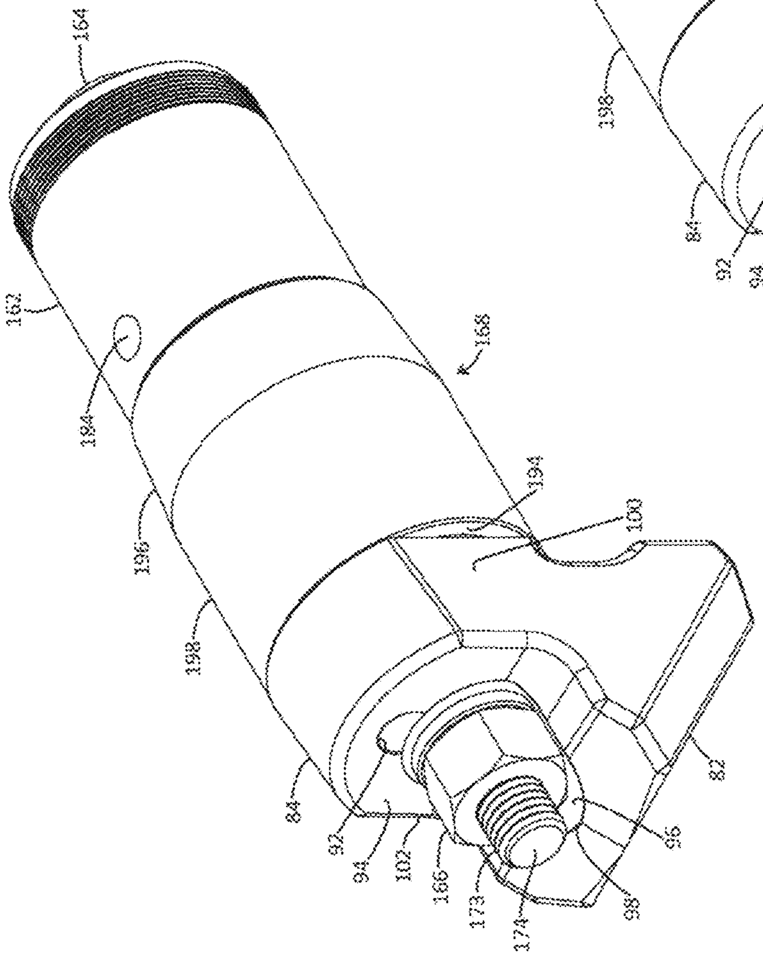
FIG. 100 is a rear perspective view of the first embodiment of the insertion and extraction system, showing the bolt, the compact hydraulic cylinder, the extraction cup, and the nut, assembled with the first embodiment of the bit assembly, without a bit, showing the first embodiment of the bit holder, the first embodiment of the base block, and the end cover, prior to extracting the bit holder from the base block bore, in accordance with implementations of this disclosure.
Figure 103:
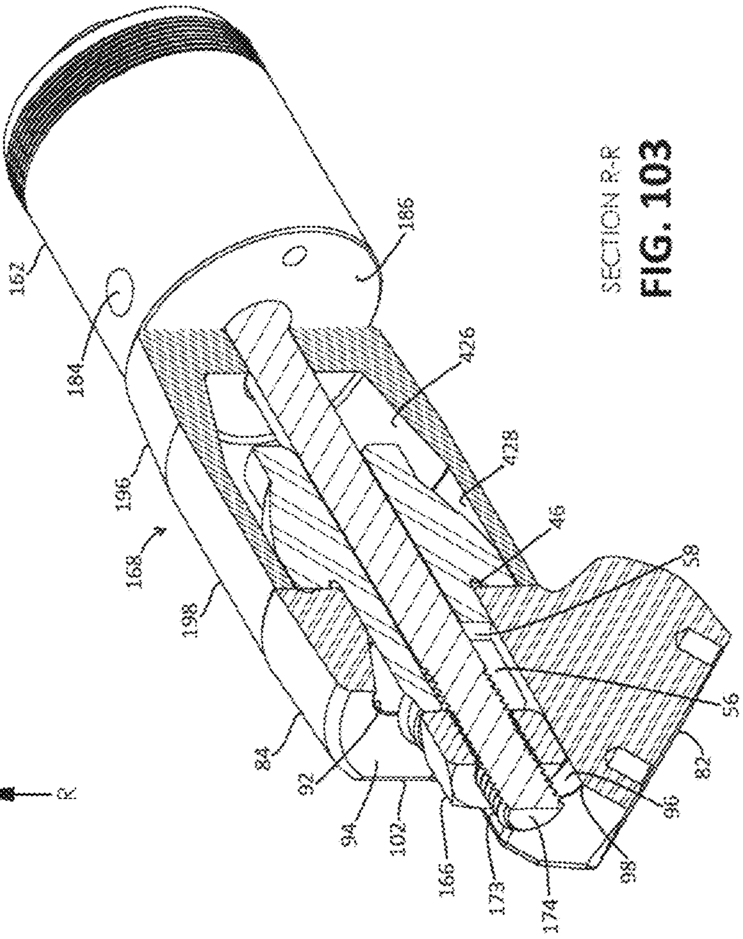
FIG. 103 is a cross-sectional perspective view of the of the first embodiment of the insertion and extraction system, taken along line R-R of FIG. 102, showing the bolt, the compact hydraulic cylinder, the extraction cup, and the nut, assembled with the first embodiment of the bit assembly, without a bit, showing the bit holder, the base block, and the end cover, prior to extracting the bit holder from the base block bore, in accordance with implementations of this disclosure.
Figure 102:
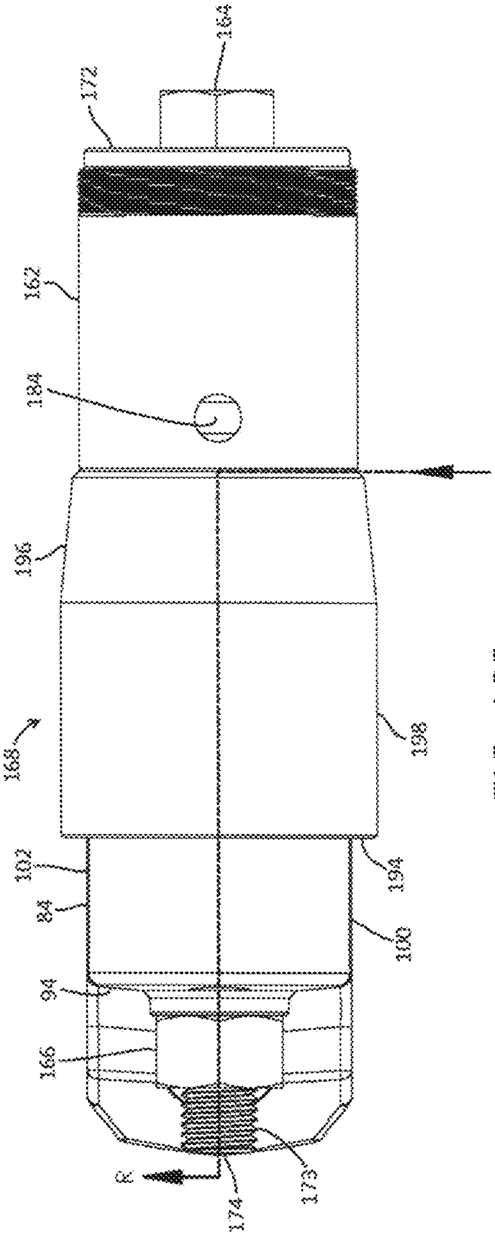
FIG. 102 is a top elevation view of the first embodiment of the insertion and extraction system, showing the bolt, the compact hydraulic cylinder, the extraction cup, and the nut, assembled with the first embodiment of the bit assembly, without a bit, showing the first embodiment of the bit holder, the first embodiment of the base block, and the end cover, prior to extracting the bit holder from the base block bore, in accordance with implementations of this disclosure.
Figure 104:
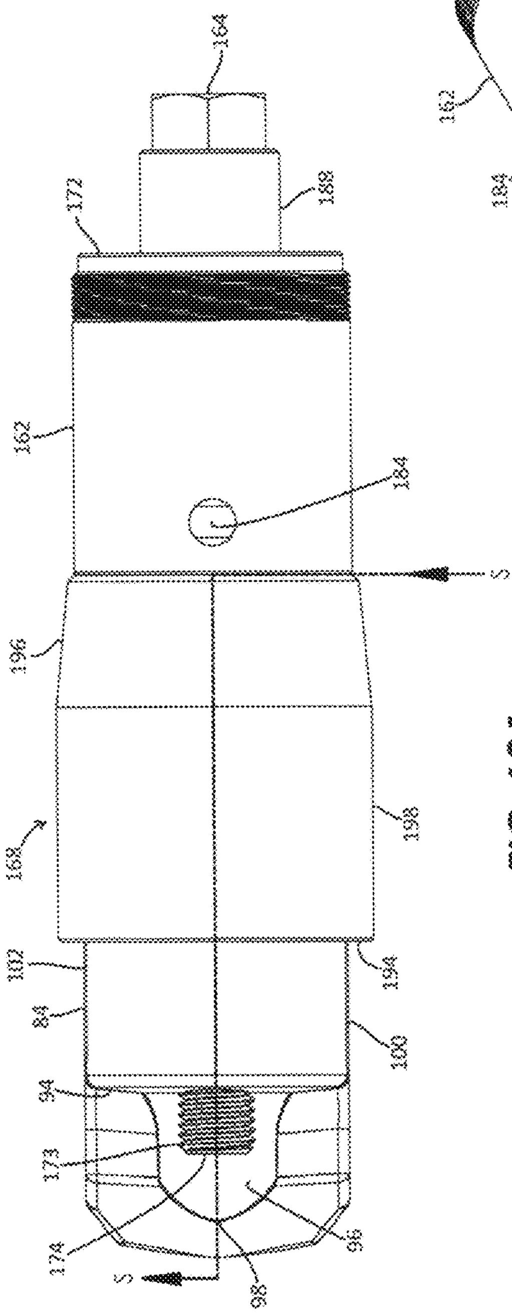
FIG. 104 is a top elevation view of the first embodiment of the insertion and extraction system, showing the bolt, the compact hydraulic cylinder, the extraction cup, and the nut, assembled with the first embodiment of the bit assembly, without a bit, showing the bit holder, the base block, and the end cover, after partially extracting the bit holder from the base block bore, in accordance with implementations of this disclosure.
Figure 105:
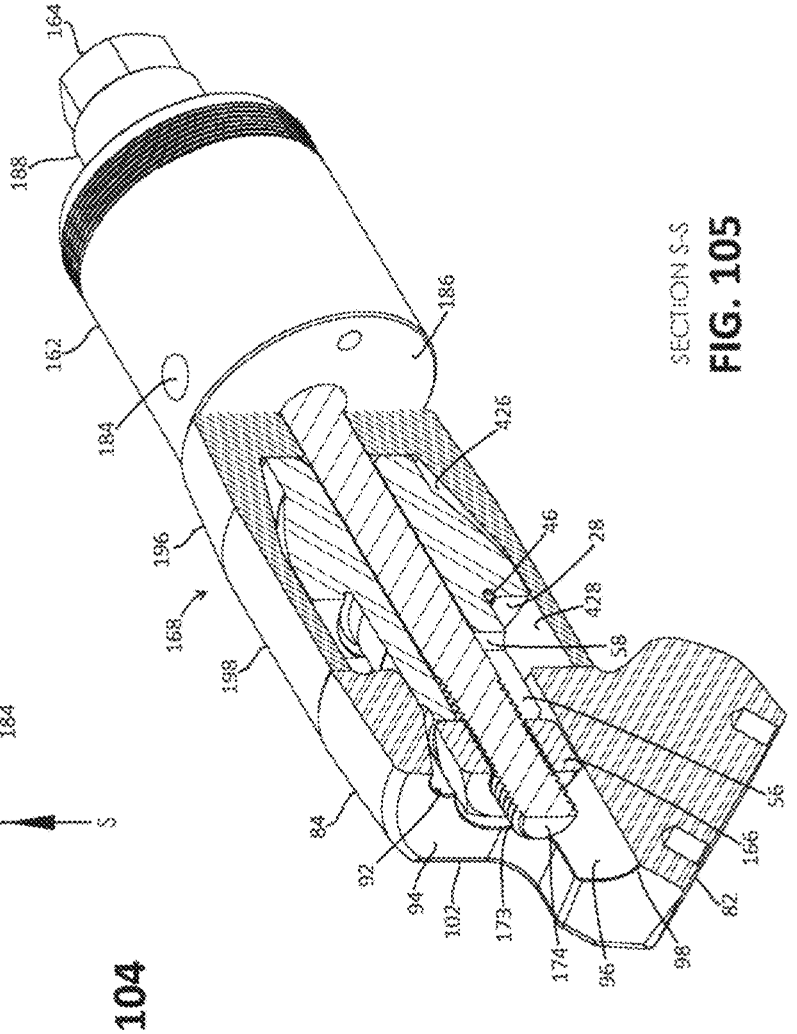
FIG. 105 is a cross-sectional perspective view of the first embodiment of the insertion and extraction system, taken along line S-S of FIG. 104, showing the bolt, the compact hydraulic cylinder, the extraction cup, and the nut, assembled with the first embodiment of the bit assembly, without a bit, showing the bit holder, the base block, and the end cover, after partially extracting the bit holder from the base block bore, in accordance with implementations of this disclosure.
Figures 106, 107:
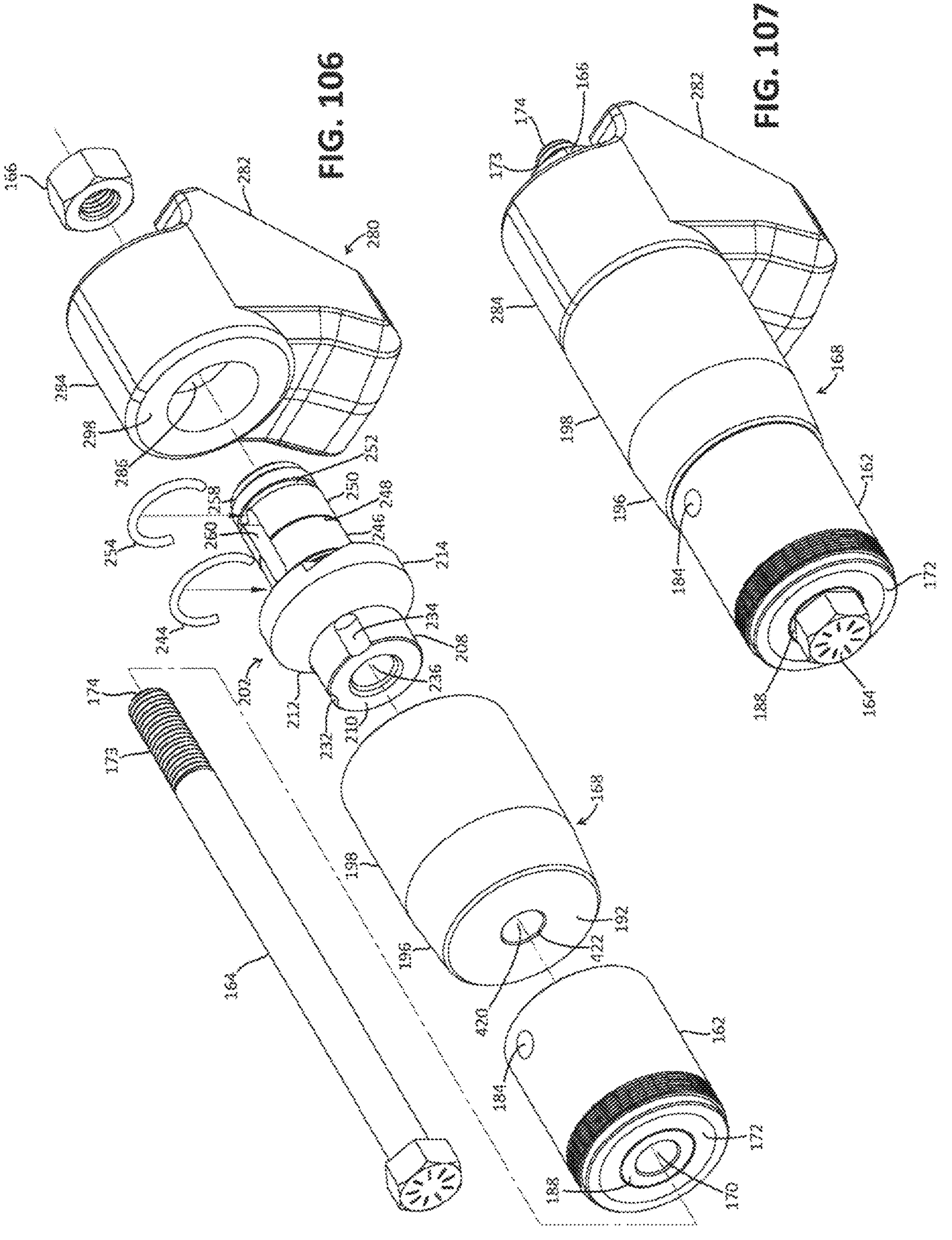
FIG. 106 is an exploded perspective view of the first embodiment of the insertion and extraction system, showing the bolt, the compact hydraulic cylinder, the extraction cup, and the nut, and the second embodiment of the bit assembly, without a bit, showing the bit holder, the base block, and the end cover, in accordance with implementations of this disclosure.
FIG. 107 is a perspective view of the first embodiment of the insertion and extraction system assembled onto the second embodiment of the bit assembly, without a bit, prior to extracting the bit holder from the base block bore, in accordance with implementations of this disclosure.
Figure 108:
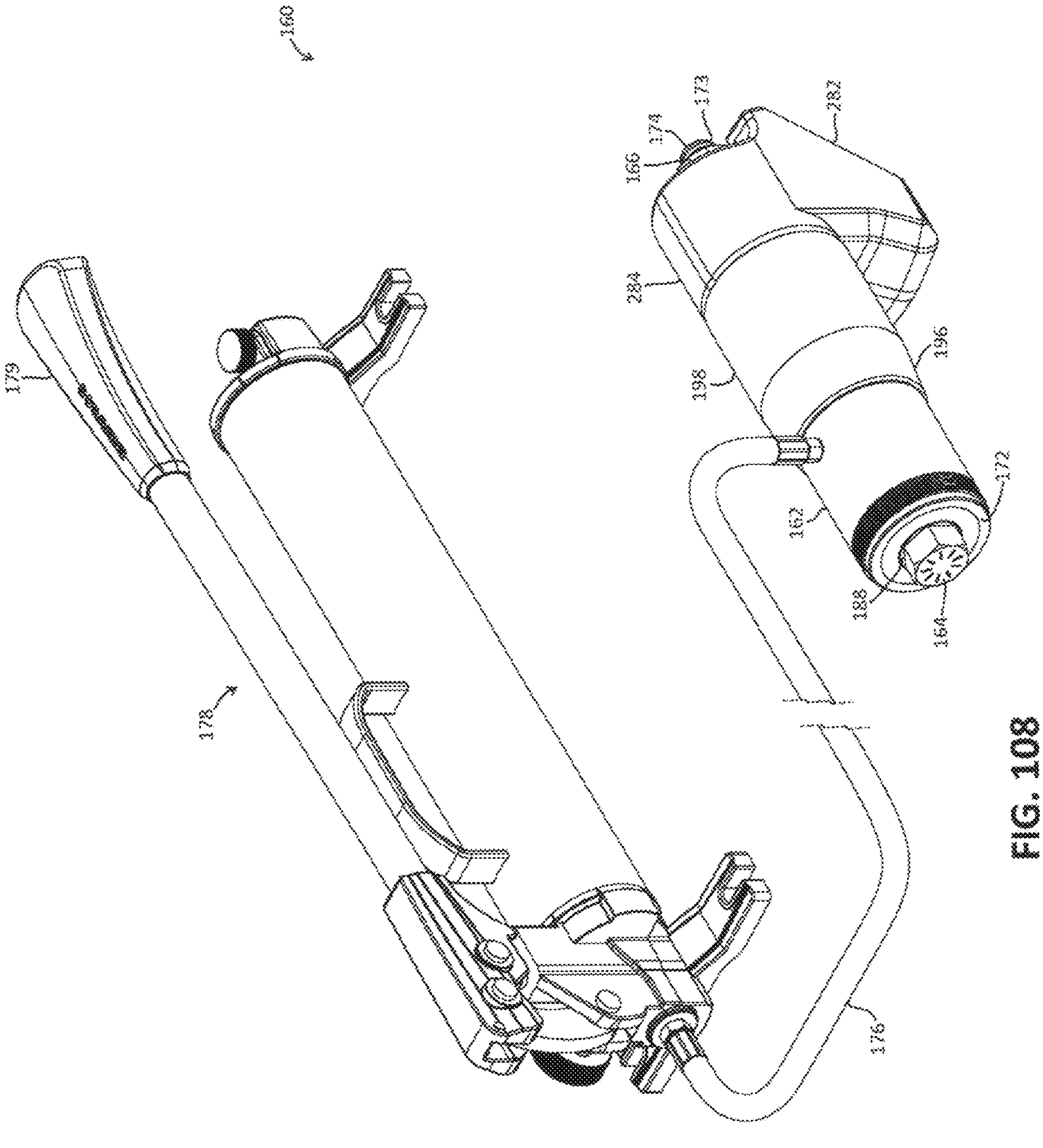
FIG. 108 is a perspective view of the first embodiment of the insertion and extraction system, showing the compact hydraulic cylinder connected to a hydraulic pump, assembled onto the second embodiment of the bit assembly, without a bit, prior to extracting the bit holder from the base block bore, in accordance with implementations of this disclosure.
Figure 109:
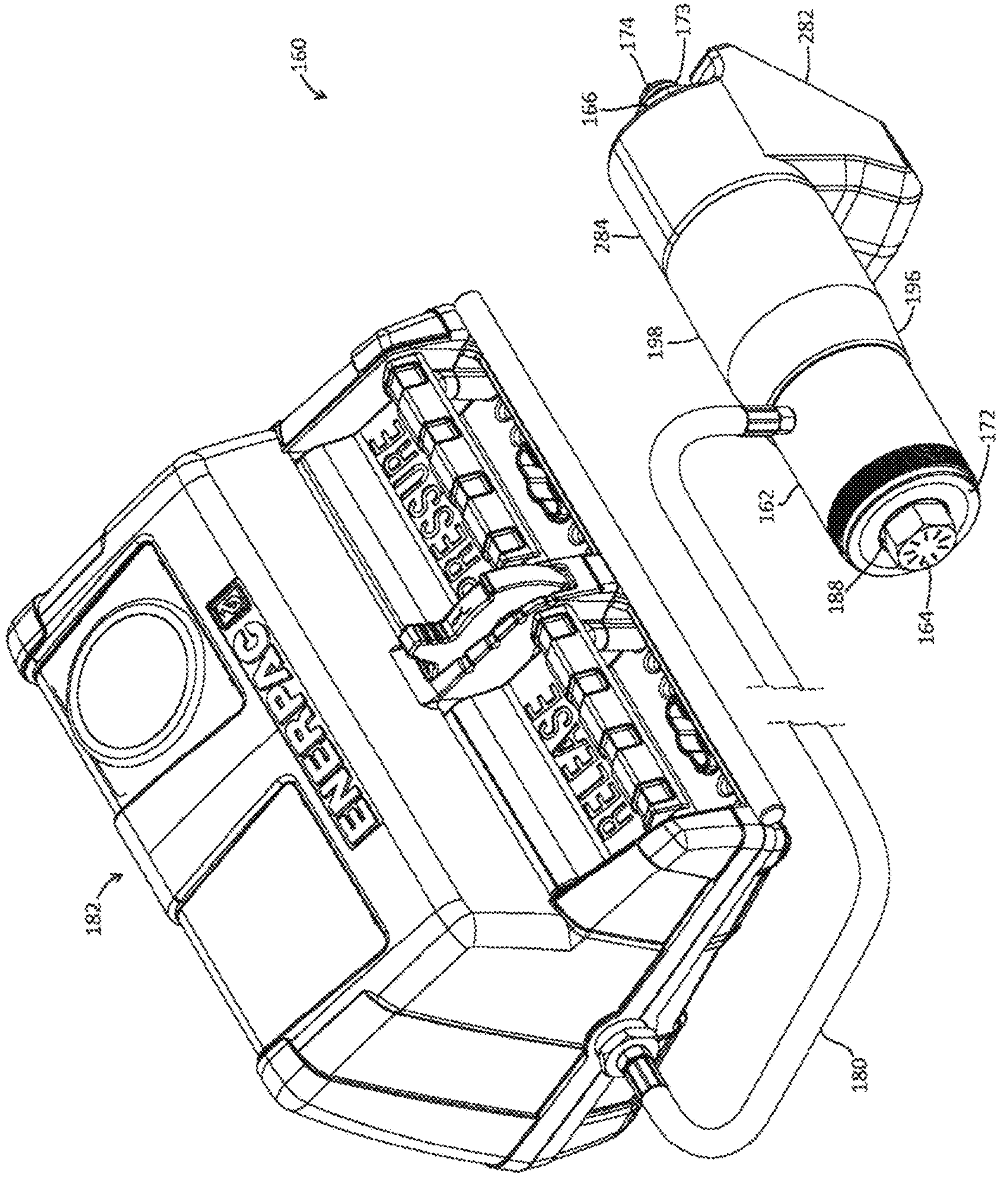
FIG. 109 is a perspective view of the first embodiment of the insertion and extraction system, showing the compact hydraulic cylinder connected to a pneumatically operated hydraulic pump, assembled onto the second embodiment of the bit assembly, without a bit, prior to extracting the bit holder from the base block bore, in accordance with implementations of this disclosure.
Figure 110:
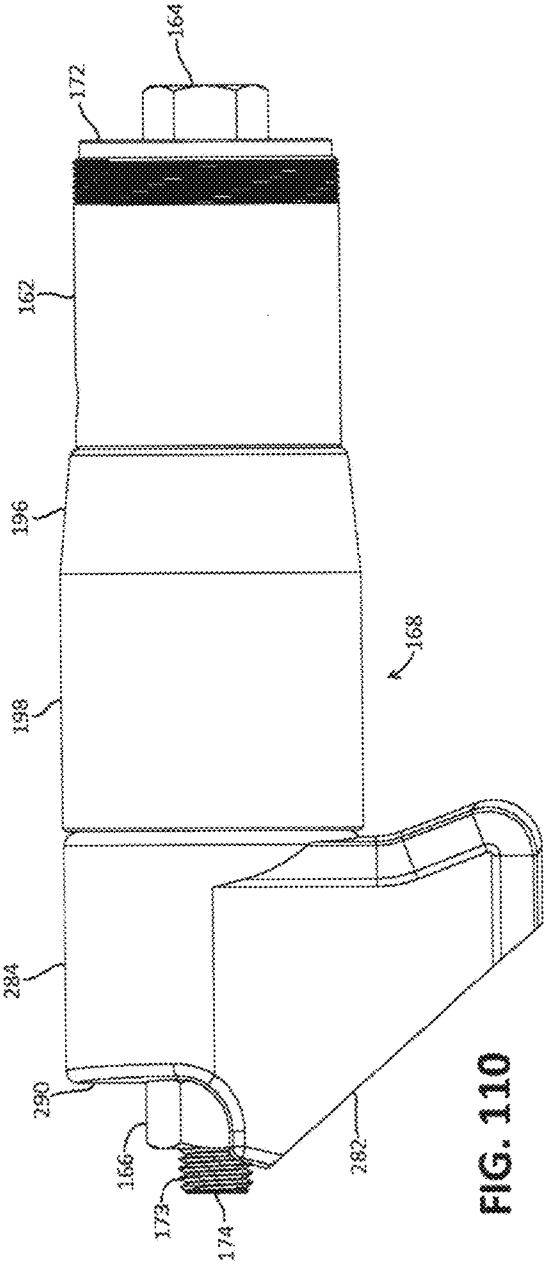
FIG. 110 is a side elevation view of the first embodiment of the insertion and extraction system, showing the bolt, the compact hydraulic cylinder, the extraction cup, and the nut, assembled with the second embodiment of the bit assembly, without a bit, showing the bit holder, the base block, and the end cover, prior to extracting the bit holder from the base block bore, in accordance with implementations of this disclosure.

The hose 176 from the manually operated hydraulic pump 178 (FIGS. 40, 64, 74, 90, 106, and 116) or the hose 180 from the pneumatically operated hydraulic pump 182 (FIGS. 41, 65, 75, 91, 107, and 117) is connected to the cross or through hole 184 of the compact hydraulic cylinder body 162. The pneumatically operated hydraulic pump 182 operates under air pressure and can attain hydraulic pressure of 10,000 PSI. The hydraulic pressure of the air operated hydraulic pump 182 can be changed or adjusted by rotating a single screw (not shown) on the hydraulic pump 182. Operation of pump 178 or pump 182 causes the compact hydraulic cylinder body 162 to move axially and force the compact hydraulic cylinder body 162 towards the base block 390, extending the hydraulic cylinder piston rod 188 forward of the forward end 172 of the hydraulic cup, as shown in FIGS. 77 and 81, thereby pushing the bit holder 322 into the bore 396 of the base block 390 until the annular back flange 338 of the bit holder body 324 seats on the front face 400 of the bit holder receiving portion 394 of the base block 390, achieving mounting of the bit holder 322 into the bore 396 of the base block 390 in less than 30 seconds. The bit assembly 320, without a bit, is shown prior to operation of the pump 178 or pump 182 in FIGS. 73-76 and 79 and is shown after mounting of the bit holder 322 in the base block 390 in FIGS. 77 and 81.

To extract the bit holder 322 from the base block 390, the distal end 194 of the extraction cup 168 is placed onto the forward end of the bit holder 322, such that the bit holder body 324 is completely enclosed within the generally cylindrical distal portion 428 of bore 420 of the extraction cup 168, and the compact hydraulic cylinder body 162 is placed onto the forward end 192 of the extraction cup 168. The bolt 164 is then inserted through the aperture 170 at the forward end of the hydraulic cylinder piston rod 188, and through the bore 356 of the bit holder 322 and the base block bore 396. The nut 166 is then threaded onto the distal end 174 of the bolt 164, with the hydraulic cylinder piston rod 188 in a relaxed, retracted position, as shown in FIGS. 117-120 and 123, prior to extraction of the bit holder 322 from the base block bore 396.

The hose 176 from the manually operated hydraulic pump 178 (FIGS. 40, 64, 74, 90, 106, and 116) or the hose 180 from the pneumatically operated hydraulic pump 182 (FIGS. 41, 65, 75, 91, 107, and 117) is connected to the cross or through hole 184 of the compact hydraulic cylinder body 162. The pneumatically operated hydraulic pump 182 operates under air pressure and can attain hydraulic pressure of 10,000 PSI. The hydraulic pressure of the air operated hydraulic pump 182 can be changed or adjusted by rotating a single screw (not shown) on the hydraulic pump 182. Operation of pump 178 or pump 182 causes the compact hydraulic cylinder body 162 to move axially and pull the bit holder 322 from the base block 390, extending the hydraulic cylinder piston rod 188 forward of the forward end 172 of the hydraulic cylinder body 162, as shown in FIGS. 121 and 125, thereby pulling the bit holder 322 from the bore 396 of the base block 390, achieving extraction of the bit holder 322 from the bore 396 of the base block 390 in less than 30 seconds. The bit assembly 320, without a bit, is shown prior to operation of the pump 178 or pump 182 in FIGS. 117-120 and 123 and is shown after extraction of the bit holder 322 from the base block 390 in FIGS. 121 and 125.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An insertion system for inserting a slotted shank bit holder into a base block, comprising:

a hydraulic cylinder comprising a hydraulic cylinder piston rod extending from a forward end of the hydraulic cylinder to a distal end of the hydraulic cylinder, the hydraulic cylinder adapted to be mounted on a forward end of a bit holder;

an end cover comprising a bore, the end cover adapted to be mounted on a rear face of the base block;

a bolt axially extending through the hydraulic cylinder piston rod and the bore of the end cover, the bolt comprising external threading adjacent a distal end of the bolt, the bolt adapted to axially extend through a bore of the bit holder and a bore of the base block;

the bore of the end cover extending from a front face of the end cover to the rear face of the end cover, the bore of the end cover adapted to receive the distal end of the bolt; and the bore of the end cover comprising a tapered forward segment adjacent the front face of the end cover, a generally semi-cylindrical middle segment adjacent the tapered forward segment, and a generally cylindrical distal segment adjacent the generally cylindrical middle segment.

2. An insertion system for inserting a slotted shank bit holder into a base block, comprising:

a hydraulic cylinder comprising a hydraulic cylinder piston rod extending from a forward end of the hydraulic cylinder to a distal end of the hydraulic cylinder, the hydraulic cylinder adapted to be mounted on a forward end of the bit holder;

an end cover comprising a bore, the end cover is mountable on a rear external face of the base block;

a bolt axially extending completely through the hydraulic cylinder piston rod, a bore of the bit holder, a bore of the base block, and the bore of the end cover, the bolt comprising external threading adjacent a distal end of the bolt;

the bore of the end cover extending from a front face of the end cover to the rear face of the end cover, the bore of the end cover adapted to receive the distal end of the bolt; and the bore of the end cover comprises a tapered forward segment adjacent the front face of the end cover, a generally semi-cylindrical middle segment adjacent the tapered forward segment, and a generally cylindrical distal segment adjacent the generally cylindrical middle segment.

3. The insertion system of claim 2, further comprising:

a nut comprising internal threading mounted adjacent a rear face of the end cover, the nut adapted to engage the external threading of the bolt.

4. The insertion system of claim 2, the bore of the end cover comprising internal threading adapted to engage the external threading of a shank.

5. The insertion system of claim 2, further comprising:

at least one of a manually operated hydraulic pump and a pneumatically operated hydraulic pump comprising a hose connected to a threaded port of the hydraulic cylinder.

6. The insertion system of claim 2, the end cover further comprising a pair of flat vertical sides matching vertical sides of the base block and extending from a top portion of the end cover to a distal portion of the end cover.

7. The insertion system of claim 2, the front face of the end cover adapted to nearly match a distal profile adjacent a distal end of the bore of the base block.

8. An insertion system for inserting a bit holder onto a base block, comprising:

a hydraulic cylinder comprising a piston extendable from a forward end of the hydraulic cylinder, the hydraulic cylinder mountable on a forward portion of the bit holder;

an end cover adapted to be mountable on a rear external face of the base block;

said hydraulic cylinder and said end cover each comprising a bore extending therethrough, said bores adapted to be alignable with at least one of the bit holder bore of the bit holder and a base block bore of the base block;

a shank comprising at least one of a radially enlarged end of the shank and a threaded portion adjacent an opposing end of the shank, the shank comprising a bolt that includes an enlarged head at one end and a nut mountable on an opposing end of said shank, said shank adapted to be extendable through at least one of the bit holder bore and the base block bore.

9. The insertion system of claim 8, further comprising a pressure pump operatively connected to the hydraulic cylinder.

* * * * *